United States Patent
Raphaeli et al.

(10) Patent No.: US 7,570,656 B2
(45) Date of Patent: Aug. 4, 2009

(54) CHANNEL ACCESS METHOD FOR POWERLINE CARRIER BASED MEDIA ACCESS CONTROL PROTOCOL

(75) Inventors: Dan Raphaeli, Kfar Saba (IL); Mordechai Mushkin, Nirit (IL); Ronen Gazit, Tel Aviv (IL); Yael Kacen, Omer (IL); Amir Erez, Nes Tziona (IL)

(73) Assignee: Yitran Communications Ltd., Beersheva (IL)

( * ) Notice: Subject to any disclaimer, the term of this patent is extended or adjusted under 35 U.S.C. 154(b) by 1314 days.

(21) Appl. No.: 09/883,589

(22) Filed: Jun. 18, 2001

(65) Prior Publication Data

US 2003/0103521 A1    Jun. 5, 2003

(51) Int. Cl.
    *H04L 12/413* (2006.01)
(52) U.S. Cl. .................. 370/445; 370/450; 370/461
(58) Field of Classification Search ............. 370/445, 370/447, 448, 449, 450, 455, 458, 459, 461, 370/462
    See application file for complete search history.

(56) References Cited

U.S. PATENT DOCUMENTS

| | | | |
|---|---|---|---|
| 4,464,658 A | | 8/1984 | Thelen ..................... 340/825.5 |
| 4,598,285 A | * | 7/1986 | Hoshen ...................... 370/448 |
| 5,164,942 A | * | 11/1992 | Kamerman et al. ......... 370/334 |
| 5,175,537 A | * | 12/1992 | Jaffe et al. ............... 340/825.5 |
| 5,319,641 A | | 6/1994 | Fridrich et al. ............. 370/85.3 |
| 5,329,531 A | | 7/1994 | Diepstraten et al. ........ 370/94.2 |
| 5,369,639 A | * | 11/1994 | Kamerman et al. ......... 370/347 |
| 5,553,072 A | | 9/1996 | Daggett et al. ............. 370/85.3 |
| 5,631,906 A | | 5/1997 | Liu et al. |
| 5,636,223 A | | 6/1997 | Reardon et al. ............. 370/431 |
| 5,721,725 A | | 2/1998 | Want et al. .................. 370/236 |
| 5,828,663 A | | 10/1998 | Ikegami ..................... 370/347 |
| 5,838,688 A | * | 11/1998 | Kadambi et al. ............ 370/445 |
| 5,963,543 A | * | 10/1999 | Rostoker et al. ............ 370/232 |
| 5,999,538 A | * | 12/1999 | Haddock et al. ............ 370/446 |
| 6,002,669 A | | 12/1999 | White ........................ 370/235 |
| 6,078,591 A | * | 6/2000 | Kalkunte et al. ............ 370/448 |
| 6,442,170 B1 | * | 8/2002 | Perlman et al. ............. 370/401 |

(Continued)

FOREIGN PATENT DOCUMENTS

WO    WO 98/59254    12/1998

OTHER PUBLICATIONS

Part 11: Wireless LAN Medium Access Control (MAC) and Physical Layer (PHY) specifications; IEEE Std 802.11-1997; Jun. 26, 1997.

(Continued)

*Primary Examiner*—Chi H. Pham
*Assistant Examiner*—Kevin Mew
(74) *Attorney, Agent, or Firm*—Zaretsky Patent Group PC; Howard Zaretsky

(57) ABSTRACT

A novel and useful media access control (MAC) protocol that is intended for use over noisy shared media channels. The MAC protocol provides layer 2 functionality over a network using a shared medium including a backoff mechanism for CSMA/CA channel access, link addressing that reduces the overhead of long MAC addresses, a flooding scheme having controlled exposure for broadcast transmissions, multicast transmissions using selective ACKs, implementation of traffic prioritization using an adaptive backoff scheme, a second layer repeater establishment process and multi-packet transport for short packets and fragmentation for long packet transport.

90 Claims, 28 Drawing Sheets

U.S. PATENT DOCUMENTS

| | | | |
|---|---|---|---|
| 6,625,162 B2* | 9/2003 | Myojo et al. | 370/445 |
| 6,990,116 B1* | 1/2006 | Young et al. | 370/445 |
| 7,298,691 B1* | 11/2007 | Yonge et al. | 370/203 |
| 7,352,770 B1* | 4/2008 | Yonge et al. | 370/445 |
| 2005/0058151 A1* | 3/2005 | Yeh | 370/445 |
| 2005/0068979 A1* | 3/2005 | Boer et al. | 370/445 |
| 2006/0274776 A1* | 12/2006 | Malik et al. | 370/445 |

OTHER PUBLICATIONS

U.S. Appl. No. 09/822,939, filed Mar. 30, 2001.

J.O. Onunga, R.W. Dondaldson, "Personal computer communications on intrabuilding power line LAN's using CSMA with priority acknowledgements", IEEE Journal on Selected Areas in Communications, vol. 7, No. 2, pp. 180-191, Feb. 1989.

\* cited by examiner

CONTROL FRAME

DATA FRAME

CHANNEL ACCESS METHOD FOR POWERLINE CARRIER BASED MEDIA ACCESS CONTROL PROTOCOL

FIELD OF THE INVENTION

The present invention relates generally to data communication systems and more particularly relates to a channel access method for a power line carrier based media access control (MAC) protocol.

BACKGROUND OF THE INVENTION

In recent years, the world has witnessed explosive growth in the demand for all types of communications and it is predicted that this demand will increase in the future. It is expected that power line carrier (PLC) will play a major role in providing communications in the home, SOHO and corporate enterprise environments. One of the main attractions of using PLC communications is that communications take place over existing electrical power utility wiring. Networks running over traditional LAN cabling require that copper or optical fiber cable be installed, usually at great labor and material expense. PLC networks, however, do not require any special installation of cable since they utilize the power line wiring that already exists in the building structure.

In addition, it is a growing trend within the electrical device industry to enable previously stand alone electrical devices, such as sensors and lighting control devices, to communicate with each other over some type of communications network. Previously, sensor, switch and control devices communicated using point-to-point connections. Nowadays, manufacturers are building communication means into these devices to enable them to communicate over some type of shared medium constructed as one or more local area networks (LANs). A variety of systems is currently commercially available which electrical device manufacturers can integrate into their products to enable them to communicate over a network. A convenient medium for these devices to communicate over is the power line since most devices are already coupled to the wiring system for drawing electrical power.

One such communication system is the CEBus system that has been made an EIA standard) known as the EIA 600 standard, which was originally developed by Intellon Corp. A second well-known communications system is the LonWorks system commercially available from and developed by Echelon Corp. Both the CEBus and LonWorks systems specify physical and link layer means for communicating over a variety of different media including power line carrier, coaxial cable, fiber optic cable, radio frequency (RF), infrared (IR) and twisted pair cable.

The commonly used ISO OSI communications model specifies a seven layer communications protocol stack comprising a physical layer, link or media access control (MAC) layer, network layer, transport layer, session layer, presentation layer and an application layer. The main functionally of the MAC layer and associated protocol, is to provide an effective method of accessing the physical channel, which in this case is the power line. Along with basic channel access, the MAC protocol ideally also provides (1) efficient and reliable host packet and session transport for the different kinds of possible connections, including unicast, multicast and broadcast, (2) efficient addressing scheme for the stations connected to the network, (3) repeater functionality for large networks with stations spread over large distances and (4) quality of service functionality.

The main function of any MAC protocol is to provide an effective channel access method that enables efficient and reliable host packet transport for the different kinds of possible connections, e.g., unicast, multicast and broadcast connections.

A channel access scheme that is in widespread use today is known as Carrier Sense Multiple Access (CSMA) that is used for example in Ethernet LANs (IEEE Standard 802.3). A more innovative scheme is the Carrier Sense Multiple Access with Collision Avoidance (CSMA/CA) that is used in wireless LANs (IEEE Standard 802.11). Both are commonly used in networks that comprise shared media whereby multiple nodes simultaneously have access to the same media. The media may be any physical medium that can be simultaneously shared by many nodes, such as a cable, RF, powerline, etc.

Powerline Network Characteristics

An example of a shared network is shown in FIG. 1. The network, generally referenced 10, comprises a plurality of communication nodes 12 (nodes A through F) that are connected to a common physical media 14. An example of a shared media is the AC powerline wiring grid found in homes, offices and enterprises. In a residential environment, groups of neighboring residences are coupled together via the outdoor wiring, thus forming a huge common media. The signal propagates over a wide area due to mutual inductive coupling which in some cases permits a signal transmitted on one phase to be induced in other phases. Note that the powerline media remains shared until reaching a transformer where signals may be able to propagate beyond without the use of signal couplers due to poor inductive coupling.

A shared media such as the powerline is typically characterized by a large variety of different signal propagation conditions. Stations on the same logical network may not be able to communicate freely with each other thus creating a hidden node problem whereby portions of the media are invisible from other parts.

Another characteristic of power line based networks is that stations on different logical networks may share the same physical network. In many cases, a home, enterprise or other premise includes more than one communication network. Each communication network may be made up of a plurality of nodes with each network comprising at least two nodes. All nodes of the same network implement the same communication technique and are able to communicate with each other thus permitting interoperability (assuming that the propagation conditions over the media enable communication). Nodes from different networks may implement different communication techniques, in which case they are not able to communicate with each other. In addition, the propagation characteristics of the shared media (e.g., the powerline grid) may have large variations and irregularities. This results in large variations in the attenuation over the communication path between two given nodes.

Since the powerline grids of neighboring residences are physically connected via the power distribution network, the common media of FIG. 1 might refer to the powerline grid of a single residence or to the powerline grids of several neighboring residences (e.g., several apartments in a building).

Thus, the entire physical network is vast, possibly comprising a large number of houses or enterprises, and cannot be separated into small logical cells, e.g., a single house. This is because, neighborhoods are often wired such that many homes or enterprises in the same area are connected to the same electrical phase of the utility wiring.

Another characteristic of the power line network is that channel attenuation may be non-symmetric, i.e. the attenuation may be different for opposite directions of signal propagation. In other words, the impedance as seen by the stations on opposite sides of transmission is different. This may cause power mismatching or other problems during transmission and reception.

Yet another characteristic of power line networks is that they are ad hoc in nature meaning that stations may be added to or removed from the network at any time. In such types of networks, there is no system administrator or installer as there are in other well controlled networks such as telecommunication carrier WANs, corporate networks, etc. No calibration measurements are taken and each end user buys and installs devices independent of and without the knowledge of other users of the network.

The power line channel is also characterized as extremely noisy and unreliable making the power line a difficult medium in which to communicate at high speed and over long distances despite the recent availability of advanced modulation schemes employing various forms of spread spectrum techniques. At any point in time there may be present on the network any number of noise generating devices such as incandescent dimmers, fluorescent dimmers or other electrical devices that utilize noise producing semiconductor switching components such as triacs, silicon controlled rectifiers (SCRs), diacs, etc. Other noise generators include electric motors such as found in drills, compressors, etc.

Traditional Media Access Control (MAC) Protocol

Some traditional MAC protocol techniques are described hereinbelow. Since the powerline is a distributed environment, distributed protocols and methods are described.

There are many well known channel access techniques. Most of these methods can be divided into the following two categories: (1) central control and (2) distributed control. In central control, a single station, referred to as the channel master, controls all access to the channel and allocates channel access to stations in the network. In distributed control, all stations may contend for the channel, as long as they obey the access rules defined in the particular MAC protocol.

Some distributed channel access techniques employ a form of backoff mechanism whereby a station that senses a busy channel backs off and attempts transmission at a later time. The backoff time is chosen as a random number of time slots wherein each time slot represents the time to detect with high probability the presence of signal on the channel. This typically is a relatively long time and increases the overhead of the protocol.

The MAC protocol also employs some type of station addressing in the network to uniquely identify a station. Typically, a 6 byte MAC address is used for this purpose. The MAC address is used in the channel contention packets and they constitute a large portion of the packet size. For example basic channel contention packets must contain at least a source MAC address (6 bytes) and destination MAC address (6 bytes). In some MAC control packets, e.g., channel contention packets, the MAC address may constitute over 90% of the packet content. Since the channel contention packets are the most likely packets to collide on the channel, they are frequently retransmitted. These transmissions and retransmissions constitute overhead that contributes a large portion to the overall MAC layer overhead.

Broadcast transmissions are transmissions that are sent by a single station and destined to all the stations in the network. In networks wherein all stations in the logical network can connect with all other stations, a single broadcast transmission is adequate for all stations to receive the transmission. If this is not the case, however, and it is required that all stations receive the broadcast transmission, then a more elaborate broadcast transmission technique must be used. Such transmission methods are commonly referred to as flooding and are based on repeated transmissions of the original broadcast transmission by many stations (possibly all) on the network.

If the physical network is very large, however, containing many logical networks, simple flooding will cause the original transmission to be unnecessarily transmitted an extremely high number of times causing congestion throughout the entire physical network. Reducing the number of these transmissions is possible by predefining a number of logical networks and having only stations in the same logical network repeat the original transmission. The drawback of this scheme is that different logical networks must be defined in the MAC layer which in some applications is an impractical requirement.

Multicast transmissions are sent by a single station to a predefined group of stations. Since managing the acknowledgments from numerous stations is complicated, most multicast transmission methods do not support acknowledgments for multicast transmissions. One solution is to designate a single station that will return an acknowledgment. This single acknowledgment can be used to partially ensure that the multicast transmission did not collide on the channel. It does not, however, ensure that the transmission was correctly received by all stations in the multicast group. There is thus a need for a MAC protocol that supports acknowledgement from all stations in the multicast group even during poor channel conditions.

The MAC protocol should also support different types of traffic. Traffic may be differentiated into: (1) real time traffic which is traffic that is sensitive to time of delivery wherein if the transmission was not accomplished in a given period the traffic is effectively lost and can be discarded and (2) non real time traffic which is traffic that is virtually insensitive to time of delivery wherein the transmission can be accomplished at any given period after request from the host.

The MAC layer is responsible to deliver adequate service to the upper protocol layers, which means that high priority traffic must be given precedence in access to the channel over low priority traffic. A requirement of the MAC protocol is to provide some type of channel access priority on top of a backoff algorithm. Use of consecutive backoff periods would allow for channel access priority on a per traffic type basis. A disadvantage is that this would require a large backoff period whereby each priority would require the same backoff size calculated for the entire network since it is unknown how many stations are transmitting at a given priority at any given time. Such as large backoff period would increase the MAC layer overhead considerably.

When not all the stations in a logical network are able to communicate with all other stations in the same logical network, the MAC layer should provide some form of repeater capability. This requires a station in the network to act as an intermediate between the source and destination stations. A problem arises in choosing an appropriate station that is able to communicate with both the source station and destination station. Making such as choice is difficult because there is no prior knowledge of network conditions since the condition of the network is changing all the time. In addition, in ad-hoc networks such as powerline networks, there is no knowledge of the stations that are online at any given instant in time in the network and management of this information is nearly impossible.

The MAC protocol should also able to handle the transmission of packets at least as large as 1500 bytes (corresponding to the maximum Ethernet frame size) and as small as 64 bytes (corresponding to the minimum Ethernet frame size) or even smaller.

A simple MAC protocol would transmit an entire packet in a single transmission once the channel is captured. A disadvantage is that a very long time may be required to complete the transmission of a large packet thus causing real time traffic to be delayed and eventually discarded. Thus, there is a need for a MAC protocol that permits fragmentation of original packets into smaller portions that are transmitted one fragment at a time. Between each fragment the channel should be released and other stations that might hold time sensitive traffic should be allowed to transmit.

On the other hand, small size packets increase the overhead of the MAC layer considerably since header overhead and contention overhead is constant and is not dependent on packet size. It is therefore desirable to be able to support both large packet fragmentation and small packet accumulation thus permitting efficient transmission of data.

SUMMARY OF THE INVENTION

The present invention is a novel and useful media access control (MAC) protocol that is intended for use over noisy shared media channels. The MAC protocol of the present invention is particularly applicable to power line based communications systems but can also be used with other media such as wireless, infrared, twisted pair, etc. and other applications such as network access. The MAC protocol is suitable for use in communications over the power line in different environments including home, office, enterprise, factory, etc. The MAC protocol provides an effective channel access mechanism that enables efficient and reliable packet transport for any type of connection, i.e. unicast, broadcast and multicast.

The MAC protocol when used to provide communications over a network using a shared medium, provides several advantages over prior art protocols by including the following capabilities (1) an efficient backoff mechanism for CSMA/CA channel access, (2) efficient and compact link addressing that reduces the overhead of long MAC addresses, (3) a flooding scheme having controlled exposure for broadcast transmissions, (4) multicast transmissions using selective ACKs, (5) implementation of traffic prioritization using an adaptive backoff scheme, (6) providing a second layer repeater establishment process and (7) multi-packet transport for short packets and fragmentation for long packet transport.

The MAC protocol incorporates several mechanisms that address the special nature and unique requirements of the powerline carrier media including means for significantly improving the quality of service and throughput of the PLC channel. The MAC of the present invention incorporates the following elements and features including an Access Mechanism comprising a CSMA/CA technique using a RTS/CTS mechanism, physical and virtual carrier sense functions to ensure a minimum number of collisions on the channel and channel capture by both the transmitting station and the receiving station.

The protocol also comprises Frame and Packet Transport including support for transmission of a single Ethernet packet within one burst, support for short packet transmission without using a RTS/CTS mechanism, support for PLC based broadcast and multicast transmissions, the discarding of time out packets, ARQ and partial ARQ for frame transmission and for broadcast and multicast frames and support for second layer repeater mechanism.

Also included in the protocol are Quality of Service (QoS) features including multi-level priority classes, a limit on maximum channel capture time, adaptive backoff and multiple contention windows based on priority class and a contention free period to allow a station to take control of the channel for an extended period of time.

Management features include logical network definition through network key assignment, use of a special 16 bit link address for addressing rather than two 48 bit source and destination MAC addresses, support for adaptation of rate and power according to channel quality and provision of link status updated by both the PHY and MAC layers.

It is noted that many aspects of the invention may be constructed as software objects that execute in embedded devices as firmware, software objects that execute as part of a software application on a computer system running an operating system such as Windows, UNIX, LINUX, etc., an Application Specific Integrated Circuit (ASIC), Field Programmable Gate Array (FPGA) or functionally equivalent discrete hardware components.

There is thus provided in accordance with the present invention a method of accessing a channel in a communication transceiver coupled to a communications channel, the transceiver adapted to provide carrier sense signals including a fast carrier detect (FCD) generated relatively shortly after the start of transmission, having a high false alarm rate and indicating that a transmission may be starting and a carrier detect (CD) signal generated a relatively long time after the start of transmission, having a low false alarm rate and indicating that a transmission is starting, the method comprising the steps of establishing a channel contention period upon termination of a current transmission session, the channel contention period divided into a plurality of time slots, the width of each time slot substantially equal to the time of the FCD signal, initializing a backoff counter with a backoff count equal to a random number of time slots, decrementing the backoff counter while the medium is idle, suspending the backoff counter upon receipt of a FCD signal, resuming decrementing the backoff counter upon failure of a CD signal to arrive within a CD time, deferring transmission until a next contention period upon receipt of a CD signal and starting transmission upon expiration of the backoff counter.

There is also provided in accordance with the present invention a method of accessing a channel in a communication transceiver coupled to a communications channel, the method comprising the steps of establishing one or more contention windows upon termination of a current transmission session, each contention window assigned a priority and subdivided into a plurality of backoff time slots, deferring zero or more contention windows until arrival of a contention window whose priority corresponds to the priority of a particular transmission, initializing a backoff counter with a backoff count equal to a random number of backoff time slots, decrementing the backoff counter while the medium is idle and attempting to reserve the channel upon expiration of the backoff counter.

There is further provided in accordance with the present invention a carrier sense multiple access (CSMA) based communications system wherein transmissions are preceded by a contention phase during which one or more transmitters compete for access to a channel comprising means for establishing one or more contention windows, each contention window assigned a priority, means for dividing each contention window into a plurality of backoff time slots wherein detection of a carrier sense signal during a time slot potentially indicates that the channel is busy, backoff means adapted to count using a backoff timer a randomly selected backoff time equal to a multiple of a the backoff time slot and reservation means adapted to attempt reservation of the channel upon expiration of the backup timer and to enable transmission upon successful reservation of the channel.

There is also provided in accordance with the present invention a communications transceiver for transmitting and receiving over a carrier sense multiple access (CSMA) frame based communications network wherein frame transmissions are separated by a contention interframe space (CIFS) during which one or more nodes compete for access to the network comprising a coupling circuit for generating a receive signal received over the network and for outputting a transmit signal onto the network, a transmitter adapted to modulate data to be transmitted in accordance with a modulation scheme so as to generate the transmit signal therefrom, a receiver adapted to demodulate the receive signal in accordance with the modulation scheme so as to generate a receive data signal therefrom and adapted to generate carrier sense signals including a fast carrier detect (FCD) generated relatively shortly after the start of transmission, having a high false alarm rate and indicating that a transmission may be starting and a carrier detect (CD) signal generated a relatively long time after the start of transmission, having a low false alarm rate and indicating that a transmission is starting, a media access control (MAC) comprising means adapted to: establish one or more contention windows upon termination of a current transmission session, each contention window assigned a priority and subdivided into a plurality of backoff time slots, defer zero or more contention windows until arrival of a contention window whose priority corresponds to the priority of a particular transmission, initialize a backoff counter with a backoff count equal to a random number of backoff time slots, decrement the backoff counter while the medium is idle and attempt to reserve the channel upon expiration of the backoff counter and transmit onto the channel upon successfully reserving the channel and a processor adapted to control the operation of the transmitter, receiver and MAC and to provide an interface between the MAC and an external host.

There is further provided in accordance with the present invention a computer readable storage medium having a computer program embodied thereon for causing a suitably programmed system to access a channel in a carrier sense multiple access (CSMA) frame based communications system wherein frame transmissions are separated by a contention interframe space (CIFS) during which one or more transmitters compete for access to the channel by performing the following steps when such program is executed on the system: establishing one or more contention windows upon termination of a current transmission session, each contention window assigned a priority and subdivided into a plurality of backoff time slots, deferring zero or more contention windows until arrival of a contention window whose priority corresponds to the priority of a particular transmission, initializing a backoff counter with a backoff count equal to a random number of backoff time slots, decrementing the backoff counter while the medium is idle, attempting to reserve the channel upon expiration of the backoff counter and transmitting onto the channel upon successful reservation of the channel.

There is further provided in accordance with the present invention a method of accessing a communications channel in a network including a plurality of stations, the method comprising the steps of establishing one or more contention windows in which the plurality of stations compete for access to the communications channel, assigning a different priority to each of the one or more contention windows, initializing a backoff counter with a backoff count equal to a random number of backoff time slots, waiting until the arrival of a contention window having a priority corresponding to the priority of transmission of the particular station and upon the arrival thereof decrementing the backoff counter while the medium is idle and attempting to reserve the communications channel upon expiration of the backoff counter.

There is still further provided in accordance with the present invention a method of accessing a communications channel in a network including a plurality of stations, the method comprising the steps of establishing one or more contention windows in which the plurality of stations compete for access to the communications channel, assigning a priority to each of the one or more contention windows, initializing a backoff counter with a backoff count equal to a random number of backoff time slots, waiting until the arrival of a contention window having a priority corresponding to the priority of transmission of the particular station and upon the arrival thereof decrementing the backoff counter while the medium is idle, attempting to reserve the channel upon expiration of the backoff counter and adjusting the size of a contention window as a function of the number of stations contending for the communications channel in the contention window.

There is also provided in accordance with the present invention a method of accessing a communications channel in a network including a plurality of stations, the method comprising the steps of establishing one or more contention windows in which the plurality of stations compete for access to the communications channel, estimating the number of stations in the network as a function of the size of a current contention window and the time t which is the actual time from the moment the stations are allowed to transmit until one station starts transmitting, adjusting the size of each of the one or more contention windows as a function of the estimated number of stations in the network and each station deferring an attempt to reserve the communications channel until the arrival of a contention window associated with the particular transmission.

There is also provided in accordance with the present invention a method of accessing a communications channel in a network including a plurality of stations, the method comprising the steps of each station generating a virtual carrier sense signal indicating that the communications channel is busy and transmitting a message onto the network containing an updated reservation counter time when the virtual carrier sense signal indicates the communication channel is currently busy and the station currently reserving the communications channel determines that the reservation counter associated with its session is to be updated.

There is further provided in accordance with the present invention a method of accessing a communications channel in a network including a plurality of stations, the method comprising the steps of detecting one or more sessions established between stations in the network, maintaining a reservation counter in each station for each session detected by a particular station, the reservation counter holding a reservation time, decrementing each reservation counter periodically and considering the communications channel as being released when the reservation counter with the maximum reservation time expires.

There is also provided in accordance with the present invention a method of accessing a communications channel in a power line carrier based network including a plurality of stations, the method comprising the steps of establishing one or more contention windows in which the plurality of stations compete for access to the communications channel, assigning a different priority to each of the one or more contention windows, each station sensing the communication channel for the presence of carrier signal, each station wishing to transmit, selecting a random backoff time, each station waiting until the arrival of a contention window having a priority associated therewith corresponding to the priority of transmission of the particular station, within the contention window having matching priority, waiting random backoff time, upon expiration of the backoff time, attempting to reserve the communications channel and suspending countdown of the backoff time if presence of carrier signal is detected.

There is further provided in accordance with the present invention a method of accessing a communications channel in a network including a plurality of stations, the method comprising the steps of establishing one or more contention windows in which the plurality of stations compete for access to the communications channel, initializing a backoff counter with a backoff count equal to a random number of backoff time slots, waiting until the arrival of a contention window corresponding to the particular transmission and upon the arrival thereof decrementing the backoff counter while the medium is idle, attempting to reserve the channel upon expiration of the backoff counter, declaring the existence of a hidden station after a predetermined number of failed attempts to reserve the communications channel; and in accordance therewith, increasing the width of the backoff time slot and repeating the steps of initializing, waiting and attempting to reserve the communications channel.

There is also provided in accordance with the present invention a method of accessing a communications channel in a network including a plurality of stations, the method comprising the steps of segmenting a transmission session into a plurality of frames, establishing one or more contention windows in which the plurality of stations compete for access to the communications channel, initializing a backoff counter with a backoff count equal to a random number of backoff time slots, waiting until the arrival of a contention window corresponding to the particular transmission and upon the arrival thereof decrementing the backoff counter while the medium is idle, attempting to reserve the channel, upon expiration of the backoff counter, for a duration sufficient to transmit the plurality of frames, transmitting the plurality of frames from a transmitting station to a receiving station and the receiving station transmitting an ACK reply to the transmitting station containing a plurality of ACK bits, each ACK bit indicating whether one of the frames is to be retransmitted.

There is still further provided in accordance with the present invention a method of accessing a communications channel in a network including a plurality of stations, the method comprising the steps of estimating the number of stations in the communications network in accordance with the following $$N_{estimated} = \frac{CW}{t} - 1$$

where the expected value of t is given by $$E[t] = \frac{CW}{N+1}$$

and wherein CW represents the width of one of one or more contention windows within which each station randomly selects a backoff time slot, N is the number of stations contending for the channel at any given time, t is the actual time from the moment the stations are allowed to transmit until one station starts transmitting and E(t) is the expected value of t.

There is also provided in accordance with the present invention a method of accessing a communications channel in a network including a plurality of stations, the method comprising the steps of transmitting messages from a transmitting station to a receiving station, the receiving station transmitting an acknowledge message following the receipt of a message, the transmitting station sending a request acknowledge (RA) message to the receiving station upon failure to receive the acknowledge message and the transmitting station repeatedly sending a RA message to the receiving station upon continued failure of the transmitting station to receive the acknowledge message.

BRIEF DESCRIPTION OF THE DRAWINGS

The invention is herein described, by way of example only, with reference to the accompanying drawings, wherein:

FIG. 38 is a block diagram illustrating an example station adapted to perform the

DETAILED DESCRIPTION OF THE INVENTION

Notation and Definitions

Figure 1:
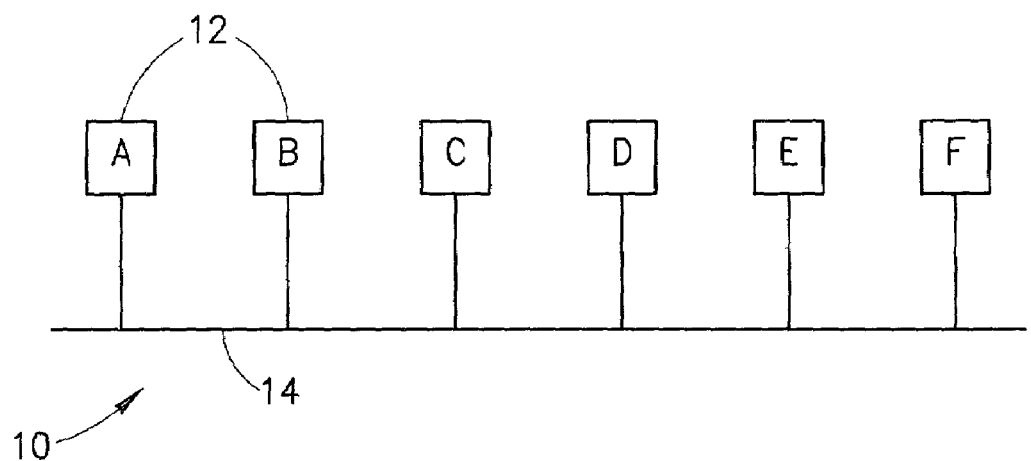
FIG. 1 is a block diagram illustrating an example communications system including a plurality of stations coupled to a shared medium such as the powerline.

The following notation and definitions apply throughout this document.

| Term | Definition |
| --- | --- |
| ACK | Acknowledge |
| ACK_Time | ACK transmit time |
| Ack_Timeout | The time until an ACK packet is received |
| ARQ | Address Request |
| ASIC | Application Specific Integrated Circuit |
| Backoff | Current value of the backoff |
| Backoff_SlotTime | The time it takes to detect CD |
| BID | ID number of broadcast message |
| BID_Length | Broadcast ID length |
| BLA | Broadcast Link Address |
| CD | Carrier Detect |
| CIFS | Contention Interframe Space |
| CPU | Central Processing Unit |
| CQ | Channel Quality |
| CRC | Cyclic Redundancy Check |
| CS | Carrier Sense |
| CSMA/CD | Carrier Sense Multiple Access with Collision Detection |
| CSMA/CA | Carrier Sense Multiple Access with Collision Avoidance |
| CSR | Channel Sounding Request |
| CT | Conditional Transmission |
| CTS | Clear to Send |
| CTS_Time | CTS transmit time |
| CTS_Time_Meas | Transmission time of CTS frame measured by the receiver |
| CTS_timeout | The time until an CTS packet is received |
| CW | The current backoff range value |
| CWMax | The maximal value of backoff range |
| CWMin | The minimal value of backoff range |
| Data_Retries_Threshold | Maximum retries per session |
| DATA_Time | Data transmit time |
| Data_Time_Meas | Transmission time of Data frame measured by the receiver |
| DataNum | Number of data frame in session |
| DataNumRetries | Number of data frame retries |
| DC | Data/Control |
| DecPLRThreshold | Decrease PLR state threshold |
| Destination | The node that is receiving |
| DR | Double Rate |
| DSP | Digital Signal Processing |
| Dup_Add | Duplicate address, two nodes with the same logical address |
| Dup_Add_discovered | Inform the existence of a Dup_Add situation to the network. |
| EC | Establish Connection |
| EC_Timeout | The time until an EC frame is received |
| EEROM | Electrically Erasable Read Only Memory |
| EIA | Electrical Industries Association |
| EIFS | Extended Interframe Space |
| EOP | End Of Packet |
| ErrDataFrame | Number of erroneous data frames receive from a specific link |

-continued

| Term | Definition |
| --- | --- |
| FAIL_Time | Station wait time when a transmission failed due to lack of resources |
| FC | Fail Connection |
| FCD | Fast Carrier Detect |
| FCS | Frame Check Sequence |
| FPGA | Field Programmable Gate Array |
| Fragment | A portion of host data encapsulated in a frame |
| FragmentLength | Maximum fragment length |
| FragmentThreshold | Host packet length limit for fragmentation |
| Frame | Data unit in the MAC layer including all headers, host data and all trailers |
| FT | Frame Type |
| GSR | Gathered Statistics Response |
| GT | Global Time |
| GTUR | Global Time Update Response |
| HTL | Hops To Live |
| IEEE | Institute of Electrical and Electronic Engineers |
| IncPLRThreshold | Increase PLR state threshold |
| IncPLRThreshold | Increment PLR state threshold |
| IR | Infra Red |
| ISO | International Standards Organization |
| LA | Link Address |
| LAN | Local Area Network |
| LAS | Link Address Set |
| LASR | Link Address Set Response |
| LASR_Timeout | The time until LASR packet is received |
| LastPL | Last power level that was used in a specific link |
| LastRate | Last rate that was used in a specific link |
| LDA | Link Destination Address |
| LE | Link Exist |
| LE_interval | Link Exist Interval |
| LER | Link Exist Response |
| LSA | Link Source Address |
| LST | Long Session Transport |
| MAC | Media Access Control |
| MAX_HTL | Maximum hopes for transmitting broadcast message |
| MAX_LAS_retries | Total number of LAS retries |
| MAX_LASR_retries | Total number of LASR retries |
| MAX_Length | Maximum length of host packet |
| MAX_Packet_Timeout | Maximum value of time to live timer |
| Max_RA_retries | Total number of RA retries with an increment of backoff range (default = 3) |
| MAX_Repeater_retries | Total number of repeater process retries |
| MAX_RS_retries | Total number of RS retries |
| Max_RTS_retries | Total number of RTS retries with an increment of backoff range (default = 3) |
| MaxFragNumber | Maximum number of fragment in a session |
| MD | Management Data |
| MDA | MAC Destination Address |
| MLA | Multicast Link Address |
| MSA | MAC Source Address |
| MT | Management Type |
| NACK | Negative Acknowledge |
| NeighboredStations | Database for collecting statistics information |
| NID | Network ID |
| NumOfGoodSessions | Number of good sessions for decreasing power level or increasing rate |
| NumOfNodes_IHeard | The number of nodes that a station heard transmitting |
| OD | Original destination |
| ODM | Original Destination MAC |
| OS | Original source |
| OSI | Open Systems Interconnect |
| OSM | Original Source MAC |
| Packet | Data received from the host |
| Packet_Timeout | Maximum time for transmitting a host packet |
| PBX | Private Branch Exchange |
| Pending_Timeout | Timeout for holding part of a packet |
| PL | Power Level |
| PLC | Powerline Carrier |
| PLDecThreshold | Power level decrement threshold |
| PLIncThreshold | Power level increment threshold |
| PLR | Power Level and Rate |
| PLR State | Power Level and Rate State |
| PLR_interval | Power level and rate interval |
| PrErrData | The percentage of erroneous data frames |
| QoS | Quality of Service |
| R | Rate |

-continued

| Term | Definition |
| --- | --- |
| RA | Request ACK |
| RA_First_retries | Total number of RA retries without increasing the backoff range (default = 1) |
| RA_Time | RA transmit time |
| RAM | Random Access Memory |
| RC | Repeater Cancel |
| RCR | Repeater Cancel Repeater |
| RDecThreshold | Rate decrement threshold |
| RES | Reservation |
| Retries_Threshold | Number of retries per ACK for determine when to abort the session |
| RF | Radio Frequency |
| RGTU | Request Global Time Update |
| RIFS | Response Interframe Space |
| RIncThreshold | Rate Increment threshold |
| ROM | Read Only Memory |
| RS | Repeater Search |
| RSA | Repeater Search Acknowledge |
| RSA_Timeout | The time until RSC packet is received |
| RSR | Repeater Search Response |
| RSR_Timeout | The time until RSR frame is received |
| RTS | Request to Send |
| RTS_First_retries | Total number of RTS retries without increasing the backoff range (default = 1) |
| RTS_Time | RTS transmit time |
| RTS_Transmit_Time | the time of RTS frame transmission |
| SCR | Silicon Controlled Rectifier |
| SCR | Source Cancel Repeater |
| Session_Timeout | Maximum time to capture the channel |
| SessionCapacity | The data capacity of a session in bytes |
| SID | Session ID |
| SOHO | Small Office/Home Office |
| SoundInterval | Channel sounding interval |
| Source | The node that is transmitting |
| SST | Short Session Transport |
| StatInterval | Statistics interval |
| SymbolTime | Duration of symbol in μs |
| Sync_Interval | Synchronization interval |
| Tick_Interval | Time between consecutive Ticks |
| TotalNumOfRecData | The total number of data frames received from specific link |
| Transmission Session | Transmitting up to 8 frames in sequence with a single acknowledgment |
| TSE | Time Stamp Exists |
| TTT | Time To Tick |
| VCS | Virtual Carrier Sense |
| VLA | Valid Link Address |
| WAN | Wide Area Network |

DETAILED DESCRIPTION OF THE INVENTION

The present invention is a power line carrier (PLC) based media access control (MAC) protocol that is intended for use over a wide range of different types of communications systems and channels. The MAC protocol of the present invention is particularly applicable to noisy shared media channels such as power line carrier based communications system. The protocol can also be used with other media such as wireless, infrared, twisted pair, etc. and other applications such as network access. The MAC protocol is suitable for use in communications over the power line in different environments including home, office, enterprise, factory, etc. The MAC protocol provides an effective channel access mechanism that enables efficient and reliable packet transport for any type of connection, i.e. unicast, broadcast and multicast.

1 Functional Description 1.1 Architecture

A general description of the architecture of the MAC and link layer protocol of the present invention is presented below followed by a more detailed description of the functionality of the various features and provisions of the protocol. Note that although the MAC protocol is described in the context of a powerline carrier based network, it is not intended that the scope of the invention be limited thereby as one skilled in the art can apply the principles of the present invention to other types of networks and media as well.

1.1.11 Network Reference Model

Figure 2:
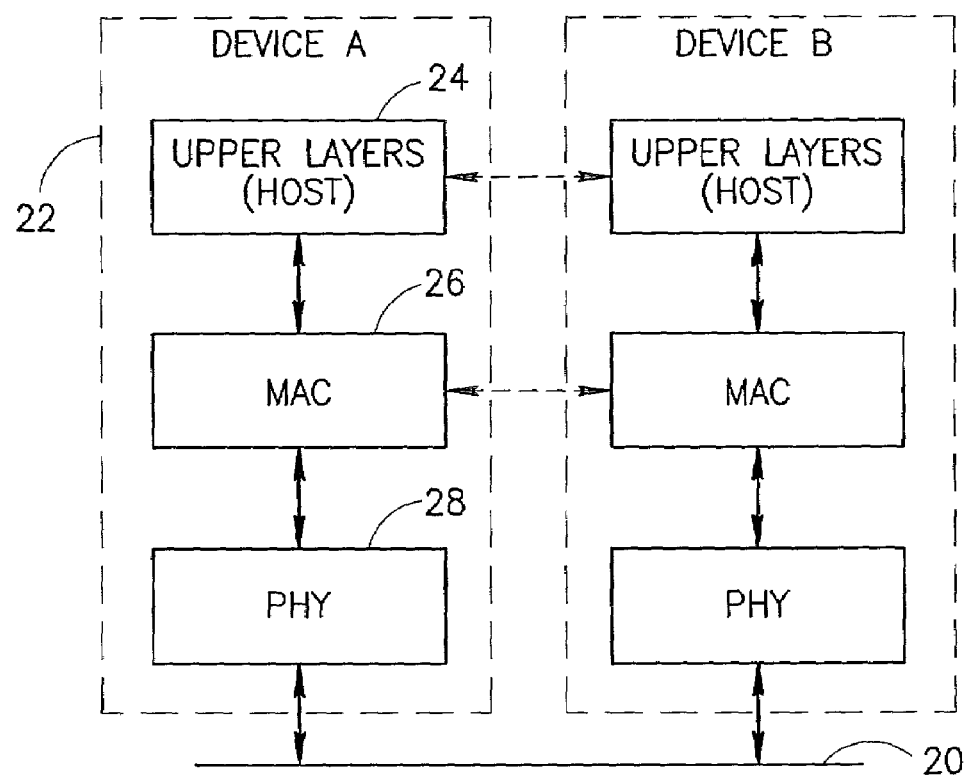
FIG. 2 is a diagram illustrating a reference model of the communications protocol stack implemented in each station connected to the network.

A diagram illustrating a reference model of the communications protocol stack implemented in each station connected to the network is shown in FIG. 2. The model comprises two communication devices 22, device A and device B. Each device comprises a PHY or physical layer 28 connected to the shared medium 20 (e.g., the power line), a link layer 26 provided by the MAC protocol of the present invention and a block representing the upper layers 24 including the application layer. Each of the various layers in the protocol stack in device A communicates with the corresponding layer in the protocol stack in device B as shown by the dashed bi-directional arrows. Note that the upper layers may be implemented (1) in an external host computing device while the MAC and PHY layers are implemented in a modem device optimized for power line carrier communications or (2) in the same device that the PHY and MAC layers are implemented in.

The PHY layer provides the physical interface to the medium, e.g., the electrical interface to the power line. The MAC layer provides packet transport services to the host and functions to transmit the data supplied by the host for communications over the network. The protocol between the host and the MAC provides specifications for priority, maximum delay and security requirements as indicated by the host to the MAC. The MAC provides the received data and reports back status to the host such as the detection of a link failure event.

1.1.2 Data Flow Process

Figure 3:
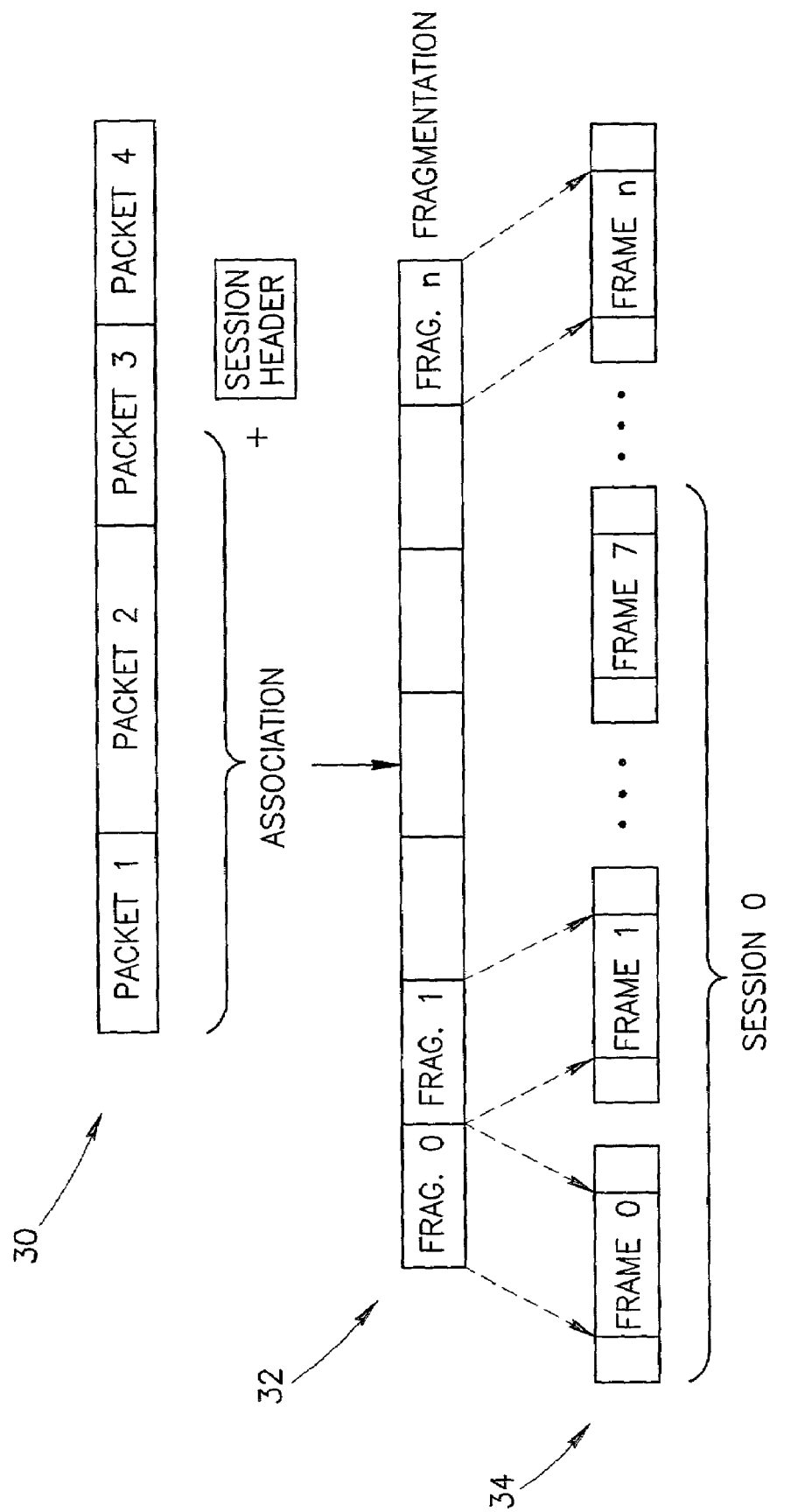
FIG. 3 is a diagram illustrating the data flow model of the MAC protocol of the present invention.

A diagram illustrating the data flow model of the MAC protocol of the present invention is shown in FIG. 3. Data packets 30 to be transmitted are transferred from the Host to the MAC. Data packets are limited to MaxLength bytes. In operation, the data packets received from the host are fragmented into a plurality of data fragments 32. These data fragments are then encapsulated with a header and frame control sequence (FCS) to form a MAC frame 34. Up to MaxFragNumber frames are associated to form a session whereby all the frames making up a session are sequentially consecutively transmitted to the receiving station.

1.2 Channel Access Mechanism

Channel access methods can be divided into the following two categories: (1) centrally controlled wherein a single station, referred to as the channel master, controls all access to the channel and allocates channel access to the stations in the network and (2) distributed control wherein all stations contend for the channel while obeying the access rules defined in the MAC protocol described herein.

The fundamental access method of the MAC of the present invention is a distributed access method termed Carrier Sense Multiple Access with Collision Avoidance (CSMA/CA) with random backoff. The carrier sense (CS) mechanism comprises a physical CS performed by the PHY layer and a Virtual CS (VCS) performed by the MAC layer. To transmit, a station selects a random backoff interval that decrements while the media is idle during the contention window allocated to the particular priority class of the frame to be transmitted. Stations decrement their backoff interval only during the contention window allocated to the priority class equal to or less then the priority of the frame awaiting transmission. When the backoff timer expires, the transmitting station proceeds with transmission if the channel is still idle. If the carrier sense mechanism determines the medium is busy, transmission is deferred until after the current transmission. The backoff mechanism is described in more detail infra in Section 6.3.

1.3 Determining the Virtual Carrier Sense

A virtual carrier sense mechanism is implemented by all stations on the network in order to improve the reliability of channel access. The virtual carrier sense is set based on information contained in the received frames. Stations use the information contained in the received frames to compute the expected busy condition of the medium that is then stored as the virtual carrier sense. The virtual carrier sense is always updated with the information from correctly received control frames (i.e. RTS, CTS, ACK, RA) or from special data frames. To support multiple transmissions occurring at the same time, each station maintains the virtual carrier sense on a per transmission basis, whereby the overall virtual carrier sense is set to the maximum.

1.4 Logical Networks

Logical networks are subsets of stations that operate as if they were uniquely separate networks. The definition of a logical network is provided through encryption and network key management. Each logical network has its own network key which functions to separate the information belonging to different logical networks. A station may participate in a number of logical networks.

1.4.1 Station Addressing

A link between two stations is defined using a 16 bit link address (LA) thus enabling close to $2^{16}$ links. The LA is used to identify both the transmitter and receiver stations participating in the transmission. The host requests transmission from the MAC layer using a 48 bit MAC address. To support 48 bit MAC addresses the MAC layer creates and maintains a table that represents the mapping between MAC addresses and LAs which is described in more detail infra in Section 8.1.

1.5 Packet Transport

The packets received by the MAC layer from the host layer undergo fragmentation and association to form MAC frames and MAC sessions. Fragmentation is the process of separating the host packets into smaller data fragments while association is the process of grouping a number of packets into a session. At the receiving station, each session is de-associated and defragmented in order to restore the original host packet. A packet is transferred to the host only after it has been completely restored.

The management of each host packet is accomplished using two parameters: (1) a packet timeout which determines the maximum time the packet is valid for transmission and (2) a priority level. The packet transport process is described in more detail infra in Section 2.

1.6 Session Transport

The MAC protocol is adapted to support two session formats: a Long Session Transport (LST) format and a Short Session Transport (SST) format. The LST type session is constructed from several data frames that are transmitted after the channel is captured using an RTS/CTS mechanism. The SST type session is constructed from a single data frame that is transmitted without acquiring the channel in advance. The SST type session may be used if the size of the packet does not exceed FragmentThreshold number of bytes, otherwise the LST session type is used. The transmission time of a session is bounded by the SessionTimeout parameter. Session transport is described in more detail infra in Section 3.

1.7 Second Layer Repeater

When a source station detects a link failure while communicating or attempting to communicate with its destination, it can utilize an intermediate station to transfer frames to the destination. The intermediate station functions as a second layer repeater. In operation, the entire session, including retransmissions, is transmitted to the repeater station whereby the data frames are then transmitted to the destination station under a new session. The second layer repeater and repeater establishment processes are described in more detail infra in Section 4.

1.8 Broadcast and Multicast

The MAC protocol of the present invention is adapted to support both broadcast and multicast transmissions with the options for partial or full ACK. Broadcast and multicast MAC addresses are transmitted using broadcast transmissions under the assumption that the upper layer is operative to filter the transmission. Multicast transmissions are initiated by specifically identifying the stations to be included in the multicast group.

1.9 Quality of Service

The MAC protocol is adapted to support the use of a plurality of priority classes that limits the maximum length of time (i.e. SessionTimeout parameter) that any one station can capture the channel for. In accordance with the invention, stations contend for control of the channel during a contention window allocated to a priority class equal to or less then the priority of the frame awaiting transmission. The channel contention process is performed in accordance with the back-off algorithm described in more detail infra in Section 6.

1.10 Network Synchronization

The MAC protocol also provides a mechanism for network synchronization. The network synchronization scheme provides a synchronization of better then 8 μsec between neighboring stations in the network. The synchronization scheme is described in more detail infra in Section 5 and in U.S. Pat. No. 6,907,472, entitled "Distributed Synchronization Mechanism For Shared Communications Media Based Networks," similarly assigned and incorporated herein by reference in its entirety.

1.11 Channel Sounding

The MAC protocol also provides a channel sounding mechanism that is used to determine the link quality between stations in the network. A station issues a channel sounding request by transmitting a channel sounding type management frame. The receiving station responds with a channel sounding response management frame that comprises the following parameters:

1. The channel quality (CQ) as calculated by the PHY layer for the last transmission (i.e. the channel sounding request).
2. The average channel quality (AvgCQ) for the last StatInterval.
3. The number (CS_TxDataCounter) of data frames transmitted in the last StatInterval seconds including retransmissions.
4. The number (CS_TxFailCounter) of corrupted data frames retransmitted within the last StatInterval seconds.

1.12 Statistics Gathering

In accordance with the MAC protocol, each station collects transmission and network statistical information that is stored internally. One or more of the following data may be collected and stored: the percentage of failed data frames per link; the number of data frames transmitted per priority; the number of data frames received per priority; the average channel quality table including the average channel quality per source; the data rate used for transmission to each station; and the transmission power level to each station. In addition, a station can request statistics from any other station using management frames as described in more detail infra in Section 9.3.2.12.

2 Packet Transport

2.1 Transmission Type

The MAC protocol is adapted to support three types of transmission: unicast, broadcast and multicast. The following sections give a detailed description of each transmission type.

2.1.1 Unicast Transmission

A unicast transmission is specified by the host to the MAC layer via the Ethernet MAC address of the destination station. The MAC layer translates the MAC address to a link address (LA) and uses the LA in subsequent transmissions. Link address management is described in more detail infra in Section 8.1. The packet is transmitted in accordance with the session transmission process described in more detail in Section 3.

2.1.2 Broadcast Transmission

Broadcast transmission is achieved using a flooding algorithm whereby every station in the network repeats the broadcast transmission. This ensures that every non-isolated station will receive the transmission. In a network that comprises a large number of stations and logical networks, the message will be spread throughput the entire media. In accordance with the invention, the spreading of the broadcast transmission is controlled to permit transmission to only a limited area of stations. Note that the network can be viewed as a collection of overlapping cells due to the limited range of the transmitted signal in powerline carrier shared media.

Control of the spreading of the broadcast transmission is achieved using the concept of the number of hops required to go from one station to another. The number of hops is defined as the minimum number of times a message is to be transmitted by the source station and intermediate stations before it is expected to reach the destination station. The flooding broadcast algorithm of the MAC protocol is described below. The configurable algorithm uses the hop parameter to limit the retransmission of the broadcast message.

The host specifies a broadcast transmission using an Ethernet broadcast MAC address. The Ethernet broadcast MAC address is translated using a broadcast link address. The broadcast session comprises a counter, a hops to live (HTL) field that indicates the maximum number of times the message is to be retransmitted and a unique broadcast ID number (BID) that uniquely identifies the message. Broadcast messages also comprise the source MAC address to permit a response if necessary.

The original transmitting station initializes the HTL counter to the maximum number of requested hops. Each station receiving the broadcast message decrements the HTL field by one and retransmits the message if the HTL field is not zero and the station did not previously transmit the message. A station retransmits a broadcast message only once. The original transmitting station initializes the HTL field in accordance with the required area over which the message is to be broadcast. Each station decrements the counter before retransmission. The message is retransmitted hop by hop until the HTL field reaches zero which terminates the retransmission process. For example, an initial HTL value of 1 indicates no retransmissions and an initial HTL value of 2 indicates one retransmission is permitted.

The use of a BID field prevents endless loops whereby messages already broadcast are heard by the same station and re-broadcast. The original source randomizes the BID value from a list of unused BID values. Each time a station receives a broadcast message it updates the unused BID values in its list. A used BID value saved for BID_Timeout before it is released and added to the unused list.

Contention for the channel is accomplished using a RTS frame with a broadcast link address which is immediately followed by the broadcast transmission. Each retransmission uses a larger than normal backoff. The source station uses the RTS frame to capture the line before initiating the broadcast message. The RTS is transmitted using a broadcast link address followed by a broadcast message.

Figure 4:
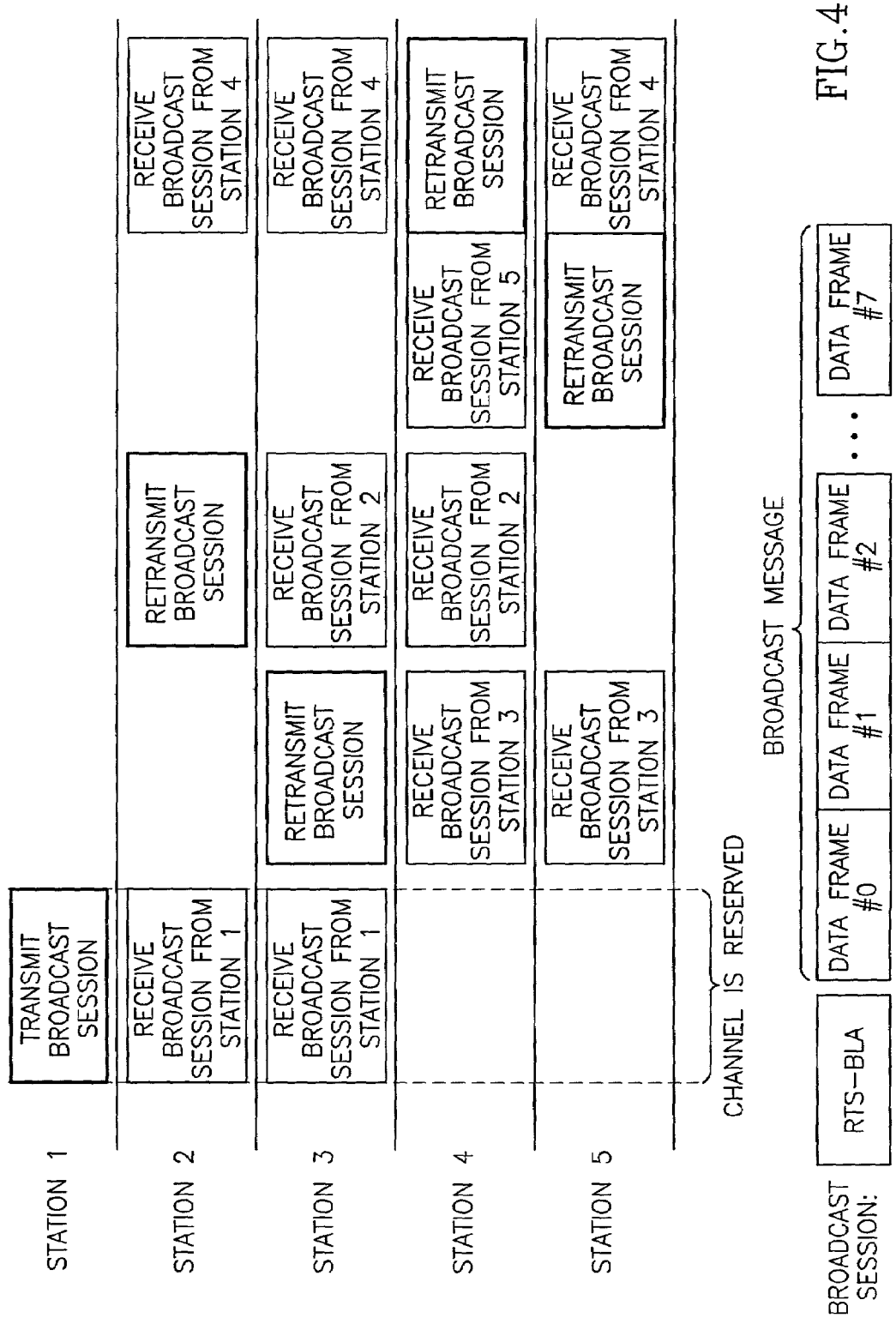
FIG. 4 is a diagram illustrating the broadcast transmission process of the MAC protocol of the present invention.

A diagram illustrating the broadcast transmission process of the MAC protocol of the present invention for a network of five stations is shown in FIG. 4. Station 1 transmits the original broadcast session with the HTL field defined according to the desired area spread for the session. The channel is reserved using the RTS and BLA LA for the original transmission of the broadcast packets from Station 1.

The original broadcast session is heard by Stations 2 and 3 which retransmit the session only once. The retransmissions are heard by Stations 4 and 5 which subsequently retransmit the session. Note that each station transmits the session only once regardless of the number of times it receives the session from other stations. Duplicate sessions are discarded by each station.

2.1.3 Multicast Transmission with Selective Acknowledgement

In accordance with the MAC protocol of the present invention, multicast transmissions are enabled wherein the source station can specify which of the stations in the multicast group are required to ACK the message. The source station may select zero or more stations from the multicast group in any desired combination. The source station specifies the stations which are to reply with an ACK by setting a bit in the message. The message also indicates the order in which the stations are to reply.

The host specifies a multicast transmission by one of the following two ways: (1) using an Ethernet multicast MAC addresses (0x01:00:5E:xx:xx:xx) or (2) using a predefined multicast group defining a plurality (e.g., 16) of stations within the group. Ethernet multicast MAC addresses are translated into broadcast transmissions and are transmitted as described above in Section 2.1.2.

A predefined multicast group transmission is handled as follows. A station uses the RTS packet for initially contending for the channel. The RTS packet is sent using a multicast link address (MLA). The multicast message immediately follows the RTS packet. The multicast message comprises the number of stations in the group, the link addresses of the stations and a bit for each station indicating if an ACK is required. Each station required to transmit an ACK transmits the ACK in the order specified in the address list without backoff or contention. The multicast frame structure is described in more detail infra in Section 2.1.3.

Figure 5:
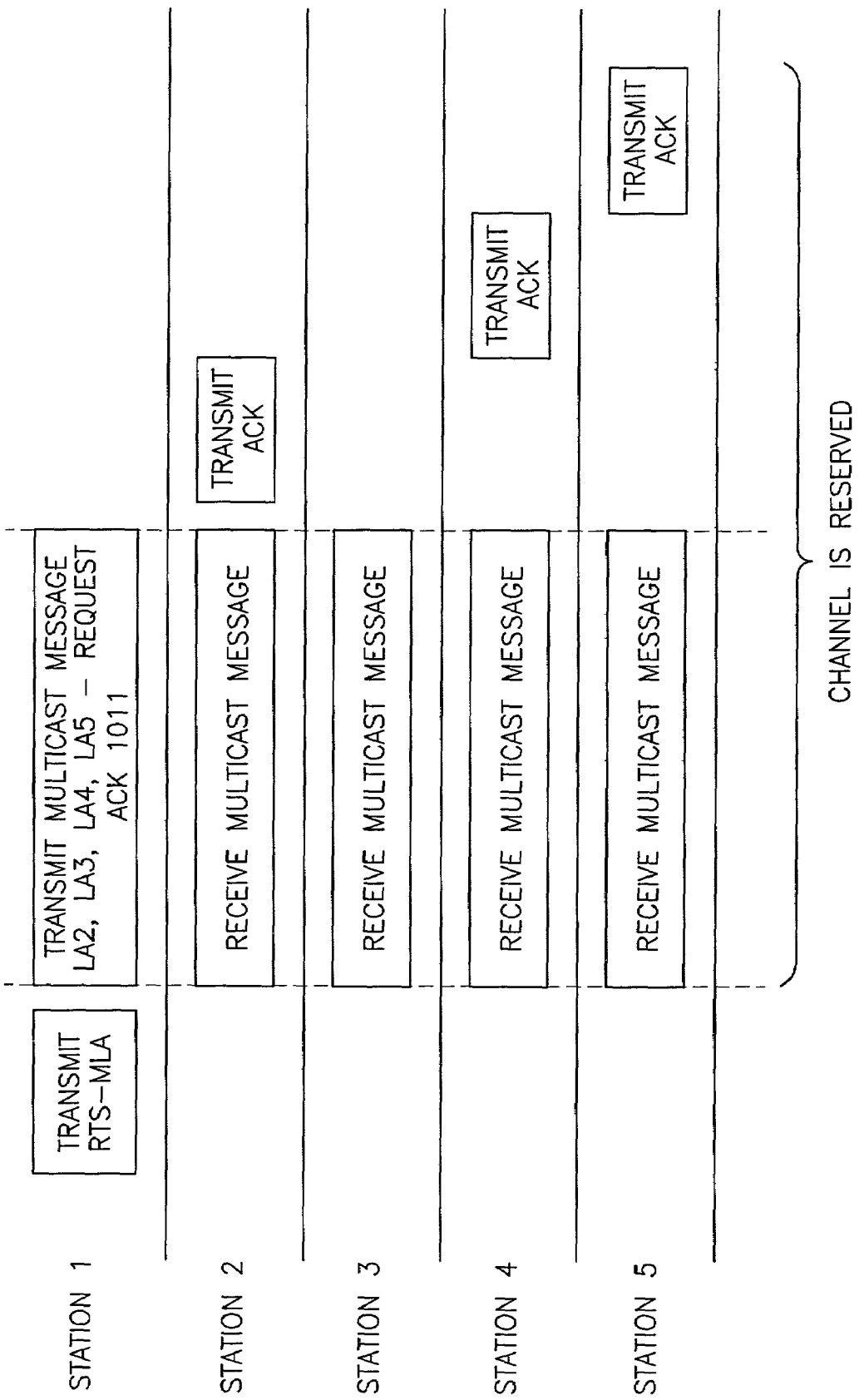
FIG. 5 is a diagram illustrating the multicast transmission process of the MAC protocol of the present invention.

A diagram illustrating the multicast transmission process of the MAC protocol of the present invention for an example network of five stations is shown in FIG. 5. Station 1 first reserves the channel for the duration of the original multicast transmission and any required ACKs using the RTS/MLA packet. The multicast message transmitted comprises the link addresses for Stations 2, 3, 4 and 5. The message also comprises the ACK required bits which in this example are set to '1011' indicating the requirement of an ACK for Stations 2, 4 and 5 but not Station 3. After receiving the multicast message, Stations 2, 4 and 5 transmit their ACK packets in the same order as in the original multicast message.

2.2 Packet Timeout

In accordance with the invention, the host may indicate a Packet_Timeout to the MAC layer which is defined as the maximum allowed delay for transmission of the packet transferred from the host. After expiration of the Packet_Timeout, the packet is dropped and not transmitted. In the event the host does not specify a Packet_Timeout, a Default_Packet_Timeout is used.

When a packet is received from the host, a Packet_Timeout timer is initialized to the value of Packet_Timeout. When a predefined threshold Packet_Timeout_Threshold is reached, the packet priority is incremented by one and contention for the channel is attempted using the new priority. When the Packet_Timeout timer expires, the transmission is aborted and the packet is dropped. The transmission abort is described in more detail infra in Section 3.6. Note that when a repeater is used, the source station transmits the Packet_Timeout timer value in the first data frame of the session.

2.3 Packet Time Stamp

To support higher layer synchronization, the MAC protocol of the present invention is adapted to enable both the transmitting and receiving station to synchronize to the clock of the transmitting MAC. To accomplish this, when requested, the transmitter MAC adds a time stamp $t_1$ to the packet. The receiver MAC adds its time stamp to the packet before sending it to the transmitter station. Both the transmitter station and receiver station have access to the clock of their respective MAC layers. The receiver host calculates the time at the transmitter MAC using the following:

$$t = t_1 - (r_2 - r_1) \qquad (1)$$

where t is the current time at the transmitter;

$t_1$ time stamp included in the packet by the transmitter;

$r_1$—Time stamp indicated by the receiver, when the packet was received;

$r_2$—current time at the receiver;

Note that time stamp $t_1$ is added by the transmitter to the payload header as indicated in section 7.5.2.1

3 Session Transport

In the MAC protocol, communications between stations take place during sessions. A session is defined as the logically related transmissions between two stations including contention frames (RTS/CTS), data frames, ACK frames and any subsequent retries. Packets received from the host are associated together so as to form sessions. The association process allows for the segmentation of a large packet into multiple sessions or the accumulation of several small packets into one session.

The two types of session transport supported include long session transport (LST) and short session transport (SST). In LST sessions, the channel is captured and reserved using the RTS/CTS mechanism. The session is composed of up to MaxFragNumber variable size frames and includes any required retransmissions. In SST sessions, the channel is not reserved prior to session transport. The session is composed of a single frame, and includes any required retransmissions. The size of the fragment is limited to FragmentThreshold bytes. Detailed descriptions of the two session transport processes are given in the following sections.

At the transmitter, incoming data packets from the host are first associated into one or more MAC sessions and then fragmented into a plurality of MAC frames. At the receiver, data received from the PHY layer is first defragmented from MAC frames to create sessions and then disassociated into packets to be transferred to the host. Detailed descriptions of the association/dissociation and fragmentation/defragmentation processes are given in the following sections.

3.1 Long Session Transport (LST) Process

Figure 6:
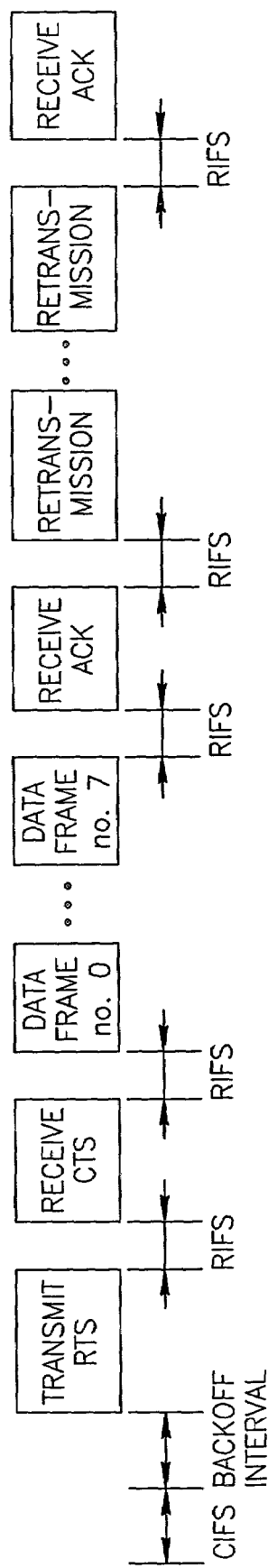
FIG. 6 is a diagram illustrating the long session transport (LST) transmission process of the MAC protocol of the present invention.

An LST session may comprise up to MaxFragNumber data frames, whereby the size of each frame is determined using the process detailed below. A diagram illustrating the long session transport (LST) transmission process of the MAC protocol of the present invention is shown in FIG. 6. Channel access is accomplished using an RTS control frame after the contention interframe space (CIFS) and backoff interval. A response interframe space (RIFS) separates the transmitted packets. Following the CTS packet, the data frames are transmitted followed by the ACK and any retransmissions.

3.2 Short Session Transport (SST) Process

An SST session may be used for the transmission of sessions of up to FragmentThreshold bytes. An SST session comprises a single frame (including any necessary retransmissions). The SST packet is used in the same manner as the RTS packet for the purposes of channel contention and in the event of a collision the same backoff process is used as for the RTS frame.

Figure 7:
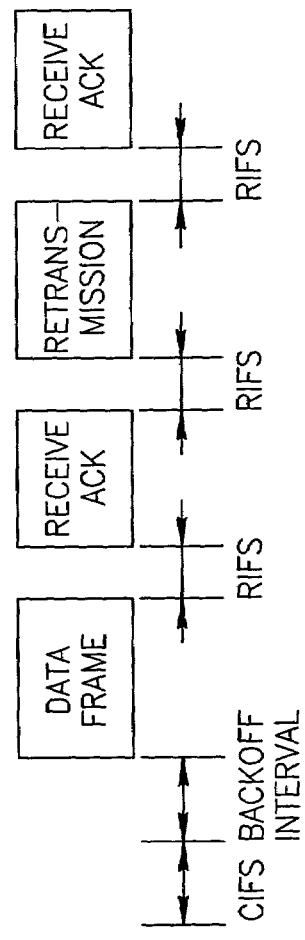
FIG. 7 is a diagram illustrating the short session transport (SST) transmission process of the MAC protocol of the present invention.

The SST session may or may not use an ACK or a retransmission process. If no ACK is used, then there is no retransmission and the session is complete after transmission of the single frame. Note that in this case, there is no possibility of detecting collisions. A diagram illustrating the short session transport (SST) transmission process of the MAC protocol of the present invention is shown in FIG. 7. Channel access is accomplished using the data frame itself after the CIFS and backoff interval. A RIFS separates the transmitted packets. Following the data frame, the destination replies with an ACK followed by any retransmission and subsequent ACK.

3.3 Association and Dissociation

In accordance with the invention, the association process is defined as the process of merging and dividing packets into multiple MAC sessions. Dissociation is the opposite process and is defined as the extraction of packets from the received session. Incoming packets are divided into data sessions of length up to SessionCapacity which is a parameter calculated by each station as described infra.

Association is performed only on packets having the same destination station. The priority of the session is equal to the lowest priority of the packet in the session. A session header is added at the beginning of each session. The session header is used to disassociate the session and contains information about the session and the packets within the session. The receiver supports at least one pending packet per source station. In the event that a new session with a new packet is received and the receiver does not have sufficient resources to process the incoming packet, the pending packet is discarded.

3.3.1 Session Capacity Calculation

The SessionCapacity (SC) parameter is calculated using the following $$SC = m \times n \quad (2)$$

where $$n = \min\left(8, \frac{Q}{MinFL}\right) \quad (3)$$

$$m = \min(FL1, FL2) \quad (4)$$

$$m_{FL1} = \max(MinFL, CQFL) \quad (5)$$

$$m_{FL2} = \frac{\frac{Session\_Timeout}{SymbolTime} \times \text{number of bits per symbol}}{n} \quad (6)$$

and where n is the number of data frames in a session (e.g., maximum 8);

m is the number of bytes in a fragment;

FL is the fragment length;

MinFL is the minimum fragment size (e.g., 64 bytes—with 20% overhead per data frame);

Q is the number of data bytes waiting in the queue;

Session_Timeout is the maximum duration of a session;

CQFL is the fragment length determined by simulation as a function of channel quality and expressed in percent of corrupted data frames;

The session capacity calculation is performed by the individual stations on a periodic basis or when requested by the host.

3.3.2 Session Header

The session header is included in the first frame of every session and is a variable length field comprising a session information field followed by various optional fields as indicated below in Table 1.

TABLE 1

| | Session header field format | |
|---|---|---|
| Field | Number of Bits | Definition |
| Session Information | 8 | Session Information |
| BID | 16 | Broadcast ID |
| HTL | 8 | Number of hops to live |
| NumOfPacket | 8 | Number of packets in session |
| Packet Length 1 | 16 | Length of Packet #1 in the session |
| . | | |
| . | | |
| Packet Length N | 16 | Length of Packet #N in the session |

Note that the BID and HTL fields are used only in broadcast transmissions where the Transmit Type equals 0b11. The NumOfPacket and Packet Length fields are used only when LSHV = 1.

3.3.2.1 Session Information Field

The session information field is described below in Table 2.

TABLE 2

Session information field format

| Field | Bit Number | Number of Bits | Definition | Value |
|---|---|---|---|---|
| PV | 6–7 | 2 | Protocol version | Transmitter sends -00', Receiver discards all packets except those with -00' |
| AID | 3–5 | 3 | Association ID | Association ID which cycles sequentially per LA after each association |
| SID | 1–2 | 2 | Session ID | Session ID which is cycled sequentially per association |
| EOP | 0 | 1 | End of Packet | 0: the session ends at the end of a packet<br>1: the session ends in the middle of a packet |

3.4 Fragmentation and Defragmentation

The MAC protocol of the present invention comprises two different mechanisms for efficient packet transport: (1) segmenting long packets into shorter data fragments to ensure that the channel is not captured for excessively long periods of time that would prevent adequate quality of service and (2) merging of several small packets into a larger data block. The segmenting or merging of packets into a single MAC session (i.e. a single uninterrupted transmission) is referred to as the process of association. Disassociation is defined as the extraction of packets from the received session.

The process of partitioning MAC sessions into multiple MAC frames is called fragmentation and is illustrated in FIG. 3. The size of each data fragment within the MAC frame is calculated using Equation 4 described supra. The process of recombining MAC level data frames into a single host packet is defined as defragmentation. Defragmentation is accomplished at each receiving station.

The first step in the association process is to align the packets received from the host in a queue. Then, the size of each session, referred to as the session capacity, is determined using Equation 2 above. The content of the queue is then fragmented into data fragments, each encapsulated with a frame header and trailer.

Figure 8:
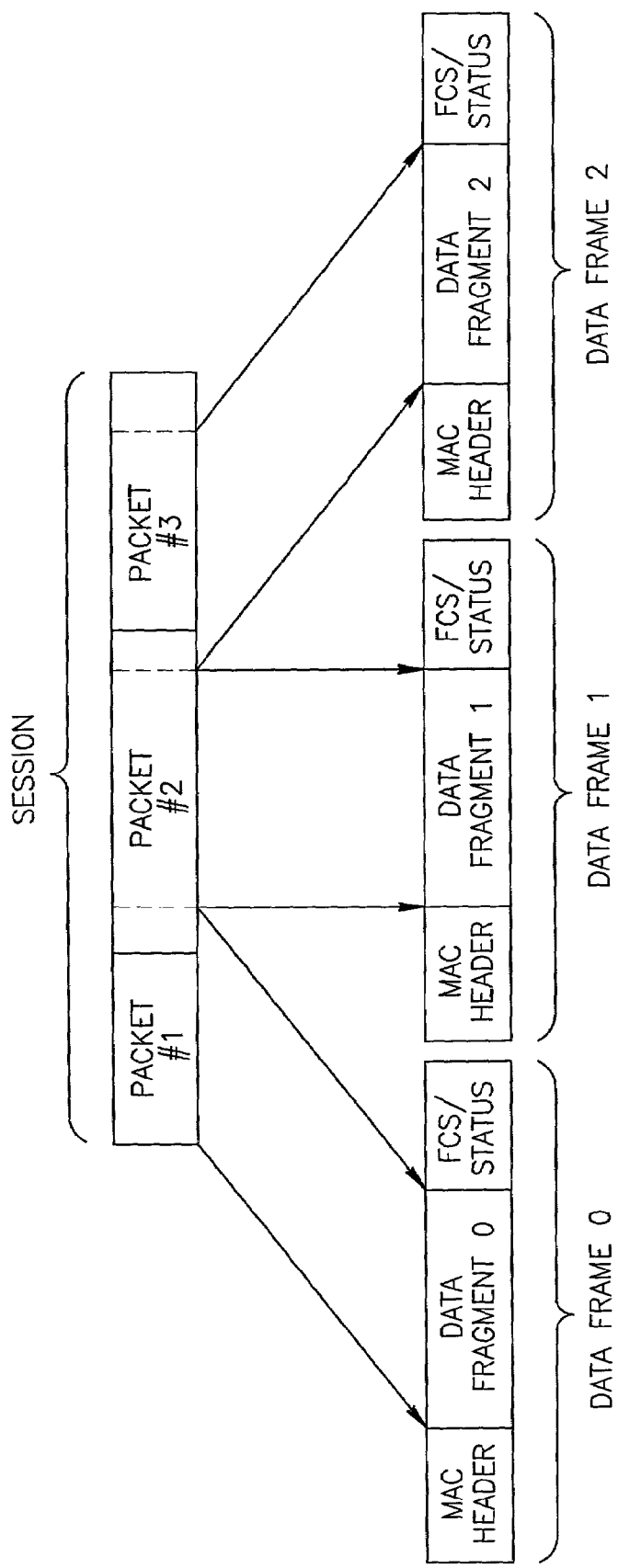
FIG. 8 is a diagram illustrating the fragmentation process of the MAC protocol of the present invention.

A diagram illustrating the fragmentation process of the MAC protocol of the present invention in more detail is shown in FIG. 8. The multiple packets making up a session are fragmented into multiple data frames. The data frames resulting from the fragmentation of a host packet are sent as sequential transmissions in a session, i.e. data frame 0, data frame 1, etc.

Each MAC frame comprises a frame (MAC) header, data fragment and a frame check sequence (FCS). The frame header contains the frame index which allows the session to be defragmented from its constituent data frames. The frames are sent in the order of lowest frame number to highest frame number, where the frame number value starts at zero and is incremented by one for each successive fragment.

3.5 Retransmission Process

The MAC protocol supports ACK and NACK responses as part of its retransmission process. ACK and NACK responses are sent on a per session basis. If the session contains several frames then the response comprises information about each frame in the session. The destination station transmits the appropriate response whenever it receives a session that indicates a response is required. Transmission of the response begins at most a RIFS period after the end of the last frame in the session regardless of the busy state of the medium as indicated by the VCS. If the last frame of the session was not received then the receiving station shall not send the ACK response.

ACK or NACK responses are transmitted using the ACK control frame whose structure is described in more detail in Section 7.4.2.2. The AckBits field in the ACK frame indicates which data frame in the session was in error. Each bit represents the ACK for one data frame with a maximum of 8 frames per ACK. A value of '1' indicates negative ACK or NACK while a value of '0' indicates a positive ACK.

An ACK_FAIL frame is sent instead of the ACK frame if the receiver determines that a session abort has occurred (described below in Section 3.6) or if it receives a Request ACK (RA) from a station that is not the transmitter of the last session it participated in.

The actions taken by the transmitting station after receiving ARQ response is listed below in Table 3.

TABLE 3

Transmission response resolution

| Response | Interpretation | Action(s) |
|---|---|---|
| ACK | Transmission successful | End session |
| NACK | Erroneous frame detected at receiver indicating a bad channel | Retransmit requested data frames |
| None or corrupted ACK | Collision inferred or possibly a bad channel | Wait ACK_Timeout, and Send RA frame with reservation calculated assuming all frames were not received |
| No response for RA | Collision inferred or possibly a bad channel | Retransmit RA RA_retries times, after which transmit RA_Fail to release the channel |

Figure 9:
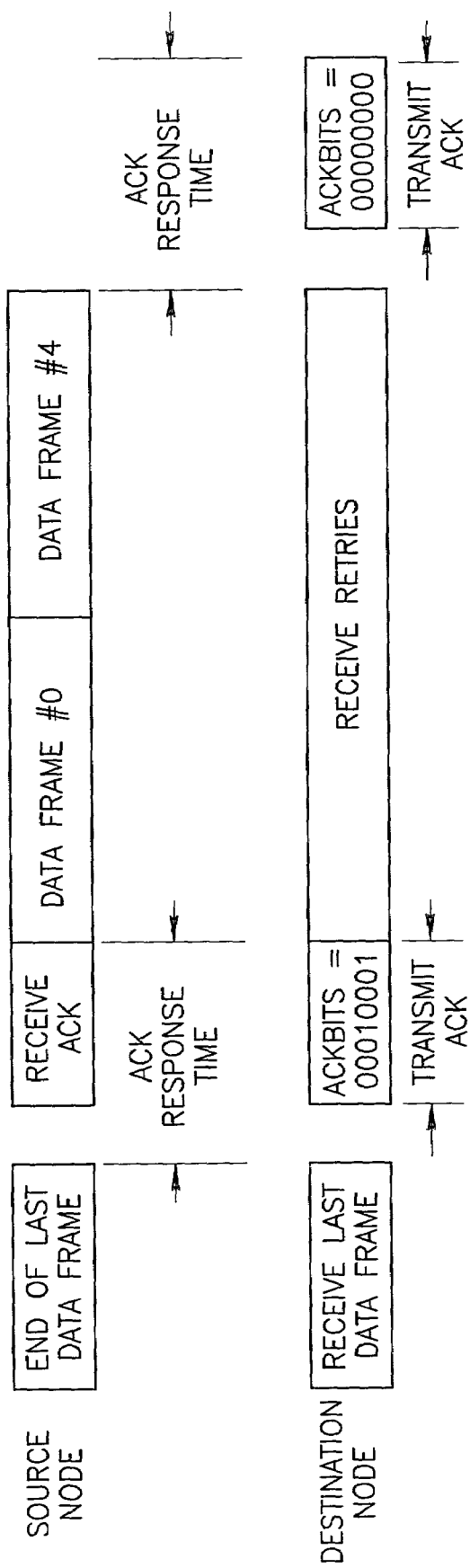
FIG. 9 is a diagram illustrating the ACK process of the MAC protocol of the present invention.

A diagram illustrating the ACK process of the MAC protocol and the retransmission process of the present invention is shown in FIG. 9. The ACK response time begins after the end of the transmission of the last data frame. In this example, the destination node transmits ACK bits of '00010001' indicating NACK for data frames 0 and 4. In response, the source node retransmits data frames 0 and 4 to the destination. During the ACK response time following the retransmission, the destination node transmits the remaining ACKs, e.g., '00000000' indicating no errors in the retransmission to the source node.

Note that the ACK frames are transmitted at maximum power level and minimum transmission rate in order to achieve high reliability of correct receipt by the source. Broadcast transmissions do not use MAC level retransmission. Multicast transmissions use MAC level retransmissions that include an ACK/NACK response from each station in the multicast group as described supra in Section 2.1.3.

A flow diagram illustrating the ACK method of the MAC protocol of the present invention is shown in FIG. 9. After the last fragment is transmitted (step 40), the source waits for an ACK (step 42). Either an ACK or ACK_FAIL are received (step 44). If an ACK is received, the AckBits are compared to zero (step 48) and if so (i.e. positive ACK) the method terminates successfully. If the AckBits are not zero (i.e. NACK) the corrupted fragments are retransmitted (step 50) and the method continues with step 42. If an ACK_FAIL is received (step 44), a link failure is declared (step 46).

Figure 10:
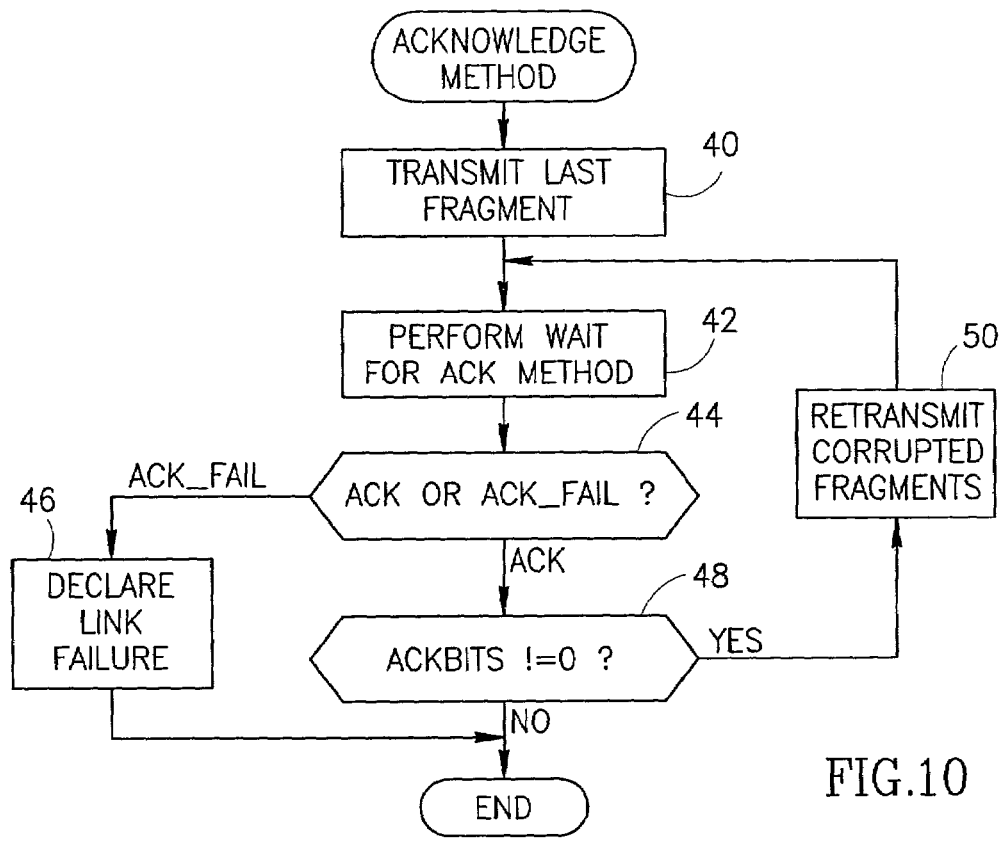
FIG. 10 is a flow diagram illustrating the ACK method of the MAC protocol of the present invention.
Figure 11:
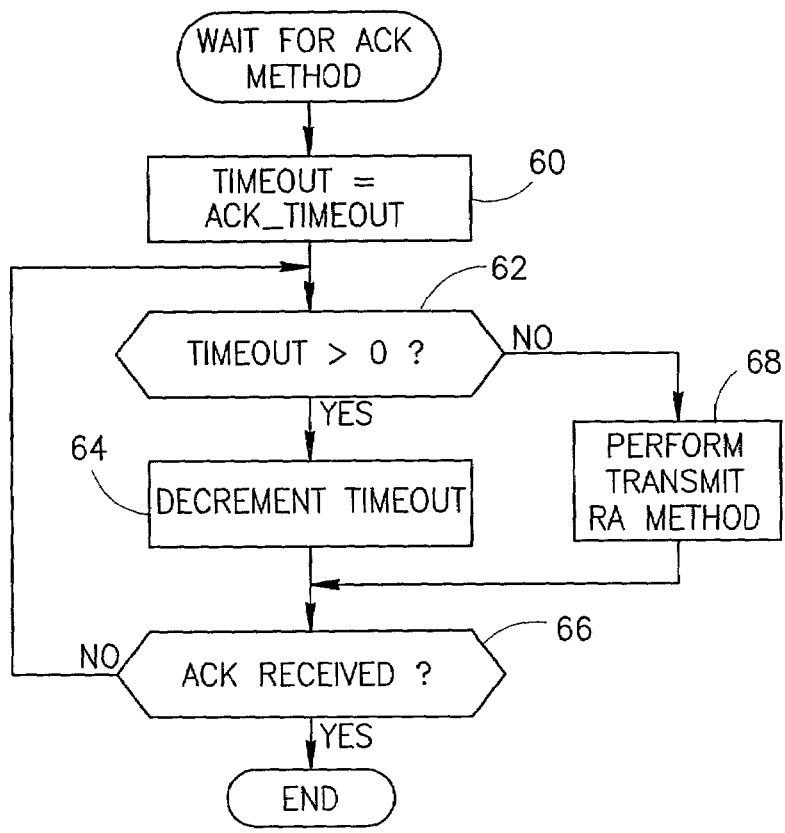
FIG. 11 is a flow diagram illustrating the wait for ACK method portion of the ACK process described in FIG. 10.

A flow diagram illustrating the wait for ACK method portion of the ACK process described in FIG. 10 is shown in FIG. 9. First, the timeout variable is set to the current ACK_timeout value (step 60). If the timeout has not expired (step 62), the timeout is decremented (step 64), otherwise the transmit Request ACK method is performed (step 68). If the ACK is successfully received (step (66), the method terminates otherwise the process repeats with step 62.

Figure 12:
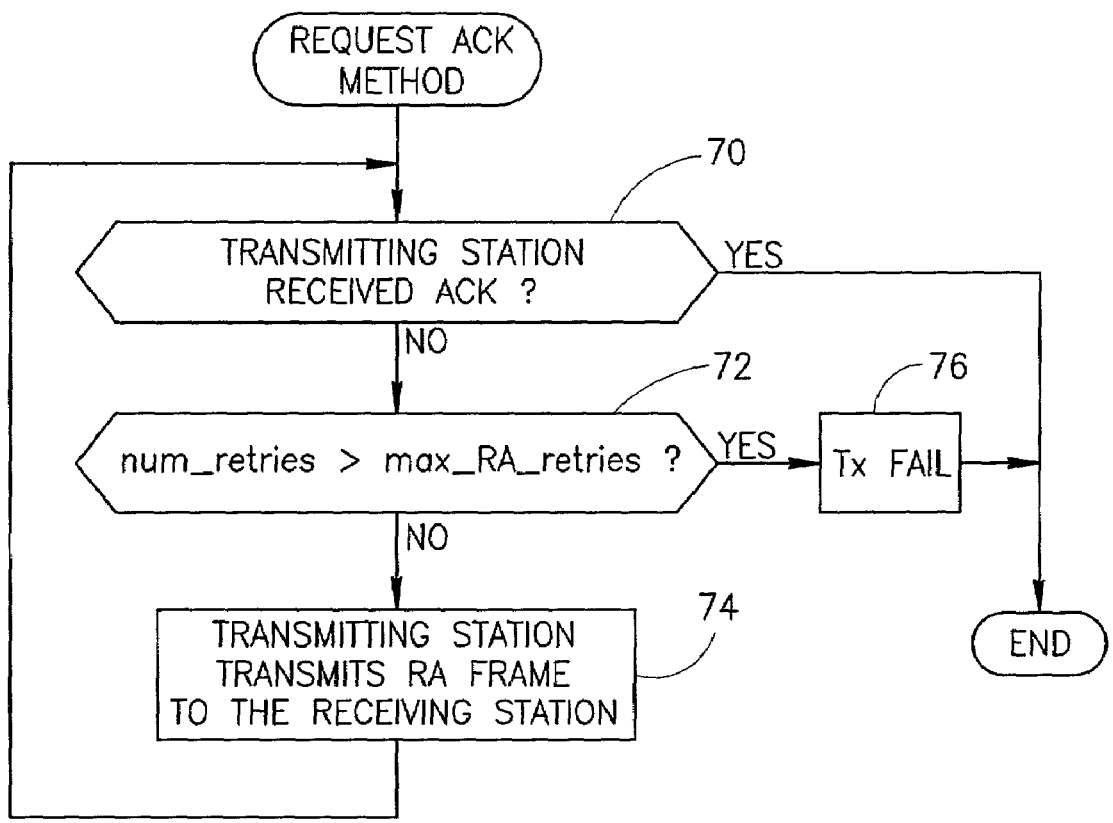
FIG. 12 is a flow diagram illustrating the request ACK method portion of the ACK process described in FIG. 10.

A flow diagram illustrating the Request ACK (RA) method portion of the ACK process described in FIG. 10 is shown in FIG. 12. Normally, after transmitting the last frame in the session the transmitting station waits to receive the ACK frame (step 70). If the ACK frame is not received by the transmitting station, the transmitting station repeatedly transmits an ACK request (request ACK or RA frame) to the receiving station and waits to receive an ACK. After transmitting the RA frame, the transmitting station checks is the number of retries has exceeded a predetermined maximum (max_RA_retries) (step 72). If so, a transmit fail is declared and the method ends (step 76). If not, the transmitting station transmits an RA frame to the receiving station (step 74) and the station then waits for the ACK (step 70). These steps are repeated max_RA_retries times or until an ACK is received.

3.6 Session Abort

After successfully capturing the channel, a session may be aborted by the receiver in response to the following events listed in Table 4.

A station may also transmit a media release message when it determines the channel can be released. This may be determined when the virtual carrier sense (VCS) signal indicates that the communications channel is busy (i.e. via a reservation calculation) but the channel is no longer required or can no longer be used. The media release message comprises an updated value for the reservation counter. The station sending the media release message may (1) increase the reservation counter value if it is found the current reservation time was too short; (2) decrease the reservation counter value if it the current reservation time is too long; or (3) set the reservation counter value to zero in order to immediately release the channel if it is found the channel is no longer required or cannot be used.

4 Second Layer Repeater

The MAC protocol is adapted to provide second layer repeating which refers to a session transmitted using an intermediate station. The intermediate station is referred to as the repeater. The repeater receives the entire session from the original source station (OS) and subsequently retransmits the session to the original destination station (OD).

Figure 13:
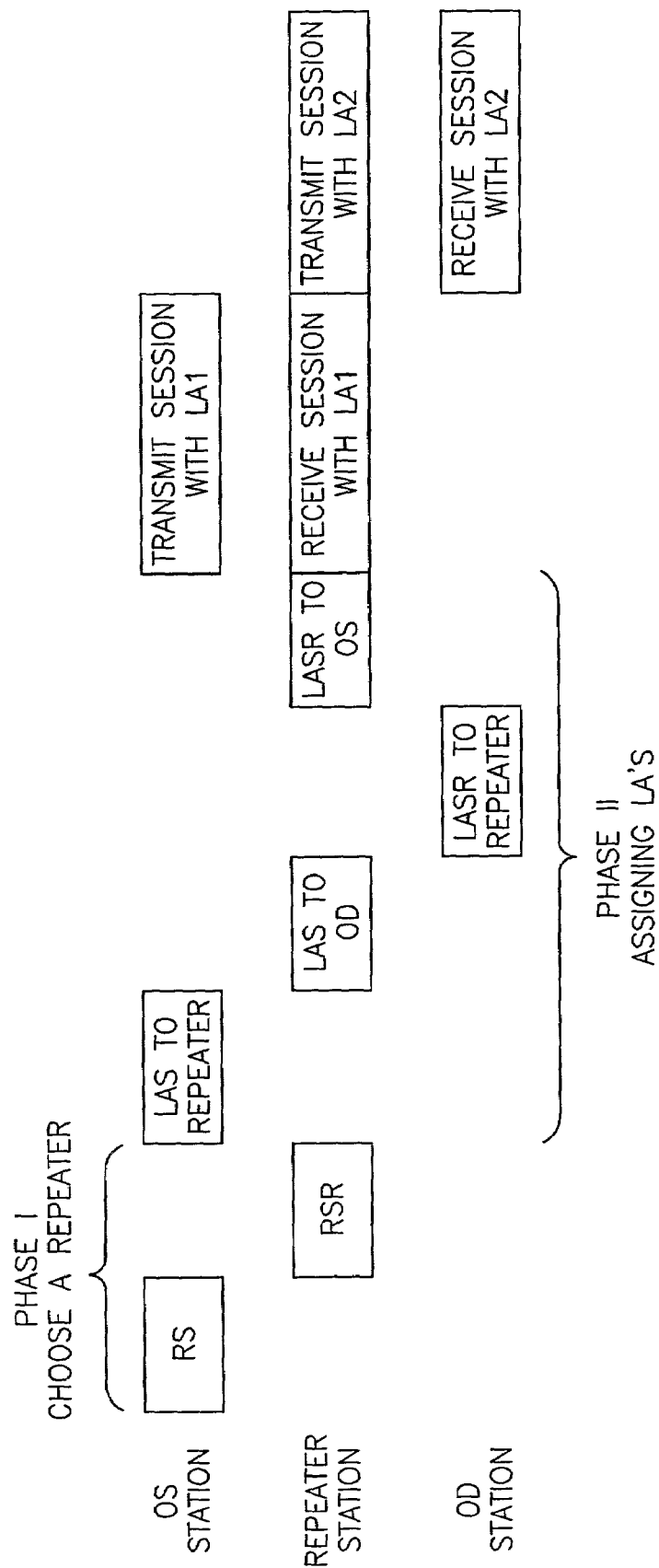
FIG. 13 is a diagram illustrating the repeater establishment process of the MAC protocol of the present invention.

A diagram illustrating the repeater establishment process of the MAC protocol of the present invention is shown in FIG. 13. When a source station detects a link failure it may search for a station to act as a second layer repeater by transmitting a special broadcast massage called a repeater search (RS) management frame with the hops to live set to zero. The RS message includes a quality requirement for the repeater stations. A station that receives the RS frame and that is able to connect with both the Original Source (OS) and Original Destination (OD) stations in a power level and rate (PLR) state higher then or equal to the requirement defined in the RS frame may respond with a repeater search response (RSR) frame.

The OS waits Repeater_Search_Timeout, after which it chooses as its repeater the station that responded with the highest PLR state. In the next step, two new link addresses (LAs) are created: one between the OS and the repeater and one between the repeater and the OD. These LAs are used solely for session transmission via the repeater. The OS sends the chosen repeater an LAS frame assigning a new LDA

TABLE 4

Session abort event

| Event | Description | Action/Responsibility |
|---|---|---|
| Session Timeout | The channel may not be captured beyond the Session_Timeout | Before sending a NACK, the receiver determines if the time required to transmit the remaining frames will violate Session_Timeout. If so, it transmits ACK_Fail, indicating that the session is aborted. The transmitter may retry sending the session by recapturing the channel. |
| Packet Timeout | The packet was delayed in the MAC level for more Packet_Timeout | Before transmitting, the transmitter determines if the time required to transmit the remaining frames violates packet timeout. If so, it discards the packet |
| Too many retransmissions | A session may have up to Data_Retries_Threshold retransmissions. | Before sending a NACK, the receiver checks if Data_Retries_Threshold is violated, if so it transmits ACK_Fail, indicating that the session is aborted. The transmitter shall activate the PLR process (see Section 8.2), after which it may retry sending the session by recapturing the channel. | between the OS and the repeater. The repeater transmits a second LAS frame to the OD assigning a new LDA between the repeater and the OD.

The OD station responds with an LASR frame assigning a new LSA to the repeater. When the repeater receives the LASR frame it transmits an LASR frame to the OS station which in response assigns a new LSA to the OS, thus completing the repeater establishment process. If the repeater did not receive an LASR frame from the OD station after LAS-R_Timeout time, it sends a fail connection (FC) frame indicating a failure to connect, to the OS.

When the repeater detects a link failure with the OD station, it sends an RF frame to the OS and OD indicating link failure and termination of the link address definitions. The OS may then initiate a new repeater search process to establish a connection through a different repeater station. If the OS detects a link failure with the repeater it sends a source cancel repeater (SCR) frame to the repeater and re-initiates the repeater search process.

The OS sends a link exist (LE) frame to the OD station every LE_interval. If a link exist response (LER) frame is received by the source, the source in response sends a source cancel repeater (SCR) frame to the repeater station and communicates directly with the destination since a direct connection between source and destination now exists.

Note that it is possible that the OS does not receive an RSR response frame after RSR_Timeout possibly because a station that can function as a repeater did not communicate previously with either the OS or the OD. In such a case, the OS broadcasts with the hops to live field set to zero a new RS frame with a channel sounding request (CSR). Stations that receive the new RS frame having a quality equal to or greater than that required quality, initiate a CSR to the OD station and respond to the OS with RSR frames containing the results of the channel sounding process with the OD. The OS waits Extended_Repeater_Search_Timeout after which it selects the station with the best channel sounding and initiates the repeater establishment process.

Figure 14:
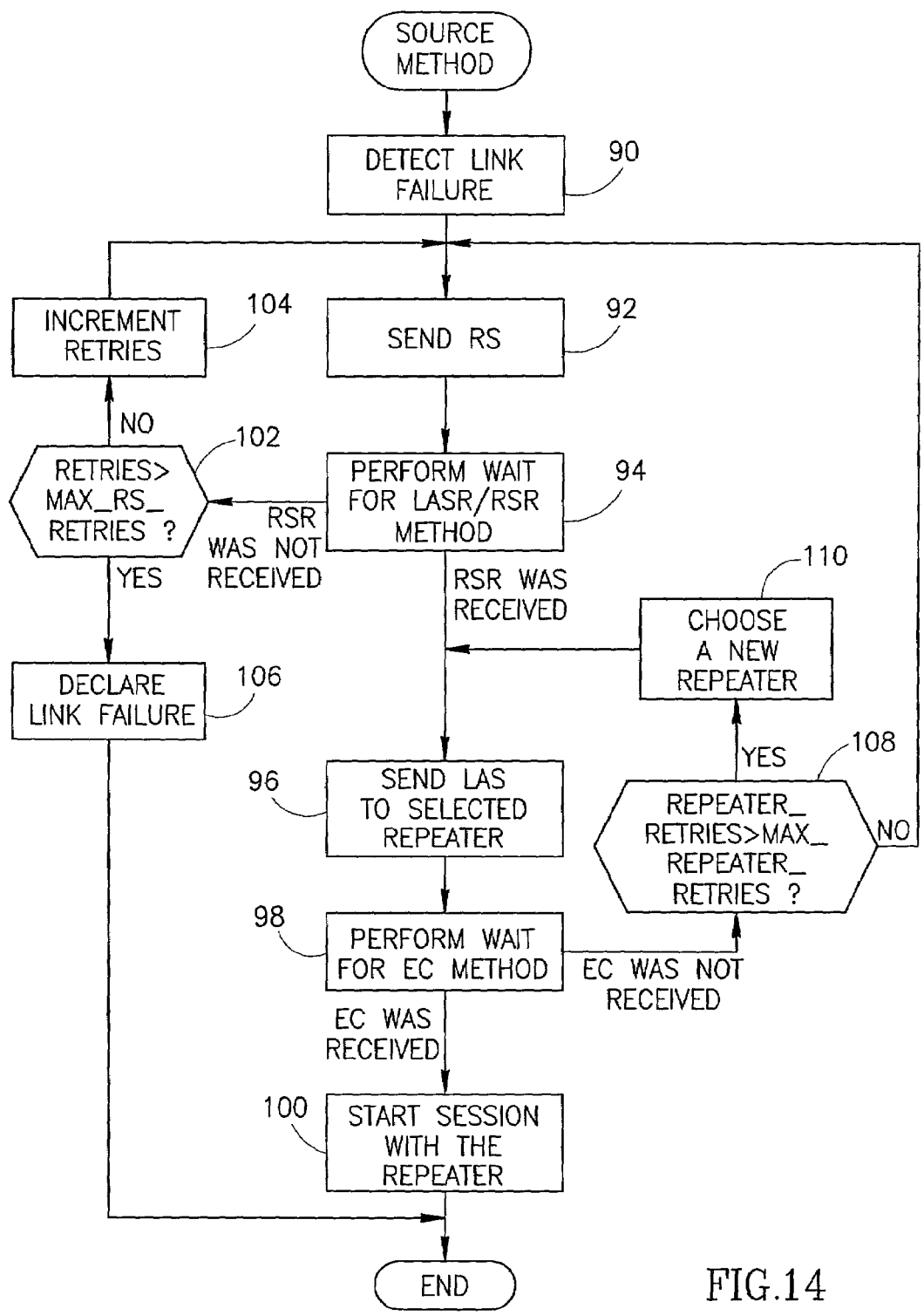
FIG. 14 is a flow diagram illustrating the source based repeater method of the present invention.

A flow diagram illustrating the repeater method of the present invention performed on the source station is shown in FIG. 14. The repeater process is triggered by a station detecting a link failure (step 90). A repeater search frame is then sent (step 92) and the wait for LASR/RSR method is performed (step 94). If the RSR was received, the LAS is sent to the selected repeater (step 96). The wait for establish connection (EC) method is then performed (step 98). If the EC was received, the session begins with the repeater (step 100). If the EC was not received, then if the repeater retries exceeded the max_repeater_retries (step 108), a new repeater is chosen (step 110) and the method continues with step 96, otherwise another RS retry is attempted and the method continues with step 92.

If the RSR was not received (step 94), than if the retries have exceeded max_RS_retries (step 102), a link failure is declared (step 106), otherwise the number of retries is incremented (step 104) and another RS retry is attempted and the method continues with step 92.

Figure 15:
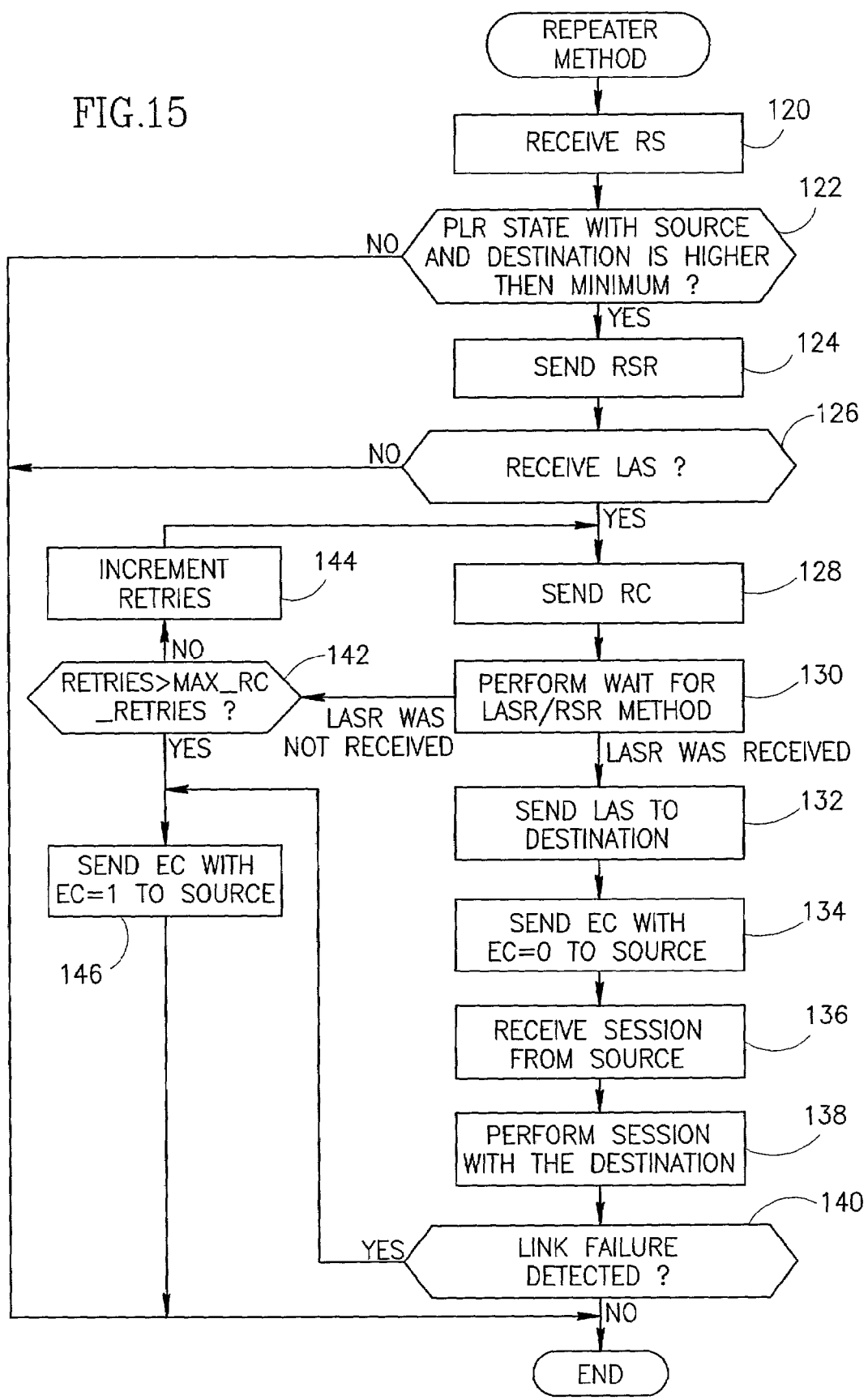
FIG. 15 is a flow diagram illustrating the repeater based repeater method of the present invention.

A flow diagram illustrating the repeater method of the present invention performed on the repeater is shown in FIG. 15. First, the RS frame is received (step 120). If the PLR state at the source and destination is not higher than the minimum (step 122), the method terminates. Otherwise, the RSR is sent (step 124). If the LAS is not received (step 126), the station may attempt to broadcast a CSR as explained above. Otherwise, the RC frame is sent (step 128) and the wait for LASR/RSR method is executed (step 130). If the LASR was not received, then if the retries exceeds the max_RC_retries (step 142), retries is incremented (step 144) and another RC transmission is attempted continuing with step 128. Otherwise, an EC frame with EC set to one is sent to the source (step 146) and the method terminates.

If an LASR frame was received (step 130), an LAS frame is sent to the destination (step 132) and an EC frame with EC set to zero is sent to the source (step 143). The session is then received from the source (step 136) and the session is carried out with the destination (step 138). If a link failure did not occur (step 140), the method returns, otherwise, an EC frame with EC set to one is sent to the source (step 146) and the method returns.

Figure 16:
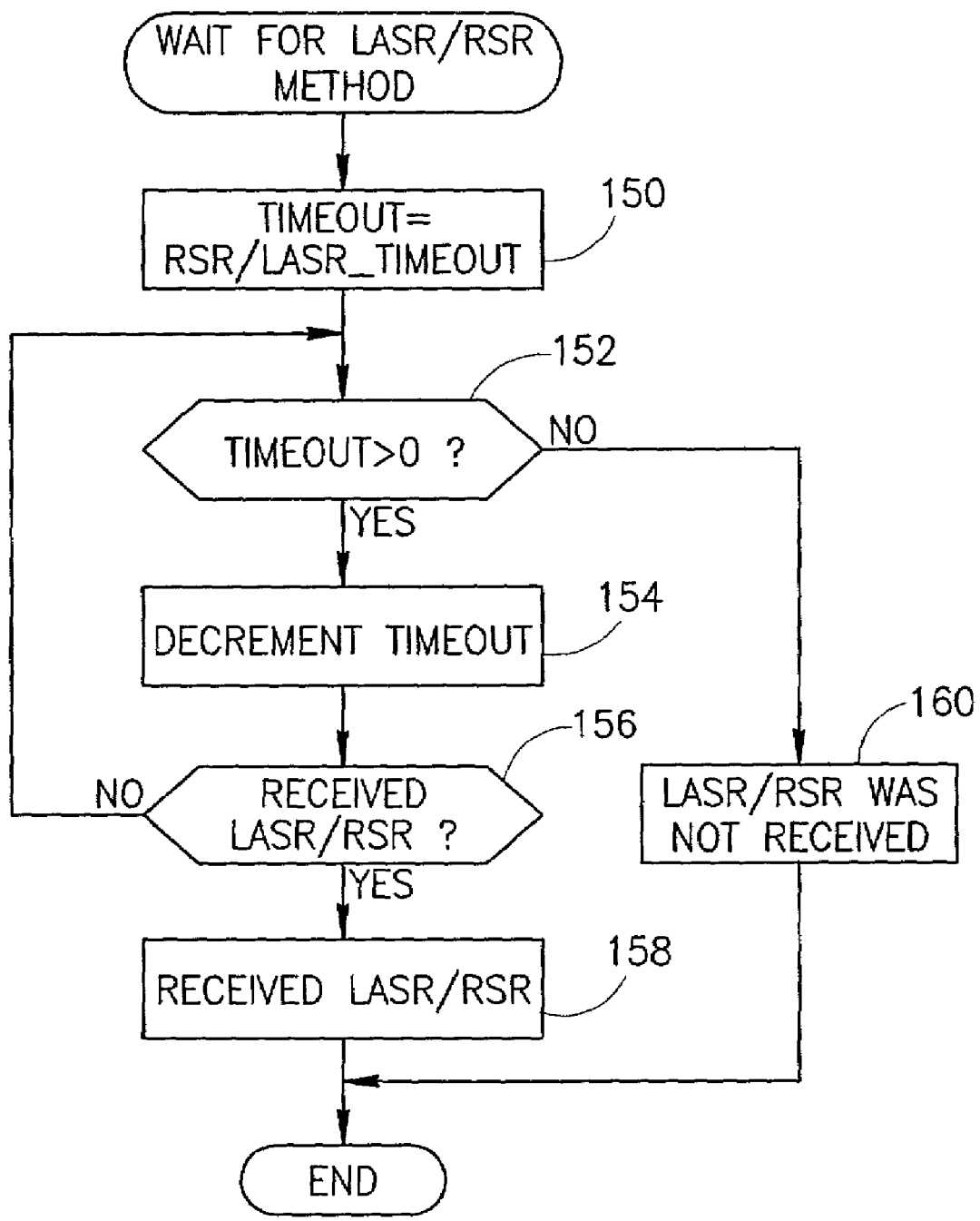
FIG. 16 is a flow diagram illustrating the wait for LASR/RSR method of the present invention.

A flow diagram illustrating the wait for LASR/RSR method of the present invention is shown in FIG. 16. The timeout is first set to the value of the RSR/LASR_Timeout (step 150). If the timeout has expired (step 152), the method returns LASR/RSR not received (step 160). Otherwise, the timeout is decremented (step 154) and it is then checked whether LASR or RSR frame was received (step 156). If so, the method returns with LASR/RSR received (step 158).

Figure 17:
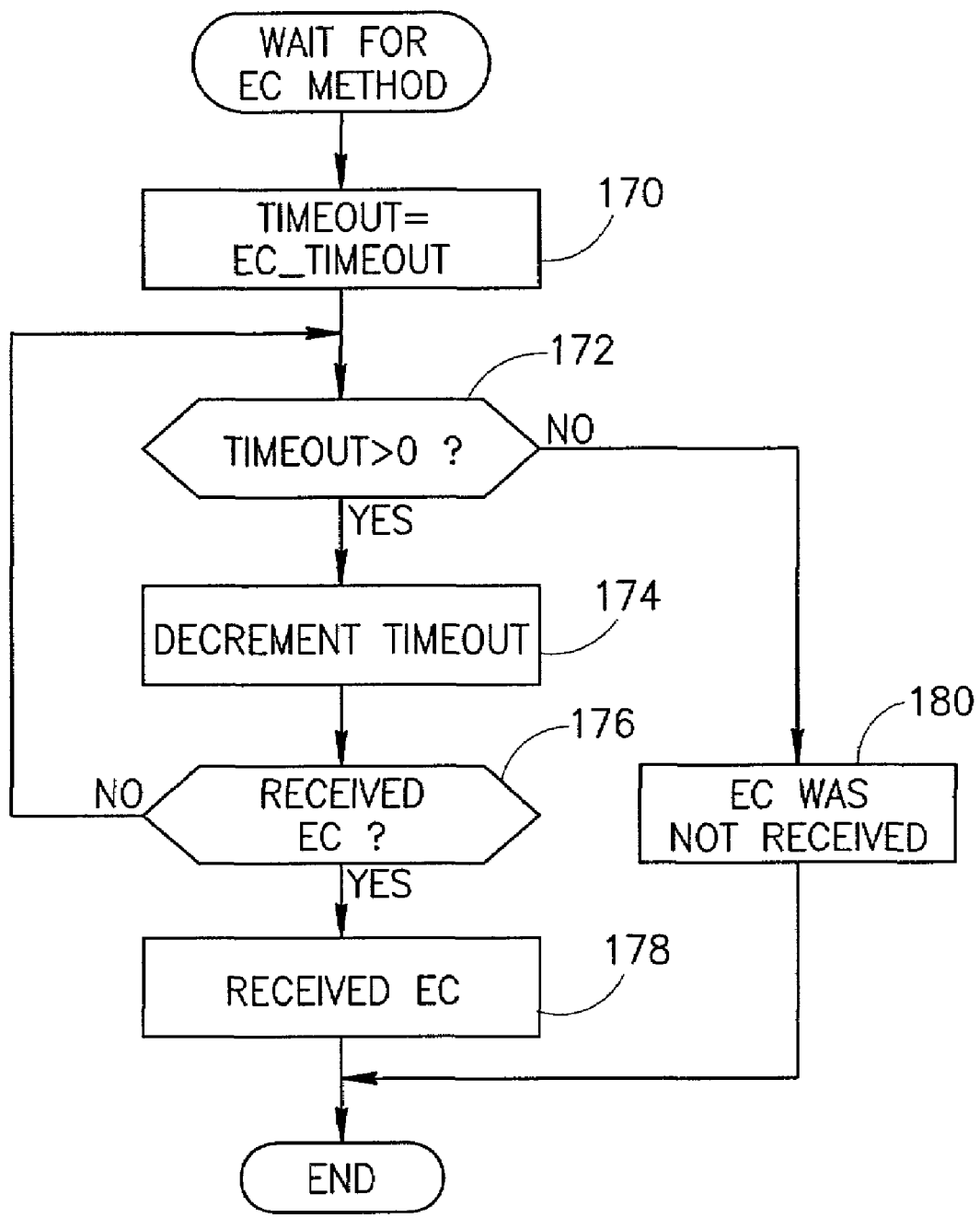
FIG. 17 is a flow diagram illustrating the wait for Establish Connection method of the present invention.

A flow diagram illustrating the wait for Establish Connection method of the present invention is shown in FIG. 17. The timeout is first set to the value of EC_Timeout (step 170). If the timeout has expired (step 172), the method returns EC not received (step 180). Otherwise, the timeout is decremented (step 174) and it is then checked whether an EC frame was received (step 176). If so, the method returns with EC received (step 178).

5 Network Synchronization

The MAC protocol is adapted to optionally provide network synchronization using the following scheme. Each station maintains a global time (GT) Timer to count time to the next tick. The duration of a tick is Tick_Interval seconds long. If the GT is less then Sync_Interval from the next tick, the stations will use long RTS/CTS frames during channel access whereby the transmitting station updates the time to tick (TTT) field of the long RTS frame with the value GT−RTS_Transmit_time−CTS_Transmit_Time. The destination station responds with a long CTS frame comprising the same value of TTT. Stations receiving the long RTS update their GT with TTT+CTS_Transmit_Time. Stations receiving the long CTS update their GT with the TTT value received. Note that the TTT value is measured from the last bit of the control frame.

Upon initialization a station waits 1 sec to receive a GT update after which the station sends a request to receive a GT update using a request GT update (RGTU) management frame. The frame is sent using unicast transmission if it has a valid LA. Otherwise it uses broadcast transmission with the hops to live field set equal to zero. Receiving stations (either unicast or broadcast) respond with a GT update response (GTUR) management frame.

6 Medium Sharing

In accordance with the present invention, medium sharing is achieved using a modified CSMA/CA mechanism with random backoff. The medium sharing implemented by the MAC protocol uses the following mechanisms: virtual carrier sense (VCS) and physical carrier sense (PCS), channel reservation, backoff and interframe space. Each mechanism is described in the following sections.

Note that the channel can be in one of the following three states: (1) busy—indicating that a session is in progress as indicated by either the VCS or PCS, (2) contention period— indicating that a session has ended and the channel is not busy (stations may compete for the channel in descending order of priority) and (3) idle—the channel is defined to be in the idle state if at the end of the contention period, and no transmission has began.

6.1 Virtual Carrier Sense Mechanism

The MAC protocol uses both physical and virtual carrier sense functions to determine the state of the channel. The channel can be on one of three states: busy, contention or idle. The physical carrier sense (PCS) is provided by the PHY layer. The Virtual Carrier Sense (VCS) is provided by the MAC layer. When either PCS or VCS indicate a busy channel, the channel is considered busy. Otherwise, the channel is either in contention or idle.

The VCS may be increased or decreased according to the reservation time indicated in the frames sent by either the transmitter or the receiver during the current transmission session. A station may start the transmission process only when the VCS is zero (i.e. medium is not busy) and the physical carrier sense is idle, indicating that the channel is not busy.

Each receiving station records the reservation counter for each LA pair associated with a session the station is not a part of and updates the counters appropriately during the session. The VCS is set to the maximum of all reservation counters.

Table 5 lists the frames that cause the VCS to be updated in accordance with the reservation time specified in the frame.

contention window allocated to a priority class equal to or less then the priority of the packet awaiting transmission. Contention for the channel is performed according to a backoff algorithm described hereinbelow. During contention periods of higher priorities, stations do not activate their backoff procedures and do not decrement their backoff counters. The contention windows are ordered by descending priority whereby priority 3 is the highest and priority 0 the lowest. This technique ensures that packets are transmitted according to descending order of priority.

The size of the contention windows for each priority class is dependent on (1) the number of stations transmitting in the same priority class and (2) the number of collisions occurring on the channel. Each station computes the size of the contention window for each priority class according to the method described in Section 6.4.

Note that the method described above is effective and robust, not requiring total synchronization between stations in the network. In the event that stations use different contention window sizes, the probability of a lower priority frame being transmitted before a higher priority frame is very small because stations decrement their backoff counters only during priority levels equal to or lower then their own. This feature is especially important in PLC based networks where the physical media comprises a large number of partially overlapping cells using the same channel. By allowing minor differences between stations, a gradual change is provided from one cell to the next.

TABLE 5

Setting VCS Timer

| Receive frame type | New reservation timer value |
| --- | --- |
| SST data frame | Reservation field in the frame |
| RTS | Reservation field in RTS |
| CTS | Reservation field in CTS - CTS Transmission time |
| ACK | Reservation field in ACK frame |
| RA | Reservation field in RA frame |
| First data frame of LST | Reservation field in data frame – frame transmission time |
| First retransmit data frame | Reservation field in data frame – frame transmission time |
| Data frame of LST with no RTS, CTS frame or $1^{st}$ data frame received. | (Number of data frame in session – frame index) * length of the data frame + CIFS |
| Station wake up | EIFS |
| Frame with bad CRC8 | No change |
| Frame with bad CRC16 and no reservation from the specified LA | EIFS |

6.2 Channel Contention Period

The MAC protocol implements a priority based channel access method that can be implemented using any number of priority levels. The method has the advantage of being able to adapt to the traffic content of the channel. The following is a detailed description of the prioritized channel access method. For illustrative purposes only, the method is described using an example comprising four classes of priorities. Note that it is not intended that the invention be limited to this example as one skilled in the art can implement any number of priority levels using the principles and methods disclosed herein.

Figure 18:
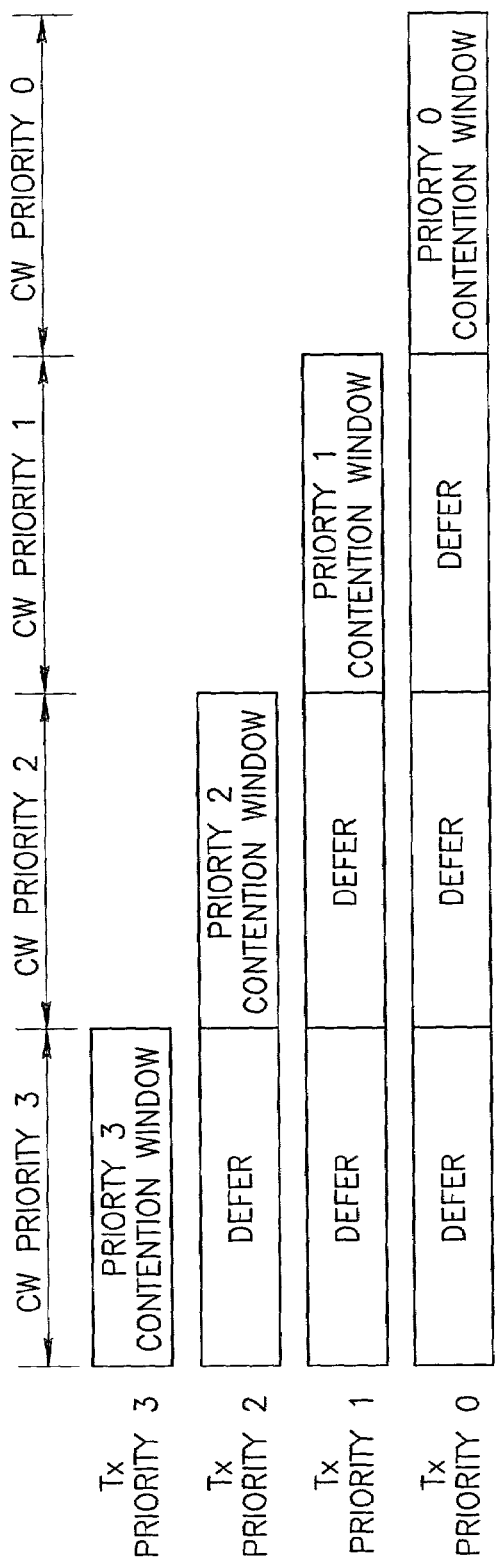
FIG. 18 is a diagram illustrating the contention period divided into a plurality of prioritized contention windows.

A diagram illustrating the contention period divided into a plurality of prioritized contention windows is shown in FIG. 18. The contention period is divided into four contention windows. Stations contend for control of the channel during a The channel is changed from busy to contention period CIFS after the termination of the current session, as indicated by VCS and PCS changing from busy to idle or by the end of the session the station just participated in.

When the contention window of the priority associated with the frame awaiting transmission begins, the backoff algorithm described below is initiated. When the backoff counter reaches zero, the station then contends for the channel. Stations contend for the channel by attempting to reserve the channel for transmission. If a session transmission is pending and the priority of the current contention window is lower then the priority of the session, then the backoff algorithm is initiated immediately. If a new session arrives having a priority higher then that of the currently pending session, then the new session replaces the pending session for channel contention.

6.3 Channel Access Backoff Algorithm

The backoff process described herein is initiated before a session can transmit onto the channel. If when the backoff algorithm is initiated the channel is idle, the station initiates transmission immediately. Otherwise, the station randomizes a backoff between 0 and $CW_{Px}$, which is initiated at the start of the contention window corresponding to the station's priority. Transmission begins when the backoff reaches zero and the channel is not busy. Session transmission begins by attempting to reserve the channel described in Section 6.5 below.

A station decrements the backoff value only when the channel is not busy and during the contention windows of priorities equal to or lower than the priority of the pending transmission. If transmission is detected during backoff countdown, the station defers transmission until the contention window in the next cycle having a priority equal to or lower than its priority and begins decrementing the backoff counter from its previous value.

If the physical carrier sense is deactivated with no frames detected (i.e. false detection) the contention window commences from its previous state and the backoff continues counting down from its previous value.

As described in the Background Section the time width selected for the backoff time slot (also referred to as backoff slot or time slot) can potentially constitute a large portion of the channel access mechanism overhead. On the other hand, the time slot cannot be too small such that stations cannot identify that another station has began transmitting. The MAC protocol comprises a mechanism that uses the two signals Fast Carrier Detection (FCD) and Carrier Detection (CD) provided by the physical layer to set the width of the time slot to a time significantly shorter then prior art algorithms.

The FCD signal is a signal passed from the physical layer to the MAC layer that indicates that a transmission may be starting. This signal arrives very quickly after the beginning of transmission but has a relatively high false alarm rate. The CD signal is also passed from the physical layer to the MAC layer that indicates with very high probability that a transmission is starting. This signal arrives a relatively long time after the start of transmission but has a very low false alarm rate.

Prior art backoff algorithms set the time slot to the CD time. The backoff algorithm of the present invention sets the width of the time slot to the FCD time thus lowering the overhead considerably. Choosing the FCD time as the time slot (i.e. backoff slot) has the advantage that the slot time is large enough such that stations using random backoff times will not collide while it is also significantly shorter than the time it takes for the physical layer to identify with high probability that a transmission has began. In the example embodiment presented herein, the ratio between FCD time and CD time is a minimum of 1:6 thus providing a considerable advantage over conventional algorithms.

Figure 19:
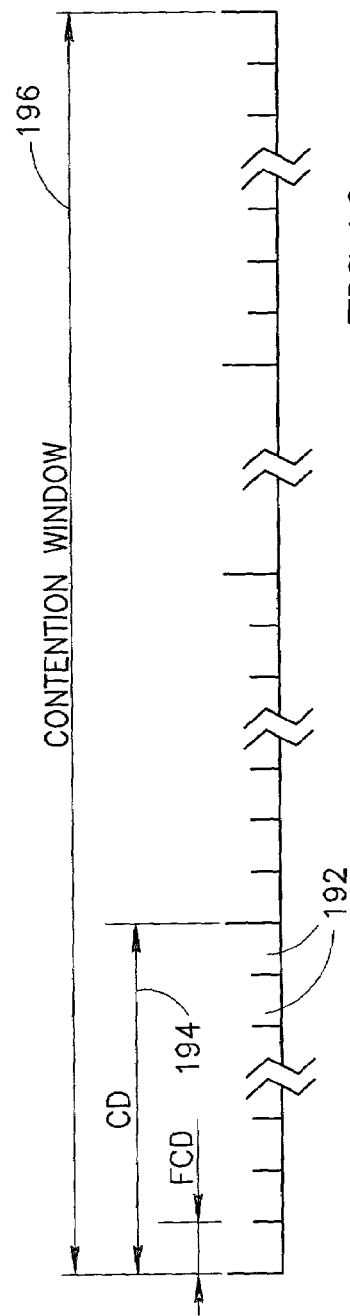
FIG. 19 is a diagram illustrating the contention window divided into a plurality of CD and FCD time slots.

A diagram illustrating the contention period divided into a plurality of prioritized contention windows is shown in FIG. 19. The contention window 196 is shown divided into a plurality of CD times 194. Each CD time is then further divided into a plurality of FCD times 192. In accordance with the invention, the time slot used for randomizing the backoff time is the FCD time rather than the CD time. This greatly reduces the time required for a station to acquire the channel.

The backoff algorithm of the present invention is intended to prevent the stations from competing for the channel at the same time. After the current transmission completes, a station may begin contending for the channel. The contention period is divided into time slots. Stations randomize how many time slots must be deferred before trying to compete for the channel. If during the deferral time, another station begins transmission, the station waits for the next time the channel is free. The size of the time slot is determined such that stations that randomize a different deferral period will not collide on the channel. This means that the station that randomized a longer deferral period will detect that the second station has already begun transmission. The size of the time slot is usually set to the time it takes for stations to synchronize to the packet on the channel. The larger the time slot, however, the more overhead the backoff algorithm adds to the channel access mechanism.

Figure 20A:
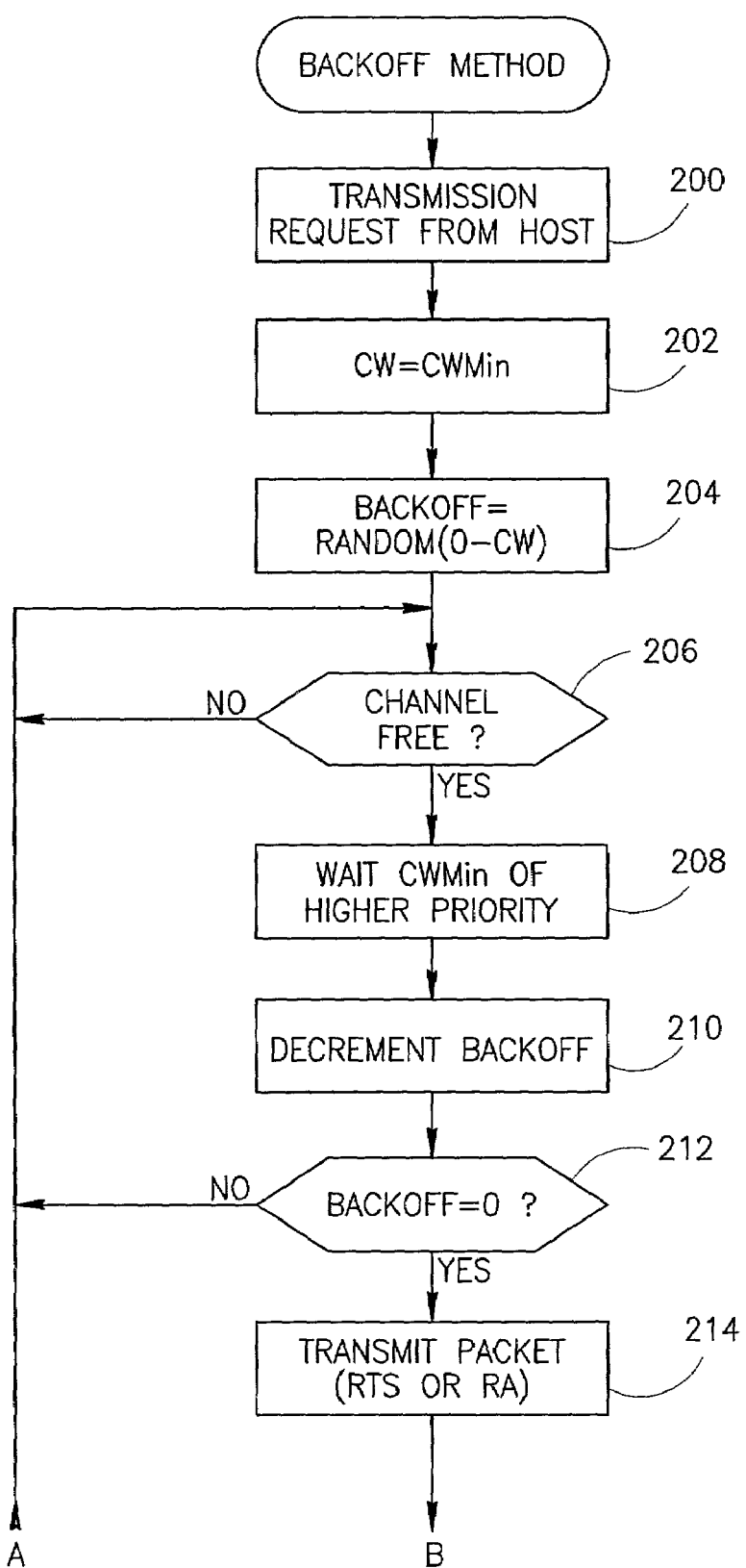
FIGS. 20A and 20B are a flow diagram illustrating the backoff mechanism of the MAC protocol of the present invention.
Figure 20B:
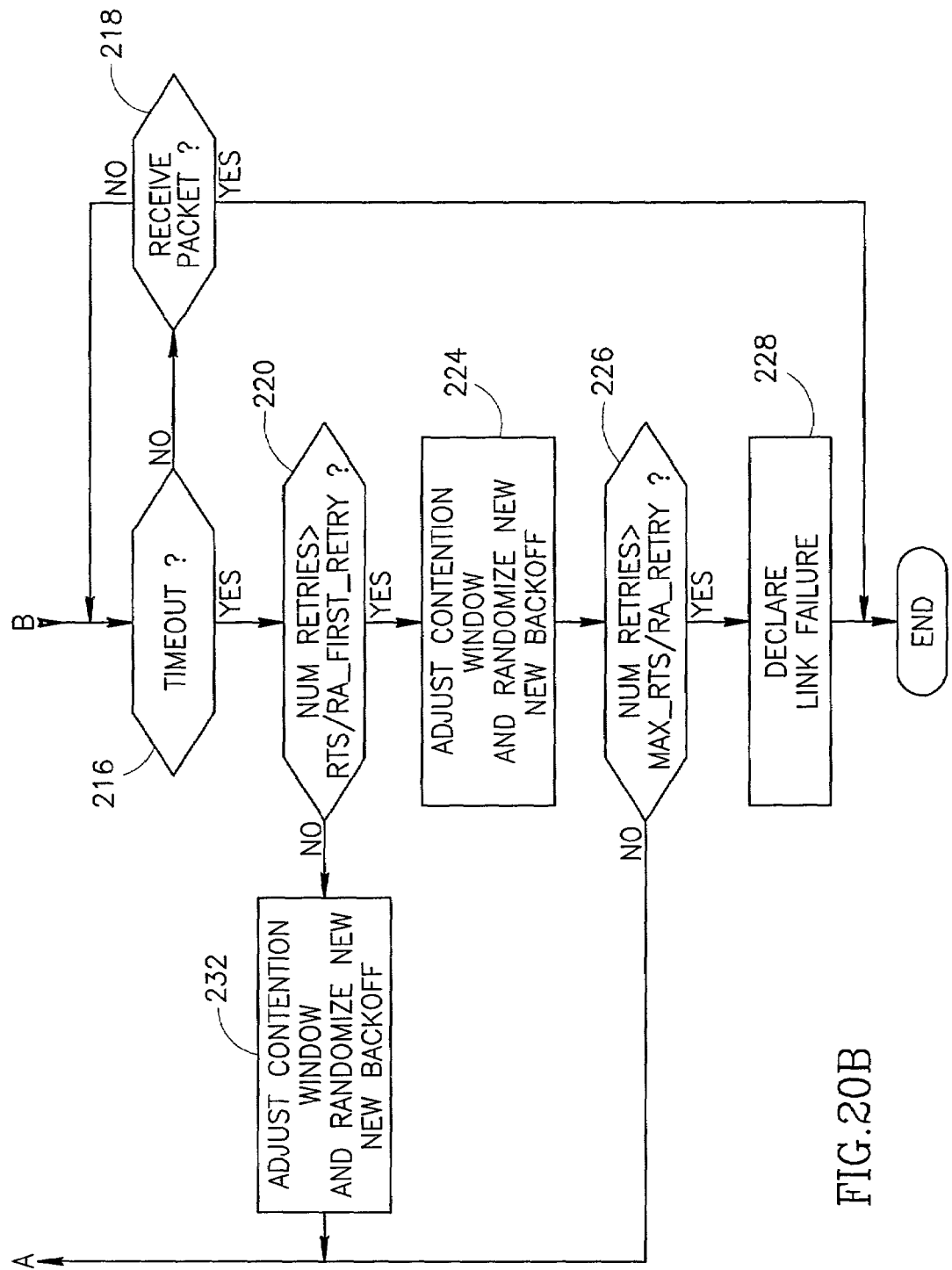

The following is a description of the backoff algorithm. A flow diagram illustrating the backoff mechanism of the MAC protocol of the present invention is shown in FIGS. 20A and 20B. The backoff algorithm is initiated at the start of the contention window corresponding to the session's priority before a new session is transmitted to the channel. First, the station receives transmission request from the host (step 200). The contention window (CW) is then set to the value of CWMin (step 202). In the beginning of the contention period the station randomizes a backoff time as a multiple of the width of a time slot, i.e. a value between 0 and $CW_{Px}$ (step 206). If the backoff algorithm is initiated when the channel is idle then the station may initiate transmission immediately, otherwise the transmitting station randomizes a backoff.

While the channel is in a contention period (step 206), the station decrements the backoff time (step 210) after waiting CWMin of the higher priority (step 208). While the backoff counter is not zero (step 212), the method checks for the VCP and PCS to be idle and decrements the backoff counter. When the backoff counter reaches zero (step 212), transmission proceeds by attempting to reserve (or acquire) the channel as described hereinbelow in Section 6.5. Reservation of the channel is achieved by transmitting a RTS or RA frame (step 214). The protocol implements two special control packets designed to capture the channel: Request To Send (RTS) and Clear To Send (CTS). The RTS and CTS packets are used to capture and reserve the channel by both the source station and the receiving station.

If the RTS/RA frame times out (step 216), then if the number of retries is less than RTS/RZ_first_retry (step 220) the size of the CW is adjusted as described below in Section 6.4 and a new random backoff is generated (step 232). Otherwise, the size of the CW is adjusted and a new random backoff is generated (step 224). If the max_RTS/RA_retries has not been met, the method continues with checking for the idle channel state in step 206. Otherwise, a link failure is declared (step 228).

While the RTS/RA frame does not timeout (step 216), the station checks for receipt of a frame (step 218). If a frame is received, the method returns, otherwise, the method continues with step 216.

Thus, in accordance with the MAC protocol, if a FCD signal arrives, the station stops decrementing the backoff counter. If a CD signal does not arrive within a CD time subsequent to receipt of the FCD signal it indicates that the FCD signal was a false alarm. The station then continues decrementing the backoff counter from the point in time before receipt of the FCD signal. If a CD signal arrives, the station defers transmission and waits for the next contention period.

The station decrements the backoff value only when the channel is not busy and during the contention windows of priorities equal to or lower than the priority of the session awaiting transmission. If transmission is detected during the backoff countdown, then the station defers transmission until the next cycle when it reaches the contention window corresponding to its priority. At that point, the station continues to decrement the backoff counter from its previous value.

Transmission occurs after the backoff counter expires and the contention of the channel was successful. Once the current transmission is complete, the station once again selects a random backoff interval. Note that the function of the backoff time is that each station waits a different time so as to spread out the times over which stations contend for the channel. Thus, the backoff time is set in accordance with the number of stations and contention events.

6.4 Adaptive Adjustment of Contention Window Size

The size of the contention window for each priority class is changed in order to adapt to the current characteristics of the network traffic. In accordance with the invention, the backoff time each station waits begins at a random time after the last transmission. The random time is chosen between zero and the size of the contention window.

Note that the size of the contention window plays a major role in determining the probability of collision. Another factor effecting the probability of collision is the number of stations attempting to access the channel. For example, consider 20 stations wanting to transmit at the same time. If each station chooses a random number within a contention window of size 10, there will likely be many collisions. On the other hand, if the contention window is extended to 60, few collisions are likely. The invention provides a mechanism to dynamically adapt the size of the contention window to the number of stations that wish to transmit at any given time.

Figure 21:
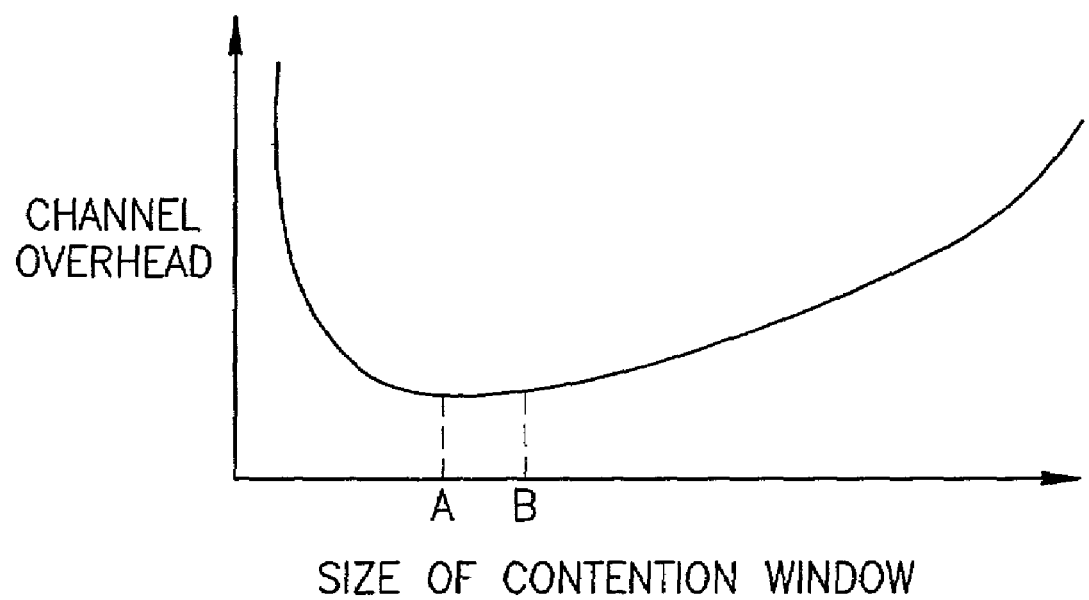
FIG. 21 is a graph illustrating the channel overhead time versus the size of the contention window.

A graph illustrating the estimated channel overhead time versus the size of the contention window is shown in FIG. 21. The overhead of the channel access process is made up of a combination of (1) the silent period wherein all stations defer transmission until expiration of the backoff time and (2) the collisions whereby two or more stations attempt transmission at the same time. If the size of the contention window is decreased, the probability of collision increases and vice versa. Thus, there exists an optimum CW size that minimizes the channel overhead. This is indicated by the CW size denoted 'A' in the graph.

Note that the slope of the graph is steeper to the left of point A than to the right thereof. Moving to the left of point A, the probability of collision increases until eventually the channel overhead increases asymptotically to infinity. Moving to the right of point A, the channel overhead increases gradually due to the increase in the silent period. In order to allow for a margin of error for reasons specified below, the optimum is taken as point B which lies to the right of point A.

The inaccuracies in estimating the optimal CW size are due mainly to (1) limitations in the accuracy and reliability of the estimation process and (2) dynamic changes with time in the load which take time to adjust to.

In accordance with the present invention, a method is provided for adjusting the size of the contention window. The size of the contention window is adapted using the number of stations estimated to be transmitting on the channel in the same priority class using the following formula $$CW = \alpha \cdot N3 \leq \alpha \leq 10 \tag{7}$$

where $$\alpha = K \cdot \frac{1}{\lambda} \cdot \frac{\text{Time\_of\_colliding\_packet}}{\text{Time\_slot}} \tag{8}$$

and where

Backoff Value is the random time each station waits before contending for the channel;

CW is the contention window within which each station randomly selects a backoff value;

α is a factor determined by simulation;

N is the number of stations contending for the channel at any given time. N is the actual number and E(N) is the expected number of stations;

K is a factor determined by simulation;

Time_of_colliding_packet is the expected time of transmission of the contention packet. It may comprise either the data packet itself or control packets;

1/λ represents the probability that a station will have a packet to transmit; Note that α and K are fixed as part of the network specification and are determined by calculation, measurement and/or simulation for each particular network implementation.

The value N can be estimated using one of the following $$N_{estimated} = \frac{CW}{t} - 1 \tag{9}$$

where the expected value of t is given by $$E[t] = \frac{CW}{N+1} \tag{10}$$

and wherein t is the actual time from the moment the stations are allowed to transmit until one station starts transmitting;

E(t) is the expected value of t;

Each station transmits its CW. All stations determine t by measuring the time from the last transmission until the time of the current transmission. Using the transmitted CW and t each station calculates an estimate for N. Then, each station calculates a new N using $$N_{new} = (1-\beta) \cdot N_{old} + \beta \cdot N_{estimated} \tag{11}$$

where the weighting factor β is determined by simulation. The stations then calculate the new CW as follows using equation (7)

Note that the weighting factor β may be assigned two different values: $\beta_1$ when $N_{new} < N_{estimated}$ and $\beta_2$ when $N_{new} > N_{estimated}$. At startup and when each new station enters the network, the stations are assigned a large initial $N_0$ from which they calculate their first CW value. Thereafter, however, the CW values quickly adjust to the characteristics of the actual network.

6.4.1 Adjustment Method Considering Hidden Node Problem

Collisions on the channel may occur in two situations: (1) two or more stations select the same random backoff time and (2) two stations are hidden from each other. In the second case, the stations cannot hear each other but can hear other stations in the network. In this case, there is a chance that one station may start transmitting before the other station finishes.

In the first collision situation, the colliding stations will wish to retransmit and will thus be part of the group of stations wanting to contend for the channel. This is normal behavior of the CSMA/CA method and the adaptive CW size algorithm of the present invention is designed to optimize the CW size parameters.

The second collision situation is more complex since the hidden nodes will not receive acknowledgements and will wish to retransmit. This pattern is repeated until the number of retransmissions has been exhausted. The upper communication layers will be notified and as a result will generate the packet again resulting in an infinite loop until the upper communication layers close the connection.

In accordance with the invention, the creation of an infinite loop can be avoided by permitting a finite number of contentions after which a station declares that it suspects it is a hidden node, i.e. that the failure to receive a certain number of acknowledgements indicates that the failure is not due to ordinary collisions.

An infinite loop is avoided when one station concludes its transmission before the second node starts its transmission. This can be assured if both stations select random backoff times using time slots the size of a colliding packet or larger. In the case where a hidden node situation is suspected, all stations involved choose a random backoff number in units the size of a colliding packet or larger. The CW in this case will be Y·xcolliding_packet_time_units wherein Y is a factor either predetermined or set dynamically. Thus, the stations choose a large backoff value relative to the rest of the network. Eventually, however, both stations will transmit without colliding with each other.

6.5 Reservation of the Channel

As described above, when the backoff counter reaches zero, the station tries to reserve the channel by transmitting a frame with reservation counter update information using either control frames in LST or SST frames in SST. During transmission, the reservation of the channel is updated as necessary in the event of retransmissions or a session abort.

6.5.1 Channel Reservation in Long Session Transport

A station attempts to reserve the channel by transmitting the request to send (RTS) control frame. The RTS frame includes the reservation time required for the new transmission including an ACK packet from the destination. The destination station responds with a clear to send (CTS) frame within RIFS seconds after the end of the RTS frame. The CTS frame comprises the reservation time copied from the RTS packet.

Figure 22:
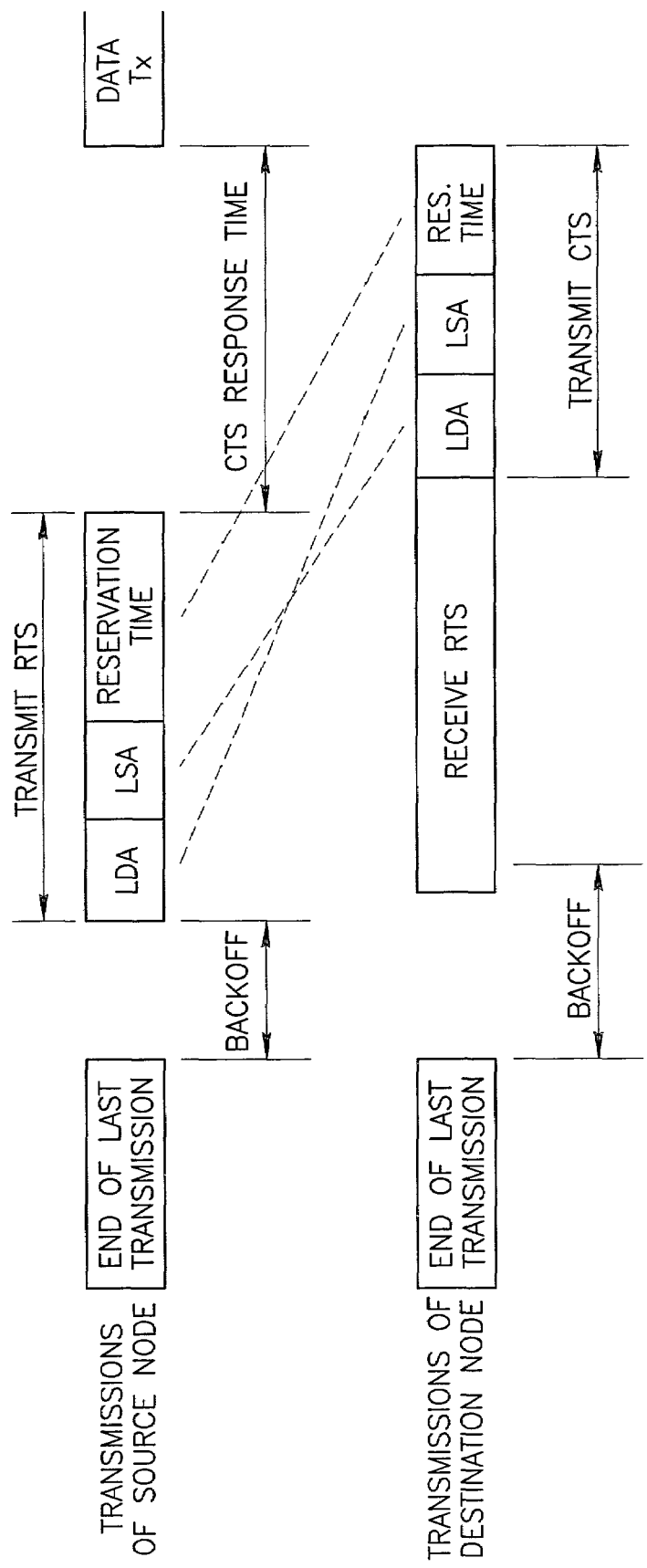
FIG. 22 is a diagram illustrating the RTS/CTS process of the present invention.
Figure 23:
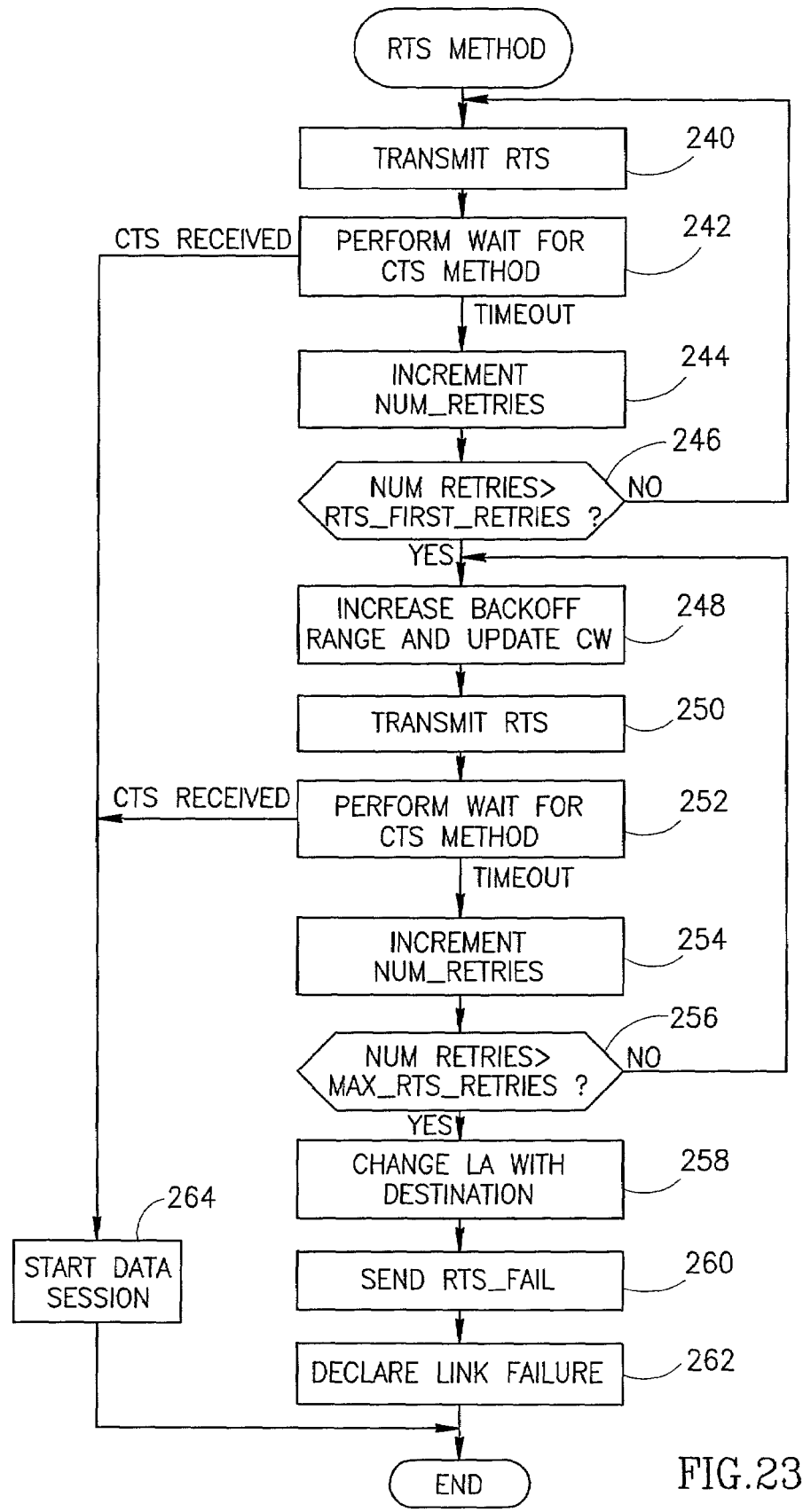
FIG. 23 is a flow diagram illustrating the RTS method of the present invention.

A diagram illustrating the RTS/CTS process of the present invention is shown in FIG. 22. If the receiver does not have enough resources to process the incoming transmission then it responds with a CTS_Fail frame. In addition, the RTS and CTS frames are transmitted using the maximum power level and minimum transmission rate of the transmitter in order to maximize reliability of transmission.

After the transmitter receives the CTS frame it begins transmitting the session data frames at most RIFS after the end of the CTS frame. In the event of retransmissions, the ACK, RA and first frames update the reservation of the channel. The calculation of the reservation is described infra in Section 6.5.3. In the event of a session abort, the channel is released as described below in Section 3.6. If the transmitter does not receive a CTS response for the RTS after CTS_Timeout the transmitter assumes a collision has occurred and invokes the reservation retry process described in section 6.6.

6.5.2 Channel Reservation in Short Session Transport

Channel reservation in SST is valid only in SST with ACK. The source station transmits the SST frame including the reservation value. The destination station responds with an ACK frame comprising the reservation time equal to the retransmission time if needed. If no ACK frame is received the source station assumes a collision has occurred and invokes the reservation retry process described in section 6.6.

6.5.3 Calculation of Reservation

All reservation times are compressed to fit the size of one byte before transmission. The byte is represented by the RES field. Each receiving station decompresses the RES field and updates the VCS timer using the decompressed reservation time. The reservation time is counted from the last received bit of the frame, which was also used to update the VCS timer. Any suitable compression and decompression technique can be used and is not critical to operation of the invention. The reservation time is calculated as described in Table 6 below.

TABLE 6

| Frame Type | Reservation field values<br>The transmit Reservation field |
|---|---|
| RTS | CTS_Time + (DATA_Time * DataNum) + ACK_Time + RA_Time + RIFS * 4 |
| CTS | Copy RTS Field |
| 1st Data Frame/ 1st Retry | Copy CTS Field or ACK |
| ACK | (DataNumRetries * DATA_Time) + ACK_Time + RA_Time + RIFS * 3 + CIFS |
| RA | Copy last RTS or ACK |

6.6 Reservation Retry Process

If the source station fails to receive a response to the reservation frame or received a frame with bad CRC8 or CRC16 (either RTS or SST frame), then the station assumes a collision has occurred and invokes the reservation retry process. If the source station receives a valid frame that is not a response, the station defers transmission and waits for the next contention period.

Figure 24:
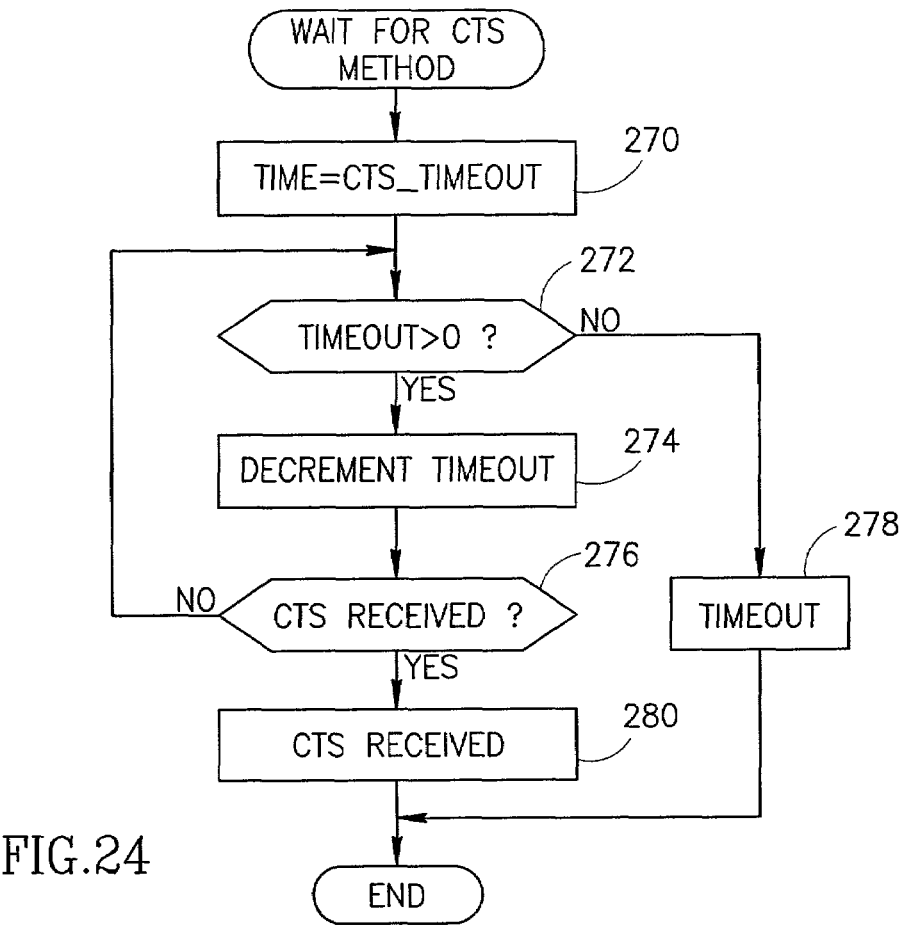
FIG. 24 is a flow diagram illustrating the CTS method of the present invention.

A flow diagram illustrating the CTS method of the present invention is shown in FIG. 24. The timeout is first set to the value of the CTS_Timeout (step 270). While a timeout has not occurred (step 272), the timeout is decremented (step 274) and a check is performed whether a CTS frame has been received (step 276). If a CTS frame has been received, the method returns CTS received (step 280), otherwise, the method continues with the timeout check in step 272. Upon timeout, the method returns with timeout (step 278).

If no response was received after MAX_RTS_Retries (step 256) the source station transmits an RTS_Fail frame and invokes a new LA assignment process (steps 258, 260). If the LA assignment process fails, the station declares a link failure with the destination station (step 262) and the method returns.

If the CTS frame is received by the source station (step 242 or 252) transmission of the data frames of the pending session begins (step 264).

Note that during the first RTS/RA_First_retries retries the transmitter randomizes a backoff value of Backoff_SlotTime or Backoff_SlotTime*2 before retransmitting. During the next MAX_RTS/RA_Retries retries the transmitter increases the $CW_{Px}$ value by a factor of two and randomizes a new backoff value before each retransmission. The value of $CW_{Px}$ should not exceed $CW_{Px-MAX}$.

The value of $CW_{Px}$ is decreased by one half for every successful reservation of the channel and initialized to the value calculated by the equation described in Section 6.2 every time the contention window elapses and no transmission is initiated.

A flow diagram illustrating the CTS method of the present invention is shown in FIG. 24. The timeout is first set to the value of the CTS_Timeout (step 270). While timeout has not occurred (step 272), the timeout is decremented (step 274) and a check is performed whether a CTS frame has been received (step 276). If so, the method returns CTS received (step 280), otherwise, the method continues with the timeout check in step 272. Upon timeout, the method returns with timeout (step 278).

6.7 Interframe Space

Figure 25:
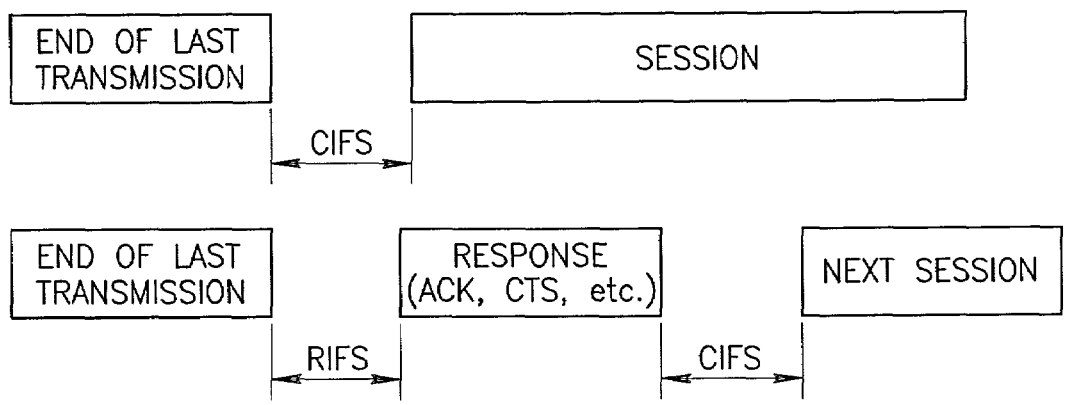
FIG. 25 is a diagram illustrating the interframe space inserted between transmission sessions.

Time intervals between frames on the medium constitute the interframe space and are necessary due to signal propagation and station processing time. Three interframe space values are defined for the MAC protocol as described below. A diagram illustrating the interframe space inserted between transmission sessions is shown in FIG. 25.

The contention interframe space (CIFS) is defined as the space between the end of the previous session and the start of the new contention period. A new session may start no less than CIFS after the end of the previous session, in the case of highest priority and zero backoff.

The response interframe space (RIFS) is defined as the time between the end of a frame transmission and the start of its associated response. Note that if no response is expected, the CIFS is in effect.

The extended interframe space (EIFS) is defined for conditions when the station does not have complete knowledge of the state of the medium. This may occur when the station hears only part of a frame, when errors in received frames make decoding difficult or when the station initially attaches to the network. The EIFS is preferably significantly longer than the other interframe spaces in order to avoid causing collisions for ongoing sessions.

7 Frame Format

7.1 Frame Types

The MAC protocol defines two frame structure types: a data frame and a control frame. Both frame types are constructed from a PHY header (frame control) section, a payload section and a frame check sequence (FCS) (i.e. CRC) and status section. Details of the structure, content and function of both frame types are provided in the following sections.

7.2 Bit Order

Data is presented to the physical layer most significant byte first, most significant bit first wherein bit number 7 is the MSB of a byte. The diagrams presented herein shows the most significant bits or bytes to the left.

7.3 Frame Structure

The frame format for the control frame is comprised of a frame control followed by a payload and frame check sequence (FCS)/status. The frame control comprises control information described below that is used by the receiver to decode the payload. The payload has a varying byte capacity between 3 and 2048 bytes depending on the type of frame.

7.3.1 Frame Control Header

The frame control header has different size and different content attributes for control and data frames. Control frames use a 24 bit frame control while data frames use a 40 bit frame control.

7.3.2 Payload

The payload has different size and different content for control and data frames. The control frame has a fixed 3 byte payload while data frames have a variable payload that may vary from 4-2048 bytes.

7.4 Control Frames

Figure 26:
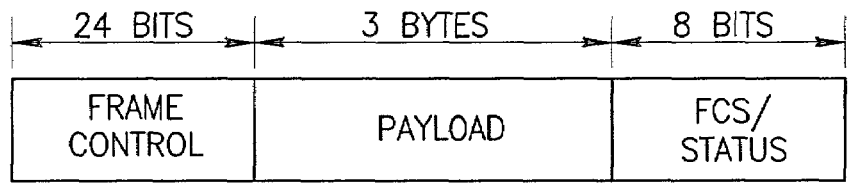
FIG. 26 is a diagram illustrating the structure of a control frame.

A diagram illustrating the structure of a control frame is shown in FIG. 26. The control frame is fixed in length and its format comprises a 24 bit frame control followed by a 3 byte payload and 8 bit frame check sequence (FCS)/status.

7.4.1 Frame Control Header (Control Frame)

The frame control provides parameters about the frame used by the PHY layer. The destination station identifies the frame type and frame parameters using the frame control information. The frame control is a 24 bit field. The bit field definitions are shown below in Table 7.

TABLE 7

Frame Control Fields

| Field | Bit Number | Bits | Definition | Value |
|-------|------------|------|------------|-------|
| CT | 23 | 1 | Conditional Transmission | 0 |
| PL | 20-22 | 3 | Power Level | |
| DC | 19 | 1 | Data/Control frame | 1 |
| R | 18 | 1 | Rate | |
| FT | 16-17 | 2 | Frame Type | |
| TxW | 10-15 | 6 | Tx Wait Time | |
| | 4-9 | 6 | Reserved | '00XXXX' |
| NID | 1-3 | 3 | Network ID | |
| C | 0 | 1 | Confirm | |

7.4.1.1 Conditional Transmission

If the conditional transmission bit (CT) is a '1' then the station transmits only if the CRC of the last received packet was OK. If it is set to '0' then the station transmits regardless of the last packet CRC. This bit is set to '0'.

7.4.1.2 Data/Control Frame Type

If the data/control frame bit (DC) set to '0' indicates a data frame while a '1' indicates a control frame. This bit is set to '0' to indicate a control frame.

7.4.1.3 Rate

The rate bit indicates the rate that is used to transmit the frame. A rate bit of '0' indicates full rate (i.e. symbol duration of 4 μs) while a rate of '1' indicates half rate (i.e. symbol duration of 8 μs).

7.4.1.4 Frame Type

The frame type (FT) field indicates which control frame is being transmitted. The frame type field values are listed below in Table 8.

TABLE 8

Frame Type Field

| FT Value | Interpretation |
|---|---|
| 00 | Request ACK frame (RA) |
| 01 | Request To Send frame (RTS) |
| 10 | Clear To Send frame (CTS) |
| 11 | Acknowledge frame (ACK) |

7.4.1.5 Tx Wait Time

The Tx wait time is a 6 bit field indicating the delay time before starting to transmit after a transmission request. The resolution of the Tx wait time is 4 μsec.

7.4.1.6 Network ID

The 3 bit network ID field indicates the network ID of the modem. This field is configurable by the MAC. The default value of the Network ID is '000'.

7.4.1.7 Confirm Bit

The confirm bit indicates to the source station whether the reception of the previous frame was OK. This bit is set by the PHY layer on the destination station. A value of '0' indicates the last frame was corrupted while a value of '1' indicates the last frame was received correctly. The confirm bit is valid only on receiving. The bit is set to '0' by the MAC layer of the source station.

7.4.2 Control Frame Payload Structure

7.4.2.1 RTS, CTS, RA

Figure 27:
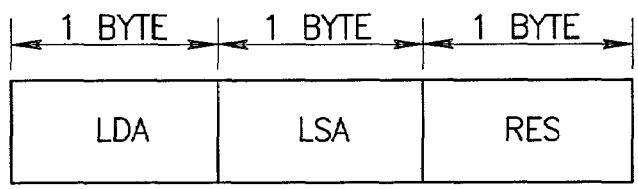
FIG. 27 is a diagram illustrating the payload structure for RTS, CTS and RA control frames.

A diagram illustrating the payload structure for the RTS, CTS and RA control frames is shown in FIG. 27. The 3 byte payload comprises the 1 byte link destination address (LDA), 1 byte link source address (LSA) and 1 byte reservation field. The frame check sequence (FCS)/status follows the payload.

7.4.2.2 ACK Structure

Figure 28:
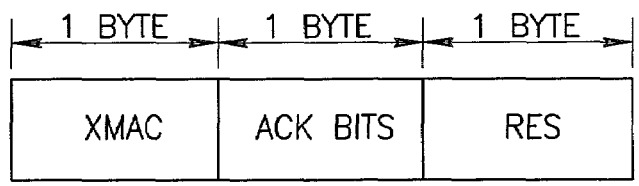
FIG. 28 is a diagram illustrating the ACK frame format.

A diagram illustrating the ACK frame format is shown in FIG. 28. The ACK frame comprises a 1 byte XMAC address, 1 byte acknowledge bits (AckBits) field and 1 byte reservation field. The frame check sequence (FCS)/status follows the payload.

The XMAC field is the XOR product of the 6 byte source MAC station address. The first bit of the XMAC is the XOR of the bit 0 of each of the six bytes of the source station MAC address. The second of the XMAC is the XOR of bit 1 of each of the 6 bytes of the source station MAC address, and so on.

The AckBits field is used to acknowledge receipt of the data frames. Each bit in the AckBits field corresponds to an ACK for one fragment. The position of the ACK bit in the AckBits field corresponds to the frame index within the session. A '0' indicates a positive ACK while a '1' indicates a NACK.

The reservation field is used to reserve the channel for retransmission of the corrupted data frames.

7.4.2.3 FAIL Control Frames

Each control frame has a fail connection indicate option. The fail control frame is identical to the regular control frame with all RES bits set to '0'.

7.4.3 Frame Check Sequence and Status

In the transmit direction the frame check sequence (FCS) is an 8-bit field comprising an 8-bit cyclic redundancy check (CRC). The FCS is calculated using the following standard generator polynomial of degree 8.

$$P_8(X)=X^8+X^7+X^2+1 \tag{13}$$

The $P_8$ generation polynomial is not a maximal-length generation polynomial. In the receive direction the status byte is described as follows in Table 9 below.

TABLE 9

Status Field Description

| Bit # | Description | Interpretation |
|---|---|---|
| 7 | ACK | '1' - The last packet received at the transmitter was OK |
| 4-6 | Channel Quality | 0-3 errors were found<br>4-7 no errors were found |
| 3 | Header | '1' - invalid header or no header was found |
| 2 | Net ID | '1' - wrong Net ID |
| 1 | CRC8 | '1' - CRC8 error was detected |
| 0 | CRC16 | '1' - CRC16 error was detected |

7.5 Data Frames

Figure 29:
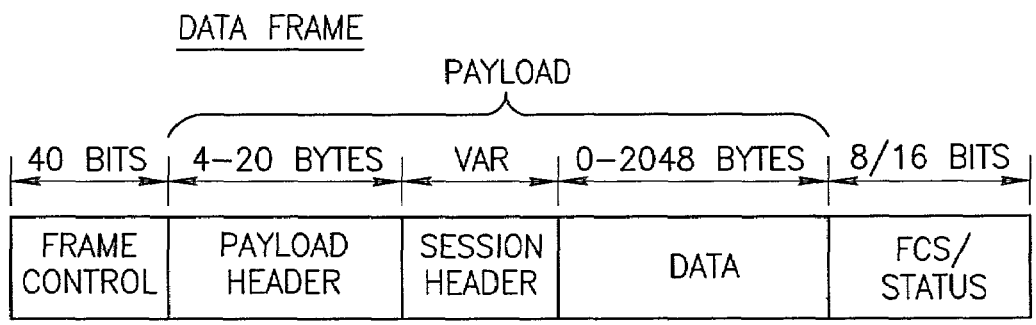
FIG. 29 is a diagram illustrating the structure of a data frame.

A diagram illustrating the structure of a data frame is shown in FIG. 29. The data frame format is comprised of a 40 bit frame control header followed by a variable 4 to 2048 byte payload and an 8/16 bit FCS/status field.

7.5.1 Frame Control Header (Data Frame)

The frame control header comprises information used by the destination station to identify the frame type in addition to information about the address of the destination station. The frame control header is a 40 bit field. The bit field definitions of the frame control header are listed below in Table 10.

TABLE 10

Frame Control Field Definitions

| Field | Bit # | Bits | Definition |
|---|---|---|---|
| CT | 39 | 1 | Conditional Transmission (see Section 7.4.1.1) |
| PL | 36-38 | 3 | Power Level |
| DC | 35 | 1 | Data/Control, set to '0' for Data (see Section 7.4.1.2) |

TABLE 10-continued

Frame Control Field Definitions

| Field | Bit # | Bits | Definition |
|---|---|---|---|
| R | 34 | 1 | Rate (see Section 7.4.1.3) |
| PP | 32-33 | 2 | Bits per symbol |
| TxW | 26-31 | 6 | Tx Wait Time (see Section 7.4.1.5) |
| Reserved | 24-25 | 2 | Set to '00' |
| DR | 23 | 1 | Double Rate |
| LEN MSB | 20-22 | 3 | MSB of the length field |
| NID | 17-19 | 3 | Network ID (see Section 7.4.1.6) |
| C | 16 | 1 | Confirm = '0' (see Section 7.4.1.7) |
| LEN LSB | 8-15 | 8 | LSB of the length field |
| FCS | 0-7 | 8 | Frame Check Sequence (see Section 7.4.2.3) |

7.5.1.1 Bits Per Symbol

The PP field indicates the number of bits per symbol. A PP value of '00' indicates 4 bits per symbol; '01' indicates 5 bits per symbol; '10' indicates 6 bits per symbol; and '11' indicates 7 bits per symbol.

7.5.1.2 Double Rate

The double rate (DR) bit indicates whether the frame is transmitted in double rate. Up to 6 bits per symbol can be used while operating with this rate. A value of '0' indicates the rate is according to the R and PP fields. A value of '1' indicates double rate operation, the PP field cannot be '11'.

7.5.1.3 Payload Length

The payload length field indicates the length of the payload field in bytes. The field is divided into two fields: a MSB LEN representing the 3 MSB bits of the data length and a LSB LEN field representing the 8 LSB bits of the data length. The 11 bit payload length field allows payloads having a maximum length of 2048 bytes.

7.5.2 Data Frame Payload Structure

A diagram illustrating the structure of a data frame is shown in FIG. 29. The payload portion of the data frame comprises a 4-20 byte payload header, variable length session header and 0-2043 byte data field. The payload is preceded by a 40 bit frame control and followed by the 8/16 bit frame check sequence (FCS)/status field.

7.5.2.1 Data Frame Payload Header

Figure 30:
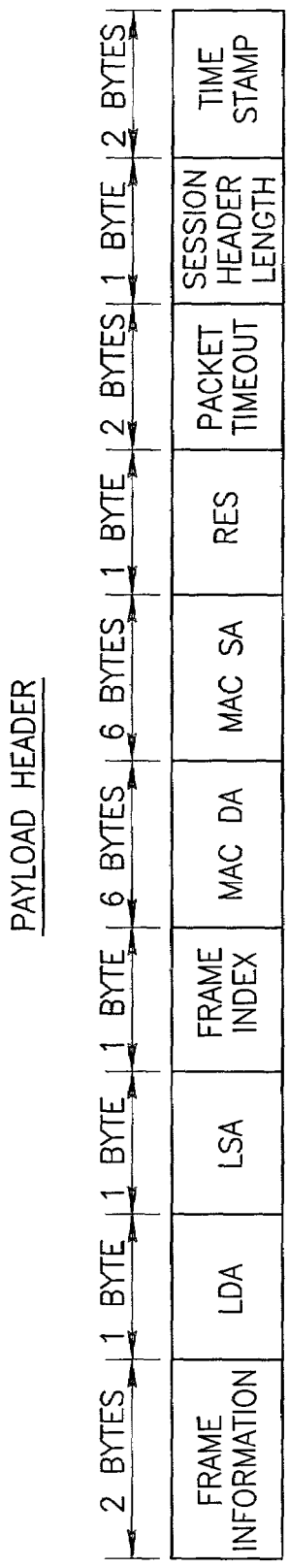
FIG. 30 is a diagram illustrating the structure of the payload header portion of a data frame.

A diagram illustrating the structure of the payload header portion of a data frame is shown in FIG. 30. The payload header is variable length and can vary between 4 bytes (for SST with VLA=1) to 19 bytes (for SST with VLA=0 and using a repeater). The payload header comprises the following fields: 16 bit frame information field, 8 bit LDA (only when VLA=1), 8 bit LSA (only when VLA=1), 8 bit frame index field (only in LST sessions), 48 bit destination MAC address (only in SST frames with VLA=0), 48 bit source MAC address (only in SST frames with VLA=0 and only in first frame or in SST frames), 8 bit reservation (RES) field (only on the first frame or first retransmission or SST frames), 16 bit packet timeout field (only when the session is sent to the repeater), 1 byte session header length field (only when LSHV=1) and a 2 byte transmitter time stamp field (only when TSE=1).

7.5.2.1.1 Frame Information

Figure 31:
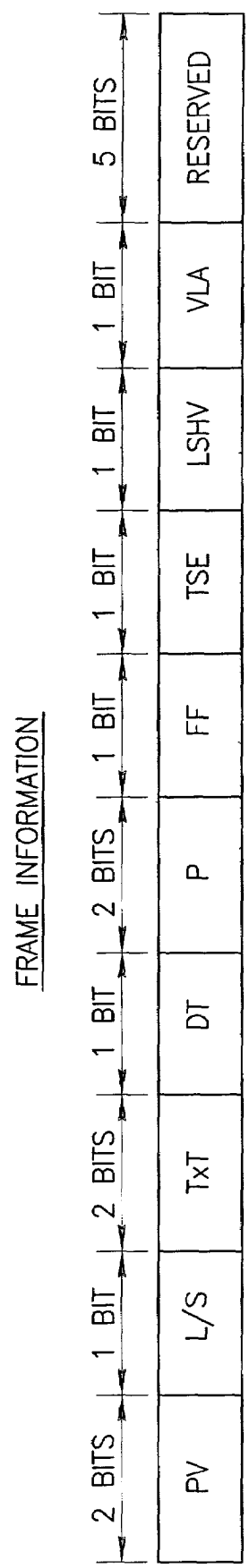
FIG. 31 is a diagram illustrating the structure of the frame information field of a data frame.

A diagram illustrating the structure of the frame information field of a data frame is shown FIG. 31. The 16 bit frame information field comprises the fields listed below in Table 11.

TABLE 11

| Frame Information fields | | | |
|---|---|---|---|
| Field | Bit # | Bits | Definition |
| PV | 14-15 | 2 | Protocol version ='00' |
| L/S | 13 | 1 | LST or SST |
| TxT | 11-12 | 2 | Transmission Type |
| DT | 10 | 1 | Data Type |
| P | 8-9 | 2 | Frame priority |
| FF/ACK | 7 | 1 | In LST - First frame indication In SST - ACK/No ACK indication |
| LSHV | 6 | 1 | Long Session Header Valid |
| TSE | 5 | 1 | Time Stamp Exists |
| VLA | 4 | 1 | Valid LA - Valid in SST session (reserved for LST) |
| Reserved | 0-3 | 4 | Reserved bits |

The protocol version field indicates the MAC version that is in use. The transmitter sets these bits to '00' assuming there is only one version in use. The receiver discards the frame if the PV is other than '00'. The L/S type field indicates whether the frame comprises an LST or SST session. A '0' indicates LST session while '1' indicates SST session. The transmit type field indicates the type of transmission as follows: '00' indicates unicast transmission; '10' multicast data frame; '11' broadcast data frame ('01' is reserved).

The data type field indicates the type of data frame as follows: '0' indicates a data frame and '1' indicates a management frame. The priority bits determine the priority of the current data session wherein '00' is the lowest priority and '11' the highest.

The first frame/ACK field has different meanings for LST and SST sessions. For an LST session this field indicates whether the frame is a first frame or a first retransmission as follows: '0' indicates $2^{nd}$ to $8^{th}$ frame and '1' indicates first frame or first retransmission. For an SST session this field indicates whether the ACK is required or not from the destination station. A '0' indicates no ACK is required and '1' indicates an ACK is required.

The LSHV field indicates if the session contains more than a single packet. If the session header consists of more than one packet then the payload header contains the session header length field. A LSHV value of 0 indicates the session contains a single packet while a value of 1 indicates the session contains two or more packets. The TSE field functions to indicate whether the time stamp field exists. A TSE value of 0 indicates no time stamp while a value of 1 indicates the time stamp exists.

The valid LA (VLA) field is valid only in SST frames. In LST frames this bit is set to '0' by the transmitter and ignored by the receiver. The VLA bit in the frame information field is used to indicate whether the LA address is valid. A '0' indicates the LA is not valid and '1' indicates the LA is valid. If LA is not valid, the source and destination MAC addresses are used.

7.5.2.1.2 Frame Index

The 8 bit frame index field comprises two sub fields: a 4 bit total frames field and a 4 bit frame index. The total frames represents the total number of frames in the session and the frame index represents the index of the frame within the session.

7.5.2.2 Frame Check Sequence/Status

At the transmitter there are two FCSs: (1) a header FCS comprising the last 8 bits of the frame control header and (2) a data FCS following the payload field. At the receiver a status byte is inserted following the end of the payload field as specified supra in Section 7.4.3. The header CRC is the same as the 8-bit CRC of the control frame (see Section 7.4.3). The data FCS is a 16-bit field comprising a 16-bit cyclic redundancy check (CRC). The data FCS is calculated using the following standard generator polynomial of degree 16.

$$P_{16}(X)=X^{16}+X^{15}+X^{2}+1 \qquad (16)$$

7.5.3 Broadcast Payload Structure

The broadcast payload is similar to the regular data payload with the difference being that the payload header comprises two additional fields: a broadcast ID (BID) and hops to live (HTL) field. See Section 3.3.2.

7.5.4 Multicast Payload Structure

Figure 32:
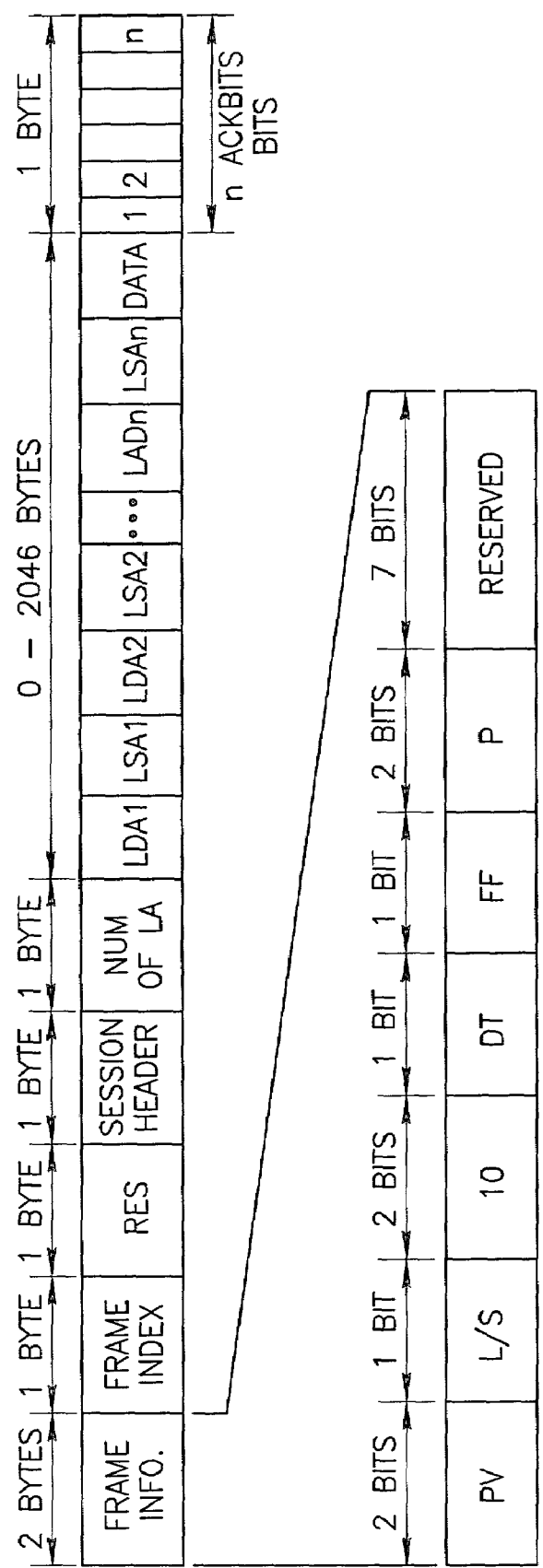
FIG. 32 is a diagram illustrating the payload structure of a multicast data frame.

A diagram illustrating the payload structure of a multicast data frame is shown in FIG. 32. The multicast payload comprises a 2 byte frame information (see Section 7.5.2.1.1), 1 byte frame numbering (exists only in LST session) (see Section 7.5.2.1.1), 1 byte RES (exists only on first frame or first retransmission or on SST), 1 byte session header field, 1 byte NumOfLA representing the number of stations in the multicast group, 16 bit LDAx, LSAx fields for destination 'x', payload data followed by 1 byte AckBits requesting ACK from destination 'x'. Note that the AckBits are zero padded in order to complete a whole bytes. Note that the transmission type T×T field in the frame information field is set to '10' to indicate a multicast transmission. The frame information field also includes 2 bit PV, 1 bit L/S, 1 bit DT, 1 bit FF, 2 bit P and 7 bits reserved fields.

8 Layer Management

8.1 Link Address Assignment Process

As described above, the 6 byte MAC address is used to identify each station on the network. The necessity of using 6 bytes for each station arises from the fact that a MAC address is a unique identification of a station not only in the logical network but also as a physical entity. In a logical network, however, logical addresses can be assigned to reduce the size of the address space. For example, if the logical network has up to 256 stations, a one byte logical address is sufficient, thus reducing the address size by more then 80%. As described above, station addresses are used in the RTS and CTS frames, thus reducing the overhead of the addresses and thereby significantly reducing the overall overhead of the MAC layer.

The deployment of logical addresses in a centrally controlled network is performed as follows. Each station that joins the network is allocated a logical address by the central controller. In a distributed network, the process of assigning logical address must also be done in a distributed way. The main problem of assigning a logical address in a distributed network is making sure that a station does not choose a logical address that is already in use.

To ensure that logical addresses are unique, the present invention provides a joint process executed between stations. The invention also enables a very effective implementation of the link address in terms of memory allocation and address search time. In accordance with the MAC protocol of the present invention, rather than use a 2-byte logical address made up of a 1-byte source and 1-byte destination address, a 2-byte link address (LA) is used instead. In each transmission only a single 2-byte LA is used having the same overhead as a two byte logical address. The LA is a unique address identifying the link between two stations as opposed to logical and MAC addresses that represent unique addresses of the stations in the network. The advantage of using a link address (as opposed to a station address) is that while retaining the same address size and overhead (i.e. 2 bytes) a much larger address space is obtained, i.e. $2^{16}$ compared to $2^{8}$ using logical addresses.

When a new connection between two stations in the network is to be set up, a new LA between these two stations is established. The LA is composed of two 1-byte parts each: a Link Source Address (LSA) and Link Destination Address (LDA). The LSA is associated with the transmitting station and the LDA with the receiving station. The LSA and LDA are chosen at random by each station from the unused values stored in an address table maintained by each station. The values may range from 0x00 to 0xFD. Note that the value 0xFF is not legal for both LSA and LDA and is used only for BLA broadcast transmission.

Each station maintains the address table with all the assigned LAs associated with other stations. When one or more repeaters are used, there may be more than one LA associated with each station. A station that receives a request to establish a new LA with a station whom it already has established a LA, discards the old LA and establishes a new LA.

The link address is used for all transmissions between a single pair of stations. Each station maintains an address table with the defined pairs of LSA and LDA, one entry for each link. Each station also maintains a table storing the bi-directional mapping between MAC address and link address, such as by maintaining a doubly linked list. In general, a link address is established using the link address table. The table has a length of 256 wherein each record is adapted to store 8-bits of link address and various statistics related data such as number of successful and failed frame transmissions, number of frames received in error, number of ACKs sent and received, number of retransmissions, etc. A value of 0xFF stored in the table indicates that the link address is available. At power up and after a reset, the contents of the table are initialized to 0xFF. A message with the broadcast link address of 0xFFFF is recognized by each station as a broadcast transmission. Thus, the 256$^{th}$ entry is reserved and cannot be used for unicast messages.

The transmitting source station randomly selects an address from the available address entries in the link address table. The address selected serves as the lookup into the table and is the LDA for the source station. The station sends the LDA chosen to the destination receiving station. The destination then chooses an entry at random from its available address entries in its link address table. The destination station stores the LDA received in the table. The address where the LDA is stored is the LSA and is returned to the source station. Upon receipt, the source station stores the LSA received in the table at the LDA address.

When sending a message, the source station forms the LA by first looking up the LA using the destination MAC address.

The LA is then formed using the LDA (i.e. lookup address into the table) and the LSA, (i.e. the contents of the table at the LDA address).

At the destination, the LA is examined to determine if the message is destined to that station. This is done by using the second half of the LA (i.e. the LSA sent by the source) as the lookup address into its table and comparing the contents with the first half of the LA in the message (i.e. the LDA sent by the source).

The link address assignment process can be accomplished using both long RTS and long CTS frames or by using two management frames: link address set (LAS) and link address set response (LASR). The LAS frame is sent by the initiating station and comprises the LDA portion of the LA. The LASR frame is sent by the destination station and comprises the LSA portion of the LA. The process of establishing link address is described in the following subsections.

8.1.1 Link Address Establishment Using Management Frames

In accordance with the present invention, two stations communicate with each other using link addresses. The following process is used to establish a link address between two stations using LAS and LASR management packets. Before the link address is established, however, communication is accomplished using SST packets with ACK and VLA=0.

Figure 33:
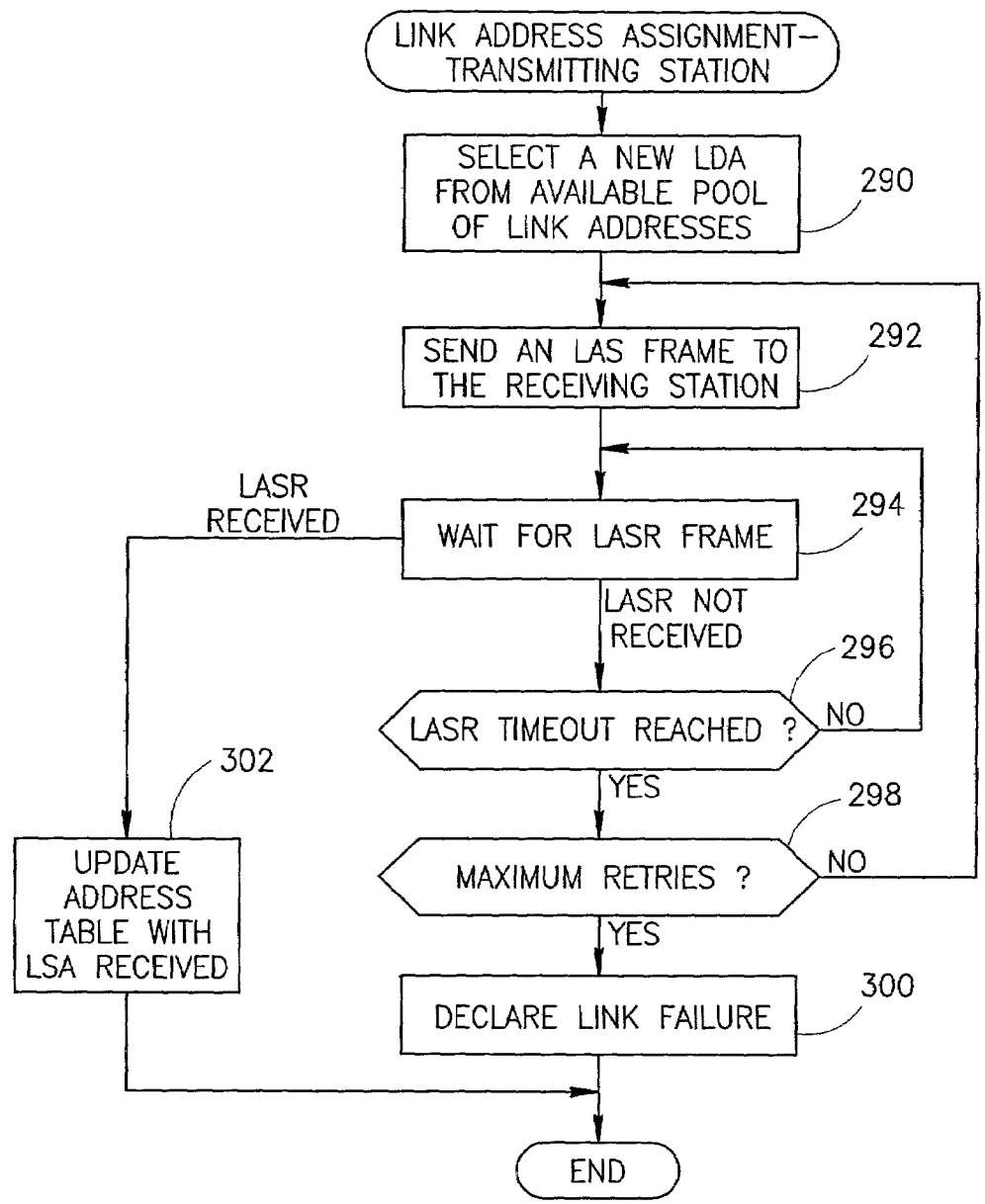
FIG. 33 is a flow diagram illustrating the link address assignment method for the transmitting station.

A flow diagram illustrating the link address assignment method for the transmitting station is shown in FIG. 33. First, the transmitting station randomly selects a new LDA from a list of free LDAs (step 290). An LAS frame with the new LDA is then sent to the receiving station (step 292). The transmitting station then waits for receipt of a LASR frame from the destination station (step 294). If the LASR frame is received, the address table is updated with the LSA received (step 302). Otherwise, if the LASR timeout is reached (step 296), the process is repeated MAX_LAS_retries number of times (step 298). If the LASR frame is not received after a maximum number of retires, a link failure is declared (step 300).

Figure 34:
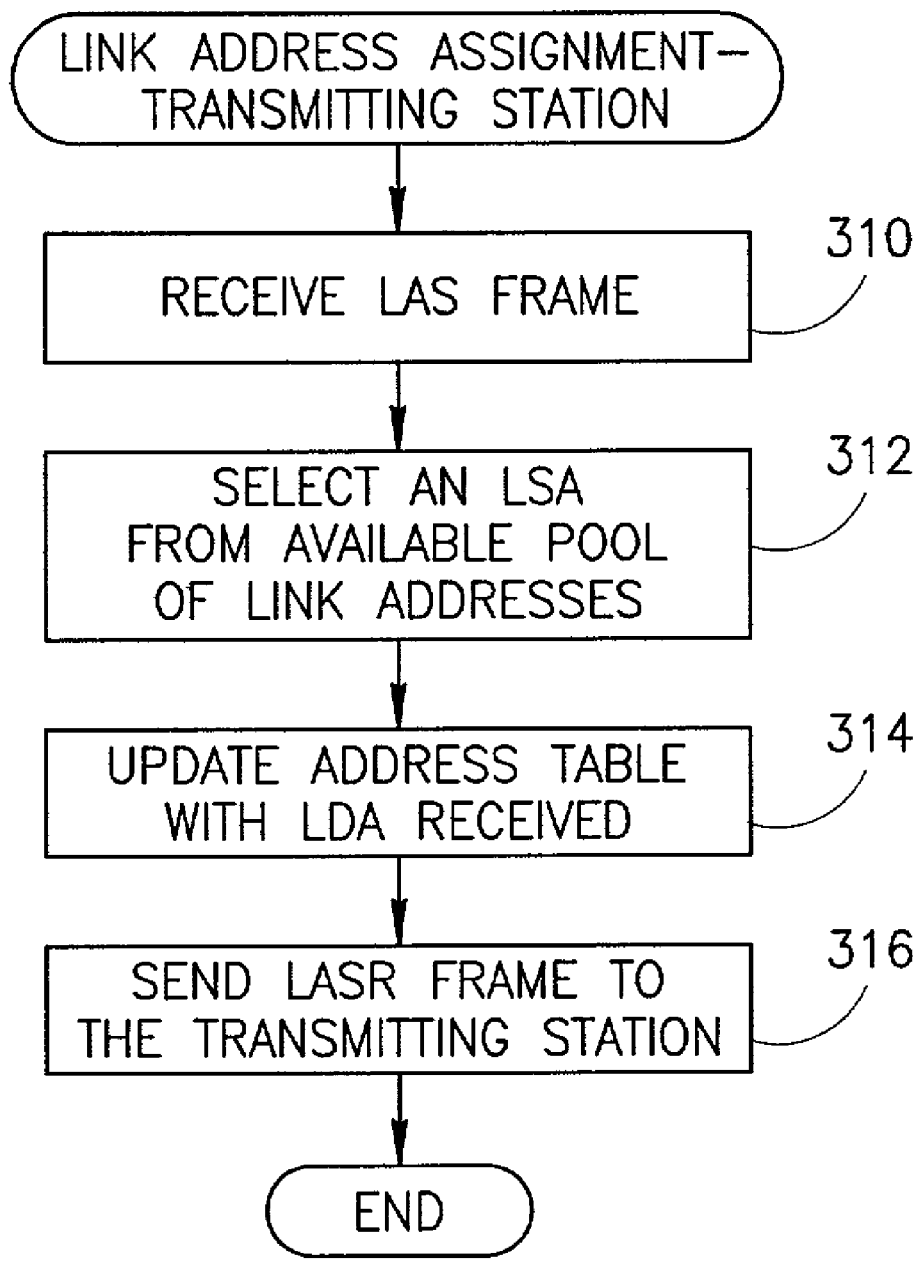
FIG. 34 is a flow diagram illustrating the link address assignment method for the receiving station.

A flow diagram illustrating the link address assignment method for the receiving station is shown in FIG. 34. The LAS frame is received from the transmitting station (step 310). The destination station then randomly selects a new LSA from the available pool of LSAs (step 312). The destination station then updates its address table with the LDA received thus completing the LA (step 314). It then sends the selected LSA in a LASR frame to the transmitting station (step 316) whereupon it is recorded in the transmitting station's address table.

Note that if the LASR is not acknowledged, the destination station marks the new LA as 'questionable,' but does not delete its entry from its LA table. If a session is initiated by the transmitting station using the new LA, the receiving station changes the LA status to 'established.' If the receiving station must initiate a new session with the transmitter, the 'questionable' LA is not be used and a new LA is established.

8.1.2 Link Address Establishment Using Long RTS CTS Frames

The channel is captured using long RTS and long CTS control frames. The transmitting station assigns the LDA using the LDA field of the long RTS and the receiving station responds by assigning the LSA using the LSA field in the long CTS, thus completing the new LA. The advantage of using long RTS and CTS frames is that there is no need to wait until the LA is established before transmitting host data packets.

8.1.3 Link Address Duplication Resolution

The LA algorithm described above in combination with the large link address space ($2^{16}$ possible link addressed) significantly reduces the possibility of a collision. Duplicate link addresses may, however, occur in some extreme cases. The MAC protocol of the present invention includes a mechanism to resolve duplicate link addresses. The occurrence of a duplicate link address may cause either of the following effects: (1) the CTS response frames from two stations collide preventing the reception of either at the source station or (2) only one CTS response frame is received but from the wrong station, (3) both stations respond with CTS response frames, both of which are correctly received at the source station.

The first case is likely to result in a link failure since the source is unable to transmit to the destination station. To resolve this type of duplicate address problem, the source station attempts to establish a new link address (using the management frames method) before a link failure is declared.

The second and third cases are likely to result in the packet being received by the wrong station. To resolve this type of duplicate address problem, the source station inserts the MAC address of the destination station into the packet. Upon receiving the packet, the destination station checks the MAC address, if there is no match, the destination discards the packet and established a new LA. Otherwise, processing proceeds as described above.

8.2 Power and Rate Adaptation

The power and rate adaptation process assumes that the physical layer is adapted to change its power and rate settings during a transmission session. The algorithm is suitable to transceiver implemented comprising a physical layer having this capability. The MAC protocol is adapted to change the power level and rate of an ongoing connection to enhance the connectivity and reliability in the network. The MAC layer manages the rate and power utilizing statistics gathered from the channel.

The power level and rate combination is defined as a power level and rate (PLR) state. The PLR states range from 1 through m with PLR state 1 corresponding to minimum power level and maximum rate while PLR state m corresponds to maximum power level and minimum rate. For each link, the transmitter dynamically calculates the percentage of corrupted data frames, PrErrData using Equation 11 presented below.

The PLR state does not change during a session. The decision to increase, decrease or not change the PLR state is preformed by the transmitter before the transmission of the first RTS frame of a session. The length of the fragment FragmentLength is determined in accordance with the transmission rate. If the transmission of MaxFragNumber data frames exceed Session_Timeout, the length of the fragment is decreased to fit the Session_Timeout limit (see Section 3.3).

The reservation field in the ACK frame is calculated according to the transmission rate used by the transmitter. When the session is finished, the transmitter records the power level and rate used in the transmission. The power level and rate records are used for the next transmission on the same link.

In accordance with the invention, each station maintains a database, named NeighboredStations, for storing gathered statistics. The NeighboredStations database comprises an entry for each link maintained by the station. Each entry comprises the following fields:

| | |
|---|---|
| LastPL | the last power level that was used in this link; |
| LastRate | last rate that was used in this link; |
| PrErrData | percentage of corrupted data frames; |

Note that the LastPL and LastRate fields are updated when a station finishes transmitting a session. The quantity PrErrData is calculated using two counters as follows $$PrErrData[\%] = \left((1-\alpha) \times \frac{ErrDataFrame}{TotalNumOfRecData} + \alpha \times PrErrData/100\right) * 100 \quad (17)$$

where

TotalNumOfRecData is the total number of data frames received from this link (including erroneous data frames);

ErrDataFrame is the number of erroneous data frames received over this link;

$\alpha$ is the weight assigned to the statistics history;

The TotalNumOfRecData and ErrDataFrame quantities are updated when the station is receiving or transmitting a session. The quantity PrErrData is reset to zero upon a change in the PLR state.

The PLR state changes occur as follows. If the PrErrData is higher than DecPLRThreshold the transmitter decreases the PLR state. The DecPLRThreshold is equal to PLIncThreshold for PLR states 1 through PLR state n. The DecPLRThreshold is equal to RDecThreshold for PLR states n+1 through PLR state m. After decreasing the rate for a particular link, the transmitter resets all the counters for the link.

If the PrErrData is lower than IncPLRThreshold for NumOfGoodSessions, the transmitter increases the PLR state. The NumOfGoodSessions is equal to PLDecThreshold for PLR states 1 through PLR state n. The NumOfGoodSessions is equal to RIncThreshold for PLR states n+1 through PLR state m. After increasing the rate for a link, the transmitter resets all the counters for the link.

To adapt to the TCP protocol the initial PLR level is set to the lowest level, to ensure connectivity, and IncPLRThreshold and DecPLRThreshold start from a small value, and increase with each PLR state, until they reach their final value.

8.3 Statistics

In accordance with the invention, a station receives statistics from other stations using a request to gather statistic frame (RGS). The stations that receive the request respond using a gathered statistics response (GSR) frame. The GSR frame is transmitted as a broadcast session with MAX_HTL initialized to zero. Optionally, each station is adapted to broadcast a GSR frame with MAX_HTL equal to zero periodically every StatInterval. In addition, each station broadcasts a management frame that includes the type of priority it transmitted in the past StatInterval seconds. The stations add the received information to their statistics and calculate CWMin values accordingly.

9 Layer Management Frame

Figure 35:
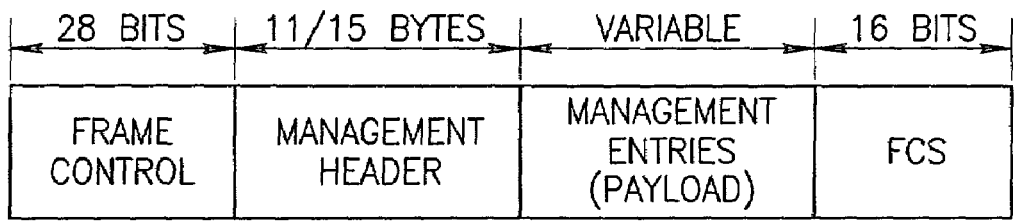
FIG. 35 is a diagram illustrating the structure of a management frame.

The MAC protocol is adapted to provide several different types of management frames. A diagram illustrating the structure of a management frame is shown in FIG. 35. The management frame format is based on the SST data frame format and comprises a 28 bit frame control header followed by 11/15 byte management header, variable length management entries (payload) and a 16 bit FCS.

9.1 Frame Control Header (Management Frame)

The format of the frame control header is the same as that for the data frame described in more detail supra in Section 7.5.1.

9.2 Management Header

Figure 36:
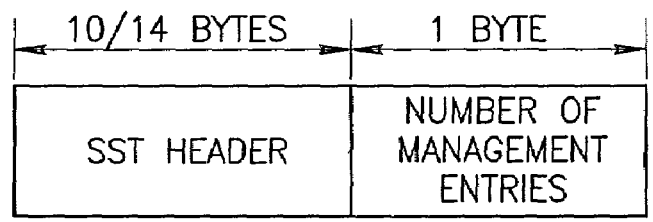
FIG. 36 is a diagram illustrating the structure of the header portion of a management frame.

A diagram illustrating the structure of the header portion of a management frame is shown in FIG. 36. The management header comprises a 10/14 byte payload header with flags set to indicate SST header followed by a 1 byte number of management entries field. The SST header is described above in Section 7.5.1

9.3 Management Entries

Figure 37:
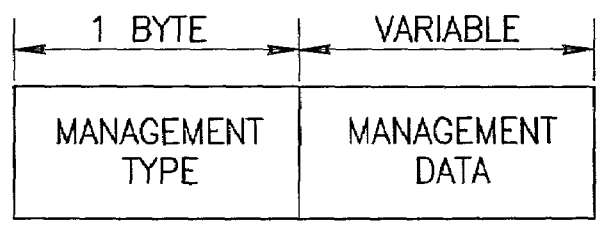
FIG. 37 is a diagram illustrating the structure of the management entry portion of a management frame.

A diagram illustrating the structure of the management entry portion of a management frame is shown in FIG. 37. Each management entry comprises a 1 byte management type (MT) field followed by a variable length management data (MD) field.

9.3.1 Management Type

The possible values of the management type field (MT) are listed below in Table 12.

TABLE 12

Management Type Field Values

| MT Value | Frame Type |
|---|---|
| 0x00 | LAS frame |
| 0x01 | LASR frame |
| 0x02 | RS frame |
| 0x03 | SCR frame |
| 0x04 | LE frame |
| 0x05 | LER frame |
| 0x06 | FC frame |
| 0x07 | Long RTS |
| 0x08 | Long CTS |
| 0x09 | RSR frame |
| 0x0A | RCS frame |
| 0x0B | CSR frame |
| 0x0C | RGS frame |
| 0x0D | GSR frame |
| 0x0E | RGTU frame |
| 0x0F | GTUR frame |
| 0x10-xFF | Reserved |

9.3.2 Management Data

9.3.2.1 Link Address Set (LAS)

The LAS entry is used for assigning a link address (LA) between two stations (see Section 8.1). The LAS entry comprises a one byte management entry consisting of the link destination address (LDA).

9.3.2.2 Link Address Set Response (LASR)

The LASR entry is used by the receiving station to acknowledge the LAS frame during the link address assignment process (see Section 8.1). The LASR entry is a one byte management entry comprising the link source address (LSA).

9.3.2.3 Repeater Search (RS)

The RS entry is sent as a broadcast session by a source station to search for a potential repeater station (see Section 4). The RS entry is a 12-byte management entry comprising the 6 byte original destination MAC (ODM) address followed by the 6 byte original source MAC (OSM) address.

9.3.2.4 Source Cancel Repeater (SCR)

The SCR entry is sent by the original source to the repeater in order to terminate its role as a repeater. The SCR entry is a 6-byte management entry comprising the 6 byte original destination MAC address (ODM).

9.3.2.5 Link Exist (LE)

The LE entry is sent by the original source station to the original destination station for purposes of checking whether a direct link exists between the two stations. The LE entry has no management data.

9.3.2.6 Link Exist Response (LER)

The LER entry is sent by the receiver to indicate that the LE was received. The LER entry has no management data.

9.3.2.7 Fail Connection (FC)

The FC entry is sent by the repeater to the original source station to indicate that communications with the original destination station has failed and that transmission may or may not occur. The FC is a one-byte management entry comprising the 6 byte original destination MAC address.

9.3.2.8 Long RTS/CTS

For purposes of synchronization and assignment of link address, as described hereinabove, the MAC protocol is adapted to provide long RTS and CTS frame transmission. The long RTS/CTS entry comprises a 4-byte management entry of LDA/LSA followed by RES and TTT as shown below in Table 13.

TABLE 13

Long RTS/CTS Management Entry

| Field | Bit # | Bits | Definition |
|---|---|---|---|
| LDA/LSA | 24-31 | 8 | LDA if Long RTS is transmitted LSA if Long CTS is transmitted |
| RES | 16-23 | 8 | Reservation field as in RTS and CTS control frames. |
| TTT | 0-15 | 16 | Time To Tick |

9.3.2.9 Repeater Search Response (RSR)

The RSR entry is sent by a repeater station as an acknowledgement to an RS frame. The RSR entry is a 14-byte management entry comprising the destination MAC address followed by the source MAC address, PLR states between the repeater and the OS station and PLR states between the repeater and the OD station. The RSR management entry field definitions are presented below in Table 14.

TABLE 14

RSR Management Entry

| Field | Bit # | Bits | Definition |
|---|---|---|---|
| DM | 64-111 | 48 | MAC address of the original destination station |
| SM | 16-63 | 48 | MAC address of the original source station |
| PLR_OS1 | 12-15 | 4 | PLR state between OS and the Repeater |
| PLR_OS2 | 8-11 | 4 | PLR state between Repeater and the OS |
| PLR_OD1 | 4-7 | 4 | PLR state between Repeater and the OD |
| PLR_OD2 | 0-3 | 4 | PLR state between OD and the Repeater |

9.3.2.10 Request Channel Sounding (RCS)

The RCS entry is sent by a station in order to request channel sounding parameters. The RCS has no management data.

9.3.2.11 Channel Sounding Response (CSR)

The CSR entry is sent by a station as a response to an RCS frame. The CSR frame is a 2-byte management entry comprising CQ, AvgCQ, CS_TxDataCounter and CS_TxFailCounter (see Section 1.11) as described below in Table 15.

TABLE 15

CSR Management Entry

| Field | Bit # | Bits | Definition |
|---|---|---|---|
| CQ | 12-15 | 4 | Channel quality of received RCS |
| AvgCQ | 8-11 | 4 | Average Channel quality |
| PrErrData | 0-7 | 8 | Percentage of fail data frame for the current link |

9.3.2.12 Request to Gather Statistics (RGS)

The RGS entry is sent by a station to request statistics parameters from other stations. The RCS has no management data.

9.3.2.13 Gathered Statistics Response (GSR)

The GSR entry is sent by a station as a response to an RGS frame (see Section 1.12). The GSR is a 19-byte management entry comprising statistics parameters as shown below in Table 16.

TABLE 16

GSR Management Entry

| Field | Bit # | Bits | Definition |
|---|---|---|---|
| TxPrCounter00 | 136-151 | 16 | Number of transmitted data frames having Priority 00 |
| TxPrCounter01 | 120-135 | 16 | Number of transmitted data frames having Priority 01 |
| TxPrCounter10 | 104-119 | 16 | Number of transmitted data frames having Priority 10 |
| TxPrCounter11 | 88-103 | 16 | Number of transmitted data frames having Priority 11 |
| RxPrCounter00 | 72-87 | 16 | Number of received data frames having Priority 00 |
| RxPrCounter01 | 56-71 | 16 | Number of received data frames having Priority 01 |

TABLE 16-continued

GSR Management Entry

| Field | Bit # | Bits | Definition |
|---|---|---|---|
| RxPrCounter10 | 40-55 | 16 | Number of received data frames having Priority 10 |
| RxPrCounter11 | 24-39 | 16 | Number of received data frames having Priority 11 |
| PrErrData | 16-23 | 8 | Percentage of failed data frames from the station transmitting the RGS |
| AvgCQ | 8-15 | 8 | Average channel quality of transmission from the station transmitting the RGS |
| TxRate | 5-7 | 4 | Transmit Rate to the station transmitting the RGS |
| TxPowerLevel | 0-4 | 4 | Transmit Power Level to the station transmitting the RGS |

9.3.2.14 Request Global Time Update (RGTU)

The RGTU entry is sent by a station to request global time (see Section 1.10). The RGTU has no management data.

9.3.2.15 Global Time Update Response (GTUR)

The GTUR entry is sent by a station as a response to an RGTU frame (see Section 1.10). The GTUR is a 2-byte management entry comprising a 16 bit time to tick (TTT) field.

9.3.3 Management Frames Priorities

Management frames, which are transmitted before a session, are assigned a priority one higher than the session (if such a priority level exists). These frames include: LAS, LASR, long RTS/CTS, RS, RSR, SCR, LE, LER and FC. Management frames sent as a response containing important information for immediate use by the station are assigned the highest priority. These frames include: RCS, CSR, RGTU and GTUR. Management frames requesting or containing information for general use and continued operation of a station are assigned the lowest priority. These frames include: RGS and GSR.

Station Incorporating the Media Access Controller

Figure 38:
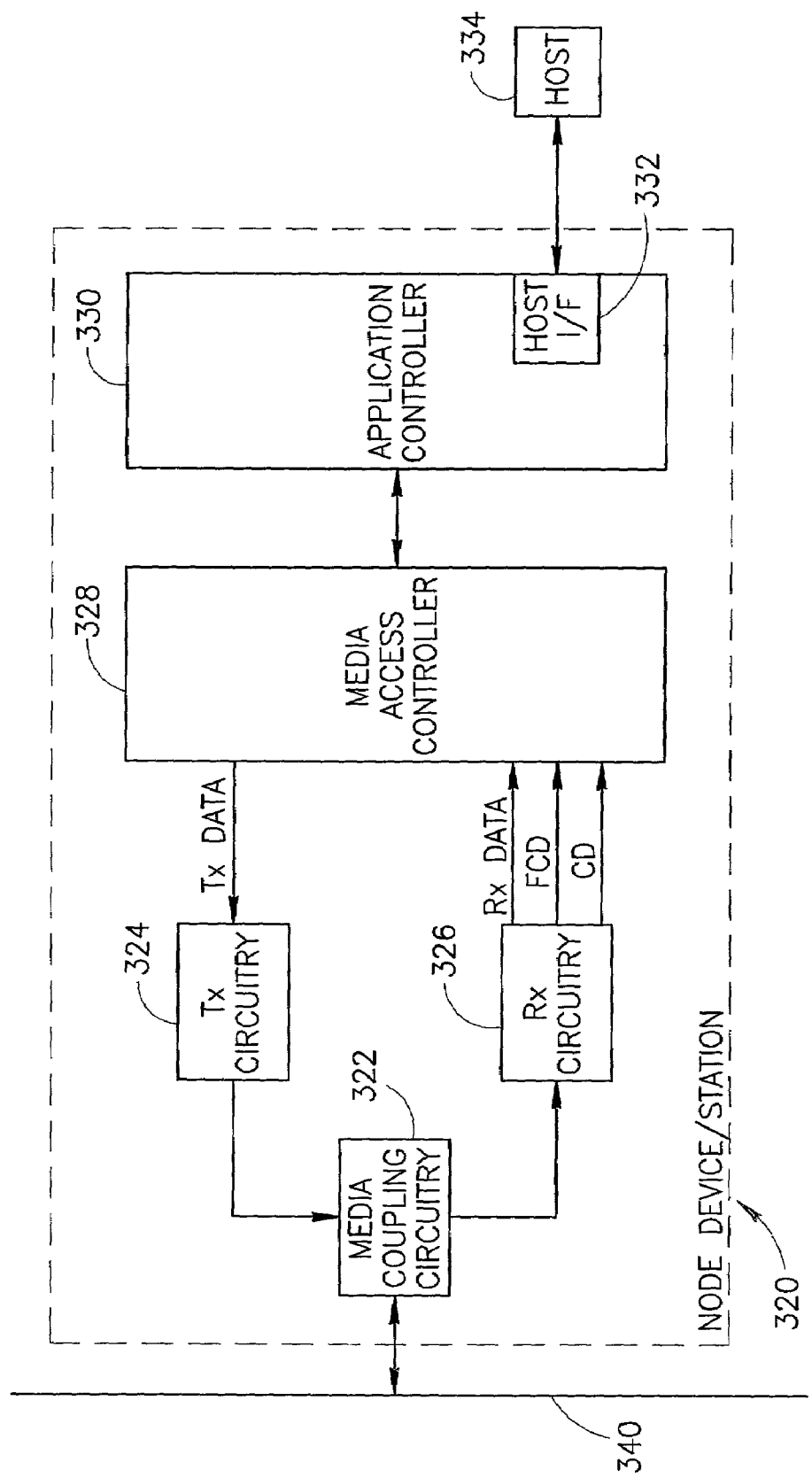

An example embodiment of a node device incorporating a media access controller (MAC) of the present invention will now be described. A block diagram illustrating an example station adapted to perform the MAC protocol mechanism of the present invention is shown in FIG. 38. The station, generally referenced 320, represents a station that may operate stand alone or may be incorporated within a network device such as a switch, router, hub, broadband modem, cable modem, PLC based modem, etc. for performing communication functions (i.e. implementing OSI stack protocol functions including MAC functionality). The node device comprises an application processor 330 with associated static, dynamic, volatile and/or non-volatile memory (not shown) in communication with the processor. The application processor is also in communication, via a host interface 332, with a host computing device 334. The host may be adapted to communicate over one or more other networks.

The station also comprises media coupling circuitry 322 that functions to interface the station to the shared media 340. Transmit circuitry 324 and receive circuitry 326 communicate over the media via the media coupling circuitry. The Rx circuitry is adapted to provide not only the received data but also the FCD and CD carrier detect signals that are used by the MAC during the channel contention period. The media access controller (MAC) 328 functions, on one side, to provide transmit data to the transmit circuit and to receive data from the receive circuit. On the processor side, it interfaces to the application processor. The MAC is adapted to implement the MAC protocol layer functionality of the present invention including controlling access to the shared media using the methods and techniques described above.

Note that the media access control may be implemented in software and adapted to reside on a computer readable medium, such as a magnetic disk, floppy disk, Flash memory card, EEROM based memory, bubble memory storage, RAM storage, ROM storage, etc. The software may also reside, in whole or in part, in the static or dynamic main memories or in firmware within the processor of a computer system. The processor may comprise any suitable processing means including microcontroller, microcomputer, microprocessor, digital signal processor, FPGA core, ASIC core, etc. In particular, the media access control software comprises a sequence of instructions which, when executed by the processor, cause the computer system to perform the steps of any of the MAC layer methods described hereinabove.

In alternative embodiments, the present invention may be applicable to implementations of the methods and apparatus described above in integrated circuits, especially Application Specific Integrated Circuits (ASICs), Field Programmable Gate Arrays (FPGAs) or chip sets, wireless modem implementations, powerline modem implementations, switching system products and transmission system products. Note that a combination of software and hardware can also be implemented, the former performing the complex operations and the latter performing the time critical operations.

For the purpose of this document, the terms switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of accessing a channel in a communication transceiver coupled to a communications channel, the transceiver adapted to provide carrier sense signals including a fast carrier detect (FCD) signal to predict the early start of transmission on said channel and having a high false alarm rate and a carrier detect (CD) signal having a low false alarm rate and indicating that a transmission is starting, said method comprising the steps of:

establishing a channel contention period divided into a plurality of time slots, the width of each time slot substantially equal to the time of said FCD signal;

initializing a backoff counter with a backoff count equal to a random number of time slots;

decrementing said backoff counter while said medium is idle;

suspending said backoff counter upon receipt of a FCD signal;

resuming decrementing said backoff counter upon failure of a CD signal to arrive within a CD time, said CD time proportional to a time period during which the arrival of a CD signal is expected in the event a transmission is received;

deferring transmission until a next contention period upon receipt of a CD signal; and starting transmission upon expiration of said backoff counter.

2. The method according to claim 1, wherein termination of said current transmission session is indicated by a change in state of said channel from busy to contention.

3. The method according to claim 1, further comprising inserting a contention interframe space (CIFS) between the end of a previous transmission session and the start of said channel contention period.

4. The method according to claim 1, further comprising the step of attempting to reserve said channel upon the expiration of said backoff counter.

5. The method according to claim 1, further comprising the step of reserving said channel by sending a request to send (RTS) frame incorporating a reservation time to a destination station.

6. The method according to claim 1, further comprising the step of reserving the channel by sending a clear to send (CTS) frame incorporating a reservation time from the destination station to the source station.

7. The method according to claim 1, wherein each contention period is further divided into a plurality of contention windows each corresponding to a different priority.

8. The method according to claim 7, wherein the size of each contention window is dynamically adapted as a function of the number of stations in said network.

9. The method according to claim 8, wherein said number of stations is determined using management frames.

10. The method according to claim 8, wherein said number of stations is determined by calculating an estimate of the number of stations in said network as a function of the current size of the contention window and the time from when a station is permitted to transmit to the time it actually starts transmitting.

11. The method according to claim 1, wherein said backoff counter is suspended until arrival of a contention window having a priority corresponding to that of the transmission to be sent.

12. The method according to claim 1, wherein said step of initializing comprises choosing a random number of time slots between zero and the size of a contention window.

13. The method according to claim 1, wherein said backoff counter resumes from the count before receipt of the most recent FCD signal.

14. The method according to claim 1, wherein the failure to receive a CD signal within a CD time of receiving a FCD signal indicates that said FCD signal was a false alarm.

15. The method according to claim 1, further comprising the step of releasing said channel once reserved or decreasing a reservation counter in the event of a link failure.

16. The method according to claim 15, wherein said link failure is indicated via a frame adapted to indicate a CTS failure.

17. The method according to claim 15, wherein said link failure is indicated via a frame adapted to indicate an RTS failure.

18. The method according to claim 1, further comprising the step of releasing said channel in the event a maximum time allocated to a session has expired.

19. The method according to claim 1, further comprising the step of decrementing one or more reservation counters, each holding a reservation time wherein separate reservation counters are maintained for each session detected by a station and wherein said channel is considered released only when the reservation counter with the maximum reservation time expires.

20. A method of accessing a channel in a communication transceiver coupled to a communications channel in a network including a plurality of stations, said method comprising the steps of:

dividing contention for access to said channel into one or more contention windows each contention window assigned a priority and subdivided into a plurality of backoff time slots;

deferring zero or more contention windows until arrival of a contention window whose priority corresponds to the priority of a particular transmission;

each station wishing to transmit, initializing a backoff counter with a backoff count equal to a random number of backoff time slots;

decrementing said backoff counter while said channel is idle; and attempting to reserve said channel upon expiration of said backoff counter.

21. The method according to claim 20, wherein the width of said backoff time slot is on the order of a carrier detect (CD) signal.

22. The method according to claim 20, wherein the width of said backoff time slot is on the order of a fast carrier detect (FCD) signal adapted to indicate that a transmission may be starting and which is generated more quickly than a carrier detect (CD) signal.

23. The method according to claim 20, further comprising the steps of:

suspending said backoff counter upon receipt of a fast carrier detect (FCD) signal;

resuming decrementing said backoff counter upon failure of a carrier detect (CD) signal to arrive within a CD time; and deferring transmission until after the subsequent transmission upon receipt of a CD signal.

24. The method according to claim 20, wherein said step of attempting to reserve said channel comprises sending a request to send (RTS) frame incorporating a reservation time to a destination station.

25. The method according to claim 20, further comprising a step of declaring a link failure after attempting to reserve said channel a predetermined number of times.

26. The method according to claim 20, further comprising a step of increasing the size of a contention window upon failure to reserve said channel.

27. The method according to claim 20, further comprising of a step of decreasing the size of said contention window up to a minimum contention window size if the channel reservation was successful.

28. The method according to claim 20, further comprising a step of adjusting the size of each contention window as a function of the number of stations in said network.

29. A carrier sense multiple access (CSMA) based communications system wherein transmissions are preceded by a contention phase during which one or more transmitters compete for access to a channel, comprising:
   means for establishing one or more contention windows, each contention window assigned a priority;
   means for dividing each contention window into a plurality of backoff time slots wherein detection of a carrier sense signal during a time slot potentially indicates that said channel is busy;
   backoff means adapted to count using a backoff timer a randomly selected backoff time equal to a multiple of said backoff time slots; and
   reservation means adapted to attempt reservation of said channel upon expiration of said backoff timer and to enable transmission upon successful reservation of said channel.

30. The system according to claim 29, wherein said backoff means comprises:
   means for suspending said backoff timer during backoff time slots wherein a fast carrier detect (FCD) signal is detected;
   resuming said backoff timer during backoff time slots wherein no FCD signal is received; and
   deferring transmission to a subsequent contention phase upon receipt of a carrier detect (CD) signal within a CD time of receipt of a FCD signal, wherein said CD time is proportional to a time period during which the arrival of a CD signal is expected in the event a transmission is received.

31. The system according to claim 30, wherein said FCD signal is detected faster than said CD signal.

32. The system according to claim 30, wherein said FCD signal has a higher false alarm rate than said CD signal.

33. The system according to claim 30, wherein said backoff means comprises means for restarting a transmission session upon receipt of a CD signal.

34. The system according to claim 30, wherein said backoff timer is adapted to generate a new random backoff time in response to said transmission session being deferred.

35. The system according to claim 30, wherein said backoff timer is adapted to continue counting from a point at which said backoff timer was previously stopped upon said transmission session being resumed.

36. The system according to claim 29, wherein said reservation means is adapted to send a request to send (RTS) frame incorporating a reservation time to a destination station.

37. The system according to claim 29, wherein said reservation means is adapted to send a clear to send (CTS) frame incorporating a reservation time from the destination station to the source station.

38. The system according to claim 29, wherein said means for dividing each contention window comprises adjustment means adapted to adjust the size of each contention window as a function of the number of stations contending for the channel in said contention window.

39. The system according to claim 38, wherein said number of stations is determined using management frames.

40. The system according to claim 38, wherein said number of stations is determined using means for calculating an estimate of the number of stations in said network as a function of the current size of the contention window and the time from when a station is permitted to transmit to the time it actually starts transmitting.

41. The system according to claim 29, further comprising means for releasing said channel once reserved in the event of a link failure.

42. The system according to claim 41, wherein said link failure is indicated via a frame adapted to indicate a CTS failure.

43. The system according to claim 41, wherein said link failure is indicated via a frame adapted to indicate an RTS failure.

44. The system according to claim 41, wherein said link failure is indicated via a frame adapted to indicate an ACK failure.

45. The system according to claim 29, further comprising means for releasing said channel in the event a maximum time allocated to a session has expired.

46. The system according to claim 29, further comprising means for decrementing one or more reservation counters, each holding a reservation time wherein separate reservation counters are maintained for each session detected by a station and wherein said channel is considered released only when the reservation counter with the maximum reservation time expires.

47. A communications transceiver for transmitting and receiving over a carrier sense multiple access (CSMA) frame based communications network wherein frame transmissions are separated by a contention interframe space (CIFS) during which one or more nodes compete for access to said network, comprising:
   a coupling circuit for generating a receive signal received over said network and for outputting a transmit signal onto said network;
   a transmitter adapted to modulate data to be transmitted in accordance with a modulation scheme so as to generate said transmit signal therefrom;
   a receiver adapted to demodulate said receive signal in accordance with said modulation scheme so as to generate a receive data signal therefrom and adapted to generate carrier sense signals including a fast carrier detect (FCD) signal having a high false alarm rate and predicting early on when a transmission may be starting and a carrier detect (CD) signal having a low false alarm rate and indicating that a transmission is starting;
   a media access control (MAC) comprising means adapted to;
   establish one or more contention windows wherein each contention window is assigned a priority and subdivided into a plurality of backoff time slots;
   defer zero or more contention windows until arrival of a contention window whose priority corresponds to the priority of a particular transmission;
   initialize a backoff counter with a backoff count equal to a random number of backoff time slots;
   decrement said backoff counter while said channel is idle;
   attempt to reserve said channel upon expiration of said backoff counter;
   transmit onto said channel upon successfully reserving said channel; and
   a processor adapted to control the operation of said transmitter, receiver and MAC and to provide an interface between said MAC and an external host.

48. The transceiver according to claim 47, wherein termination of said current transmission session is indicated by a change in state of said channel from busy to idle.

49. The transceiver according to claim 47, wherein said MAC means is adapted to insert a contention interframe space (CIFS) between the end of a previous transmission session and the start of said channel contention period.

50. The transceiver according to claim 47, wherein reserving said channel comprises sending a request to send (RTS) frame incorporating a reservation time to a destination station.

51. The transceiver according to claim 47, wherein the size of each of said one or more contention windows is dynamically adjusted as a function of the number of stations in said network.

52. The transceiver according to claim 51, wherein said number of stations is determined using management frames.

53. The transceiver according to claim 51, wherein said number of stations is determined using means for calculating an estimate of the number of stations in said network as a function of the current size of the contention window and the time from when a station is permitted to transmit to the time it actually starts transmitting.

54. The transceiver according to claim 47, wherein said backoff counter is suspended until arrival of a contention window having a priority corresponding to that of the transmission to be sent.

55. The transceiver according to claim 47, wherein said step of initializing comprises choosing a random number of time slots between zero and the size of a contention window.

56. The transceiver according to claim 47, wherein said backoff counter resumes from the count before receipt of a most recent fast carrier detect (FCD) signal.

57. The transceiver according to claim 47, wherein the failure to receive a carrier detect (CD) signal within a CD time of receiving a fast carrier detect (FCD) signal indicates that said FCD signal was a false alarm.

58. A computer readable storage medium having a computer program embodied thereon for causing a suitably programmed system to access a channel in a carrier sense multiple access (CSMA) frame based communications system wherein frame transmissions are separated by a contention interframe space (CIFS) during which one or more transmitters compete for access to said channel by performing the following steps when such program is executed on said system:
    establishing one or more contention windows, wherein each contention window is assigned a priority and subdivided into a plurality of backoff time slots;
    deferring zero or more contention windows until arrival of a contention window whose priority corresponds to the priority of a particular transmission;
    initializing a backoff counter with a backoff count equal to a random number of backoff time slots;
    decrementing said backoff counter while said channel is idle;
    attempting to reserve said channel upon expiration of said backoff counter; and
    transmitting onto said channel upon successful reservation of said channel.

59. The computer readable storage medium according to claim 58, wherein the width of said backoff time slot is on the order of a carrier detect (CD) signal.

60. The computer readable storage medium according to claim 59, wherein said CD signal is generated a relatively long time after the start of transmission, has a low false alarm rate and indicates that a transmission is starting.

61. The computer readable storage medium according to claim 58, wherein the width of said backoff time slot is on the order of a fast carrier detect (FCD) signal.

62. The computer readable storage medium according to claim 61, wherein said FCD signal is generated relatively shortly after the start of transmission, has a high false alarm rate and indicates that a transmission may be starting.

63. The computer readable storage medium according to claim 58, further comprising the steps of:
    suspending said backoff counter upon receipt of a fast carrier detect (FCD) signal;
    resuming decrementing said backoff counter upon failure of a carrier detect (CD) signal to arrive within a CD time, said CD time being proportional to a time period during which the arrival of a CD signal is expected in the event a transmission is received; and
    deferring transmission until after the subsequent transmission upon receipt of a CD signal.

64. The computer readable storage medium according to claim 63, wherein said FCD signal is generated more quickly after transmission than said CD signal.

65. The computer readable storage medium according to claim 63, wherein said FCD signal has a higher false alarm rate than said CD signal.

66. The computer readable storage medium according to claim 63, wherein said CD signal has a higher probability of detection than said FCD signal.

67. The computer readable storage medium according to claim 58, further comprising the step of subsequently restarting a transmission session upon receipt of a carrier detect (CD) signal.

68. The computer readable storage medium according to claim 58, wherein the size of each said one or more contention windows is dynamically adjusted as a function of the number of stations in said network.

69. The computer readable storage medium according to claim 68, wherein said number of stations is determined using management frames.

70. The computer readable storage medium according to claim 68, wherein said number of stations is determined using means for calculating an estimate of the number of stations in said network as a function of the current size of the contention window and the time from when a station is permitted to transmit to the time it actually starts transmitting.

71. The computer readable storage medium according to claim 58, wherein said step of transmitting comprises the step of sending a request to send (RTS) frame incorporating a reservation time to a destination station.

72. The computer readable storage medium according to claim 58, wherein said step of transmitting comprises sending a clear to send (CTS) frame incorporating a reservation time from the destination station to the source station.

73. The computer readable storage medium according to claim 58, further comprising the step of releasing said channel once reserved in the event of a link failure.

74. The computer readable storage medium according to claim 73, wherein said link failure is indicated via a frame adapted to indicate a CTS failure.

75. The computer readable storage medium according to claim 73, wherein said link failure is indicated via a frame adapted to indicate an RTS failure.

76. The computer readable storage medium according to claim 58, further comprising the step of releasing said channel in the event a maximum time allocated to a session has expired.

77. The computer readable storage medium according to claim 58, further comprising the step of decrementing one or more reservation counters, each holding a reservation time wherein separate reservation counters are maintained for each session detected by a station and wherein said channel is considered released only when the reservation counter with the maximum reservation time expires.

78. A method of accessing a communications channel in a network including a plurality of stations, said method comprising the steps of:
- establishing one or more contention windows in which said plurality of stations compete for access to said communications channel;
- assigning a different priority to each of said one or more contention windows;
- each station wishing to transmit, initializing a backoff counter with a backoff count equal to a random number of backoff time slots;
- waiting until the arrival of a contention window having a priority corresponding to the priority of transmission of a particular station and upon the arrival thereof decrementing said backoff counter while said channel is idle; and
- attempting to reserve said communications channel upon expiration of said backoff counter.

79. The method according to claim 78, wherein the size of said contention windows is increased upon a failure by a station to reserve said communications channel.

80. The method according to claim 78, wherein the size of said contention windows is decreased upon the successful reservation of said communications channel by a station.

81. A method of accessing a communications channel in a network including a plurality of stations, said method comprising the steps of:
- establishing one or more contention windows during which said plurality of stations compete for access to said communications channel;
- assigning a priority to each of said one or more contention windows;
- each station wishing to transmit, initializing a backoff counter with a backoff count equal to a random number of backoff time slots;
- waiting until the arrival of a contention window having a priority corresponding to the priority of transmission of a particular station and upon the arrival thereof decrementing said backoff counter while said channel is idle;
- attempting to reserve said channel upon expiration of said backoff counter; and adjusting the size of a contention window as a function of a number of said plurality of stations contending for said communications channel in said contention window.

82. The method according to claim 81, wherein the size of said contention windows is increased upon a failure by a station to reserve said communications channel.

83. The method according to claim 81, wherein the size of said contention windows is decreased increased upon the successful reservation of said communications channel by a station.

84. The method according to claim 81, wherein said number of said plurality of stations contending for said communications channel is estimated in accordance with the following $$N_{estimated} = \frac{CW}{t} - 1$$

where the expected value of t is given by $$E[t] = \frac{CW}{N+1}$$

and wherein CW is the contention window within which each station randomly selects a backoff value, N is the number of stations contending for said communications channel at any given time, t is the actual time from the moment the stations are allowed to transmit until one station starts transmitting and E[t] is the expected value of t.

85. A method of accessing a communications channel in a power line carrier based network including a plurality of stations, said method comprising the steps of:
- establishing one or more contention windows in which said plurality of stations compete for access to said communications channel;
- assigning a different priority to each of said one or more contention windows;
- each station sensing said communication channel for the presence of carrier signal;
- each station wishing to transmit, selecting a random backoff time and initializing a backoff counter with said backoff time;
- each station waiting until the arrival of a contention window having a priority associated therewith corresponding to the priority of transmission of a particular station;
- within the contention window having matching priority, waiting a random backoff time;
- upon expiration of said backoff counter, attempting to reserve said communications channel; and
- suspending countdown of said backoff counter if presence of carrier signal is detected.

86. A method of accessing a communications channel in a network including a plurality of stations, said method comprising the steps of:
- establishing one or more contention windows in which said plurality of stations compete for access to said communications channel, each contention window corresponding to a different priority level;
- each station wishing to transmit, initializing a backoff counter with a backoff count equal to a random number of backoff time slots;
- waiting until the arrival of a contention window corresponding to a particular transmission priority, and upon the arrival thereof--decrementing said backoff counter while said channel is idle;
- attempting to reserve said channel upon expiration of said backoff counter;
- declaring the existence of a hidden station after a predetermined number of failed attempts to reserve said communications channel; and in accordance therewith, increasing the width of said backoff time slot and repeating said steps of initializing, waiting and attempting to reserve said communications channel.

87. A method of accessing a communications channel in a network including a plurality of stations, said method comprising the steps of:
- segmenting a transmission session into a plurality of frames;
- establishing one or more contention windows in which said plurality of stations compete for access to said communications channel, each contention window corresponding to a different priority level;
- initializing a backoff counter with a backoff count equal to a random number of backoff time slots;
- waiting until the arrival of a contention window corresponding to a particular transmission priority and, upon the arrival thereof, decrementing said backoff counter while said channel is idle;

attempting to reserve said channel, upon expiration of said backoff counter, for a duration sufficient to transmit said plurality of frames;

transmitting said plurality of frames from a transmitting station to a receiving station; and said receiving station transmitting an acknowledgement (ACK) reply to said transmitting station containing a plurality of ACK bits, each ACK bit indicating whether one of said frames is to be retransmitted.

88. A method of accessing a network channel by a station, said method comprising the steps of:

providing a fast carrier detect (FCD) signal generated by a receive circuit, said FCD signal having a high false alarm rate to predict the staff of packet transmissions from other stations on said channel;

dividing contention for channel access into a plurality of N windows, each window corresponding to one of N priority levels, wherein N is a positive integer greater than zero, and wherein each window is further divided into a plurality of time slots, each time slot having a width of said FCD signal; and contending for access to said channel only during a window whose priority is less than or equal to that of a packet awaiting transmission.

89. The method according to claim 88, further comprising the step of dynamically adapting the size of a window to match current traffic requirements in said network.

90. The method according to claim 89, wherein said window is adjusted as a function of the number of stations estimated to be transmitting on said channel in the same priority class.

* * * * *